(12) United States Patent
Vito

(10) Patent No.: US 6,895,738 B2
(45) Date of Patent: May 24, 2005

(54) SECURITY CHAIN

(76) Inventor: Robert A. Vito, 1434 Sugartown Rd., Berwyn, PA (US) 19312

( * ) Notice: Subject to any disclaimer, the term of this patent is extended or adjusted under 35 U.S.C. 154(b) by 318 days.

(21) Appl. No.: 10/288,078

(22) Filed: Nov. 5, 2002

(65) Prior Publication Data

US 2004/0083708 A1 May 6, 2004

(51) Int. Cl.$^7$ .......................... F16G 13/06; F16G 13/12
(52) U.S. Cl. ..................... 59/78; 59/82; 59/93; 474/211
(58) Field of Search ............................. 59/35.1, 78, 80, 59/82, 93; 474/211; D11/13

(56) References Cited

U.S. PATENT DOCUMENTS

| | | | |
|---|---|---|---|
| 105,004 A | 7/1870 | Short | |
| D5,544 S | 2/1872 | Draper | |
| 145,642 A | 12/1873 | Frontier et al. | |
| 189,797 A | 4/1877 | Seery | |
| 193,543 A | 7/1877 | Nortemann | |
| D11,004 S | 1/1879 | Lederer | |
| 214,869 A | 4/1879 | Barrows | |
| D11,790 S | 5/1880 | Seery | |
| 230,531 A | 7/1880 | Davidson | |
| 232,814 A | * 10/1880 | Granbery | 59/82 |
| 324,281 A | 8/1885 | Veit | |
| 1,058,260 A | * 4/1913 | Prindle | 59/78 |
| 1,114,289 A | 10/1914 | Rittenhouse | |
| 1,233,534 A | * 7/1917 | Wirtz | 474/211 |
| 1,238,847 A | * 9/1917 | Vanderveld | 59/78 |
| 1,327,925 A | * 1/1920 | Schneider | 59/78 |
| 1,381,519 A | * 6/1921 | Tench | 59/78 |
| D61,359 S | 8/1922 | Benjamin | |
| 1,674,318 A | * 6/1928 | Carr | 59/35.1 |
| 1,810,978 A | 6/1931 | Moore | |
| 1,828,476 A | * 10/1931 | Hyman et al. | 59/80 |
| D98,621 S | 2/1936 | Ritter | |
| 2,192,946 A | 3/1940 | Towner | |
| 2,242,783 A | 5/1941 | Grau | |
| 3,028,725 A | 4/1962 | Stevens | |
| 3,461,666 A | 8/1969 | Burstall | |
| 3,545,200 A | 12/1970 | Fagan | |
| 3,996,737 A | 12/1976 | Burstall | |
| 4,068,467 A | 1/1978 | Schreyer et al. | |
| 4,142,808 A | * 3/1979 | Muller et al. | 59/93 |
| D254,126 S | 2/1980 | Beniya | |
| 4,497,169 A | 2/1985 | Millington | |
| D282,055 S | 1/1986 | Brinkers | |
| 5,331,802 A | 7/1994 | Varley | |
| D391,515 S | * 3/1998 | Kennedy | D11/13 |
| 5,732,967 A | 3/1998 | Behling | |
| 6,170,248 B1 | 1/2001 | Ianello et al. | |

* cited by examiner

Primary Examiner—David Jones
(74) Attorney, Agent, or Firm—Volpe and Koenig, P.C.

(57) ABSTRACT

A security chain including a plurality of links interconnected. Each link includes a central member having first and second ends. The central member is formed by a hollow elongated tube with openings at the first and second ends. The hollow elongated tube has a generally circular cross section. First and second connector members are each welded across a separate one of the openings providing a high strength security chain suitable for anti-theft applications. Additional types of security chains are disclosed herein.

16 Claims, 68 Drawing Sheets

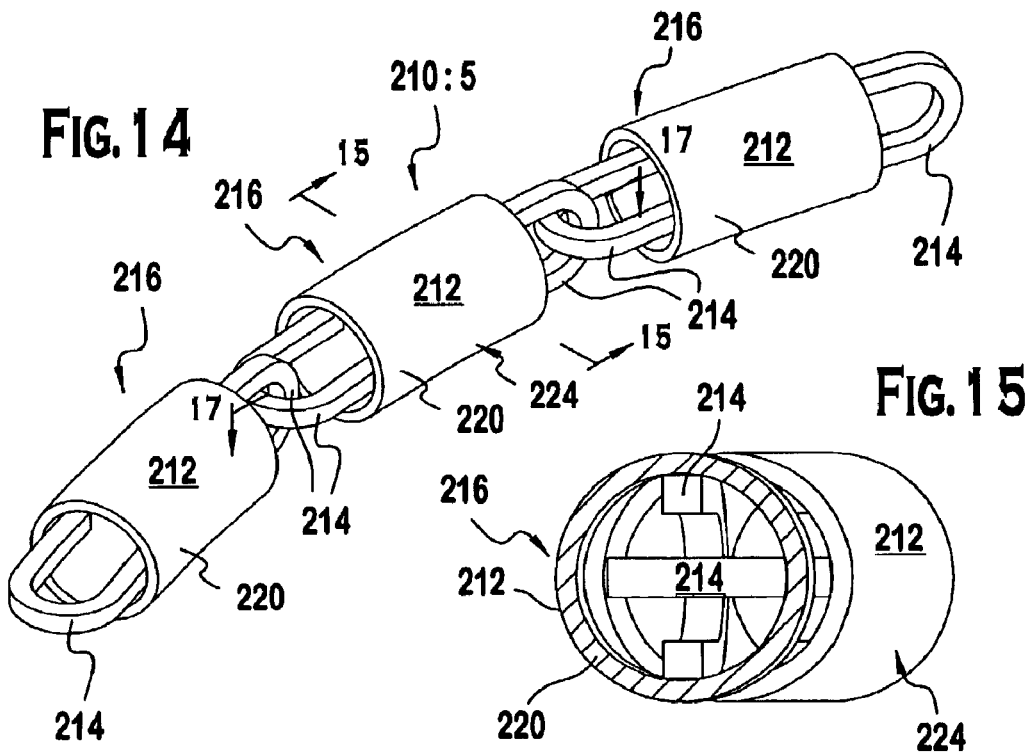
FIG. 14
FIG. 15
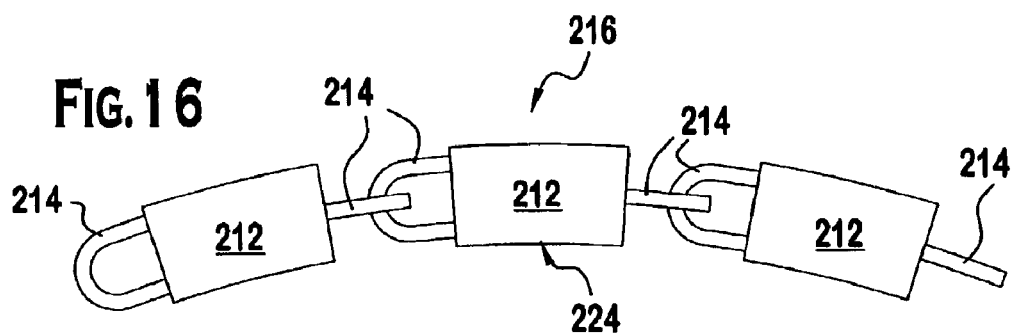
FIG. 16
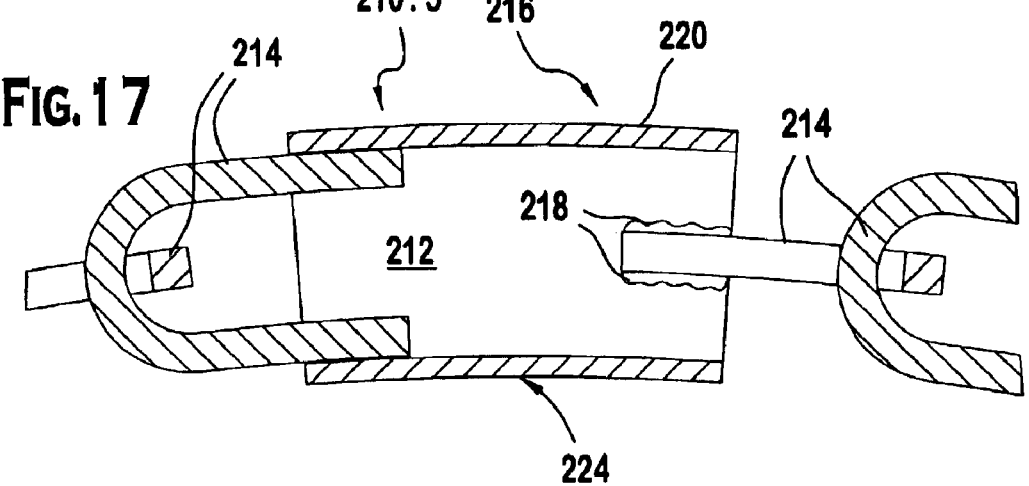
FIG. 17

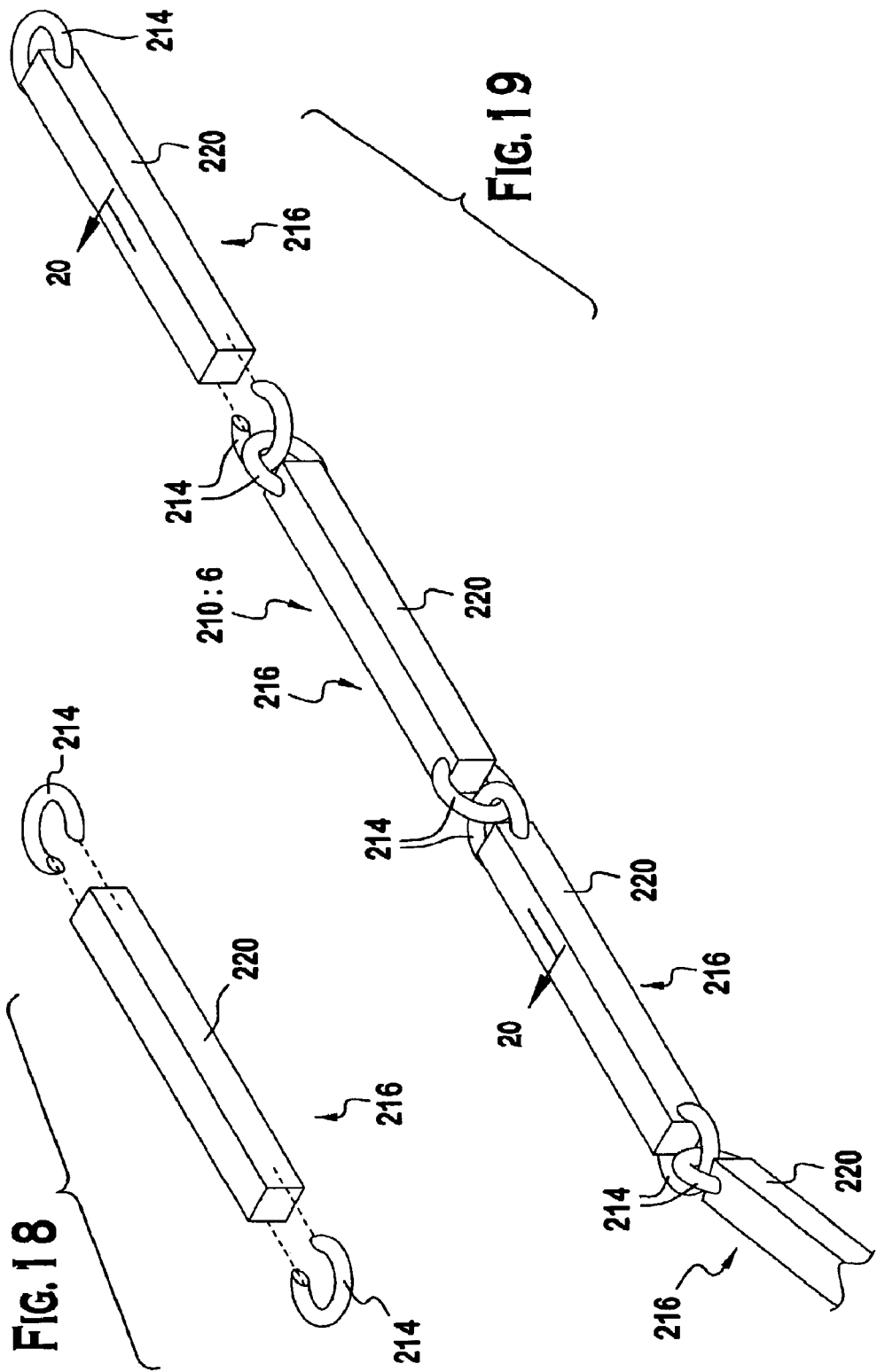

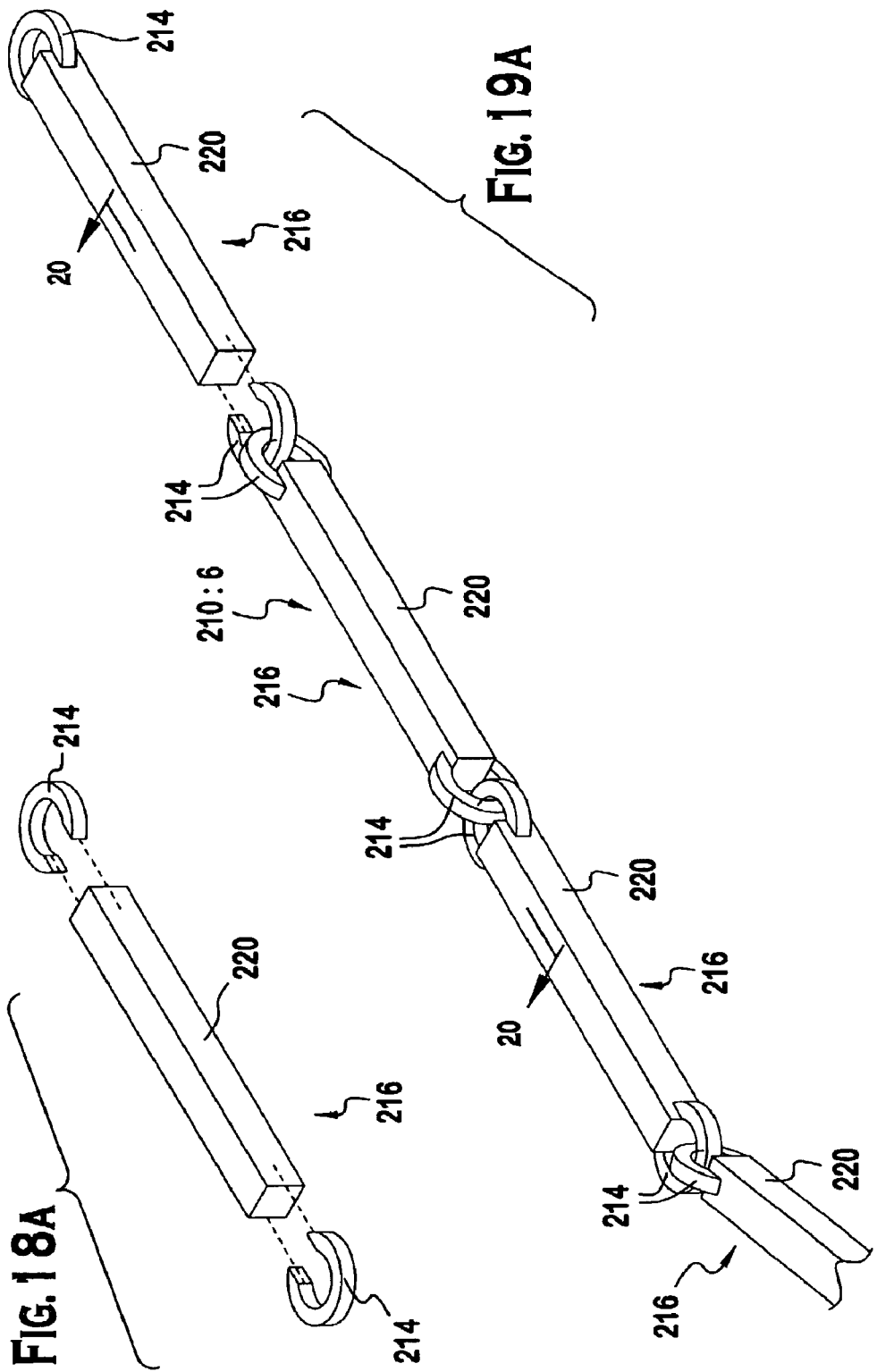

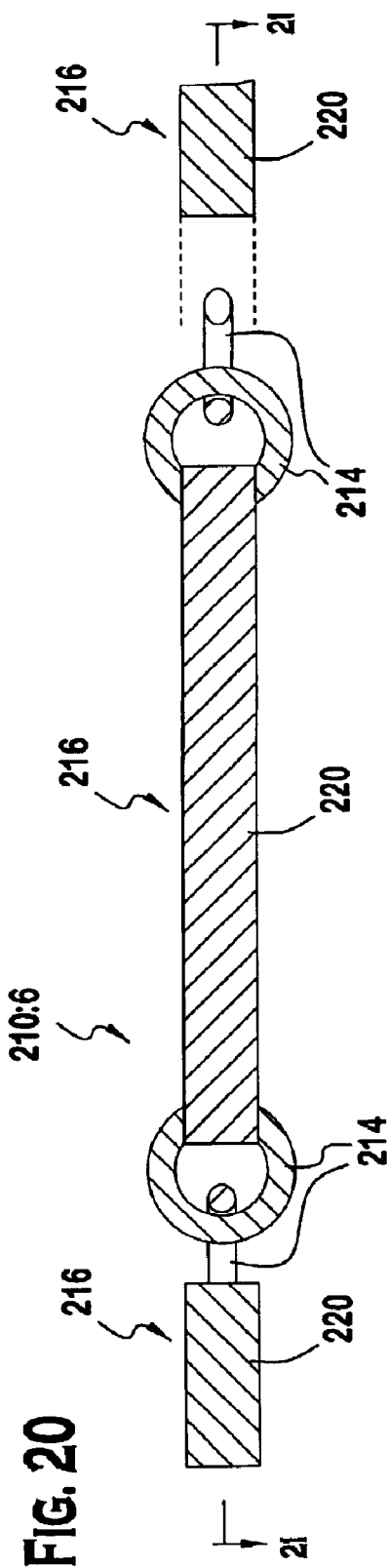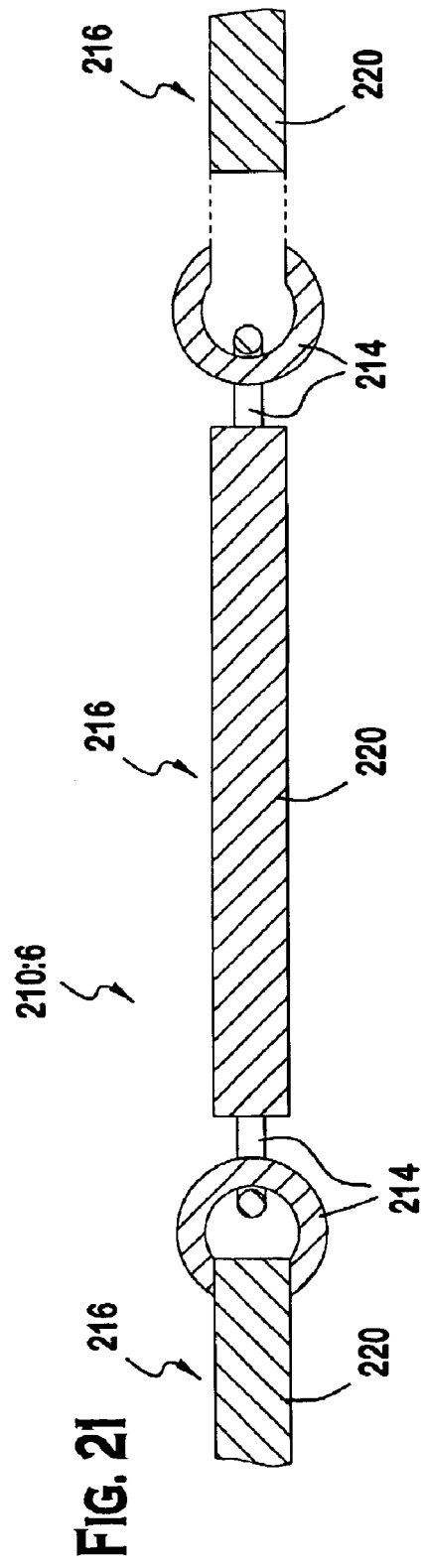

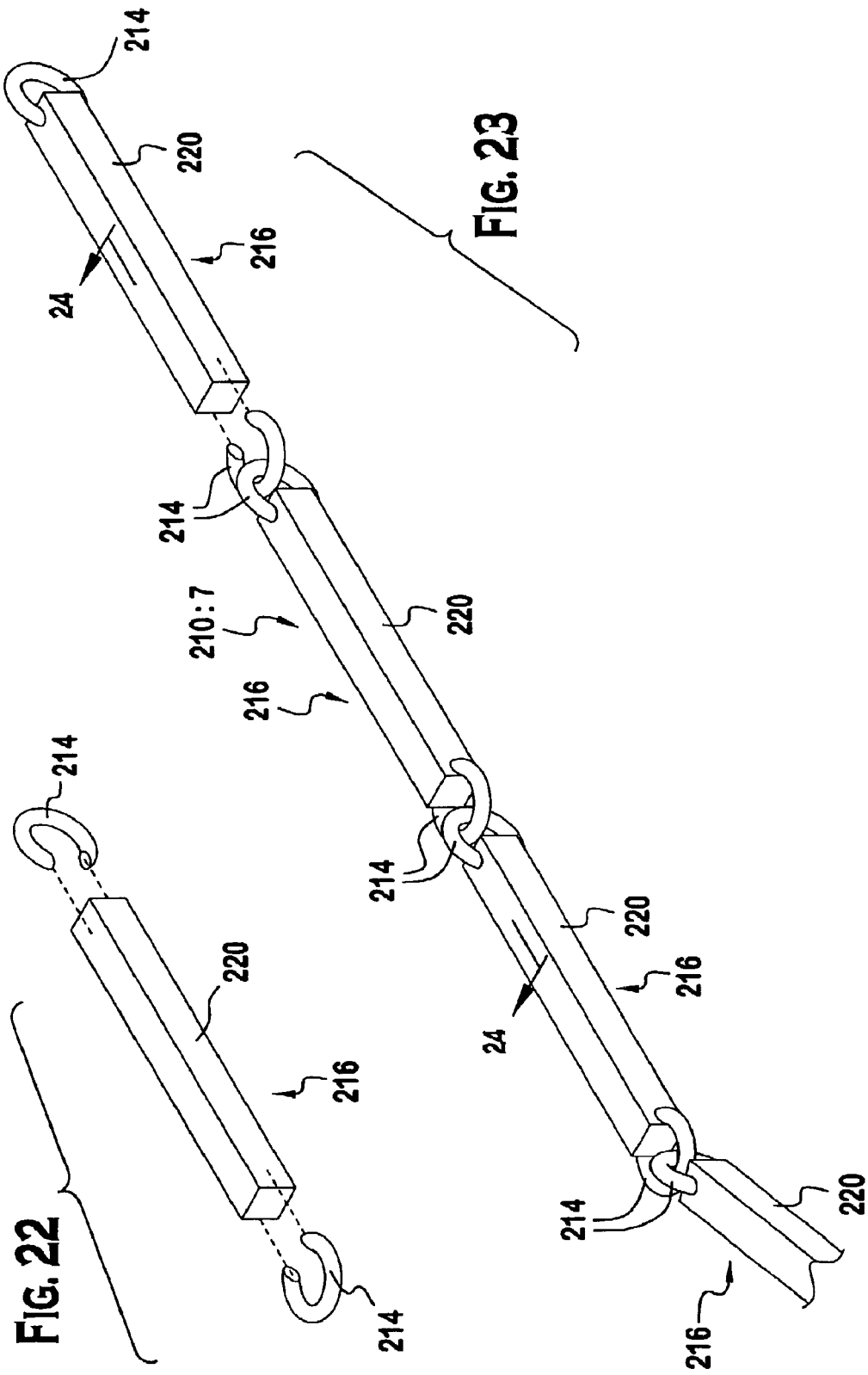

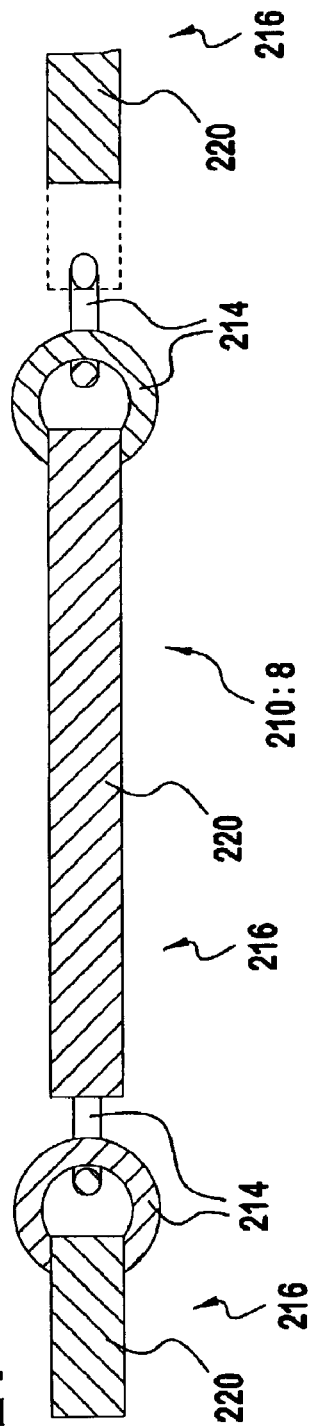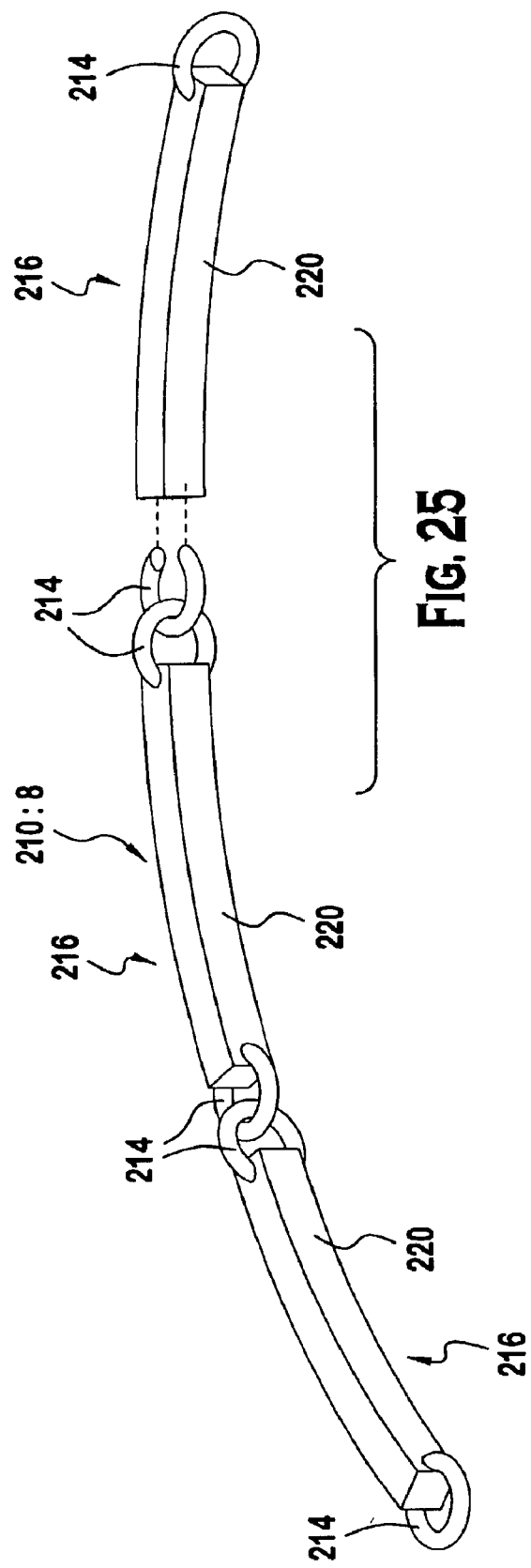

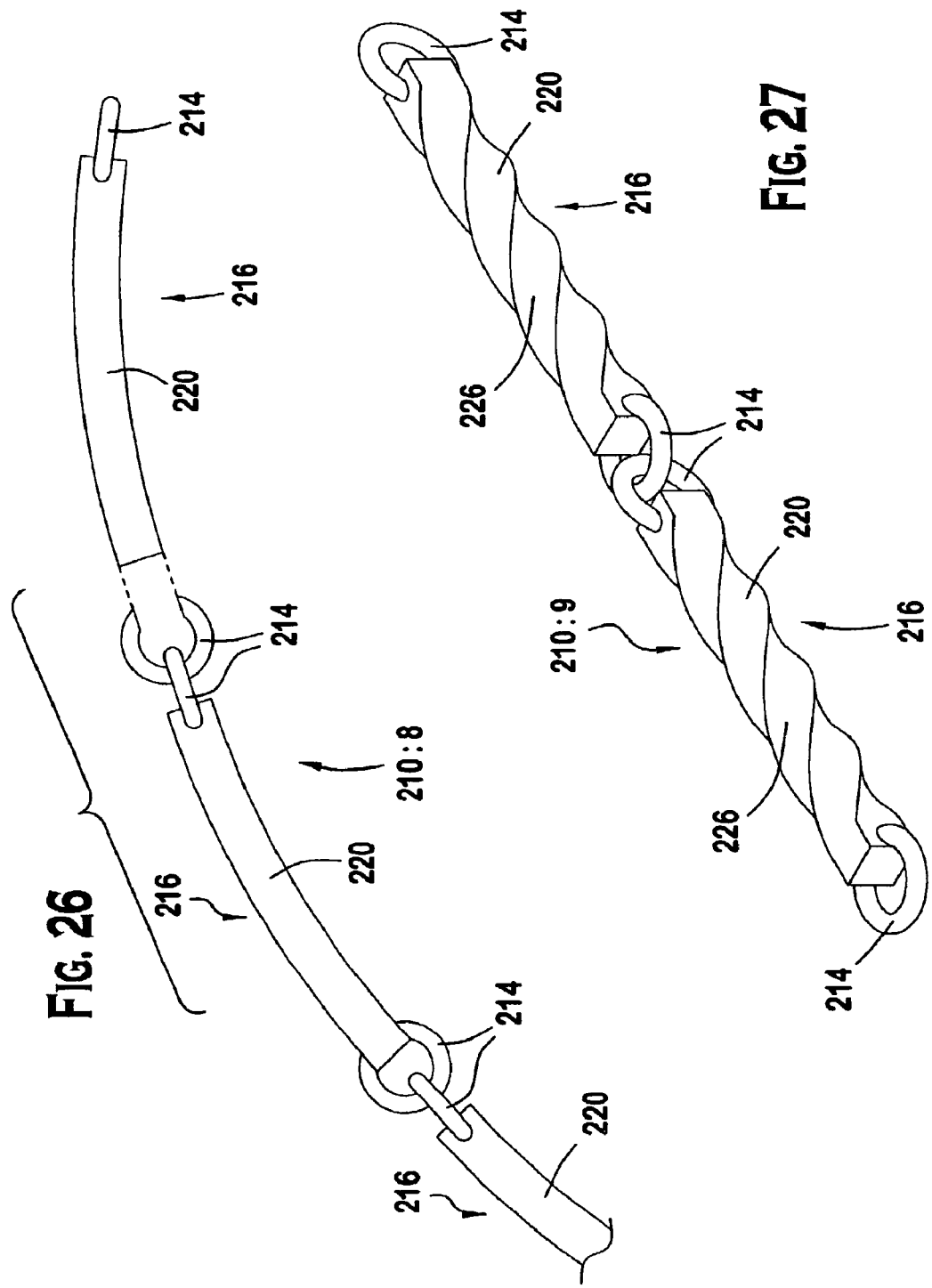

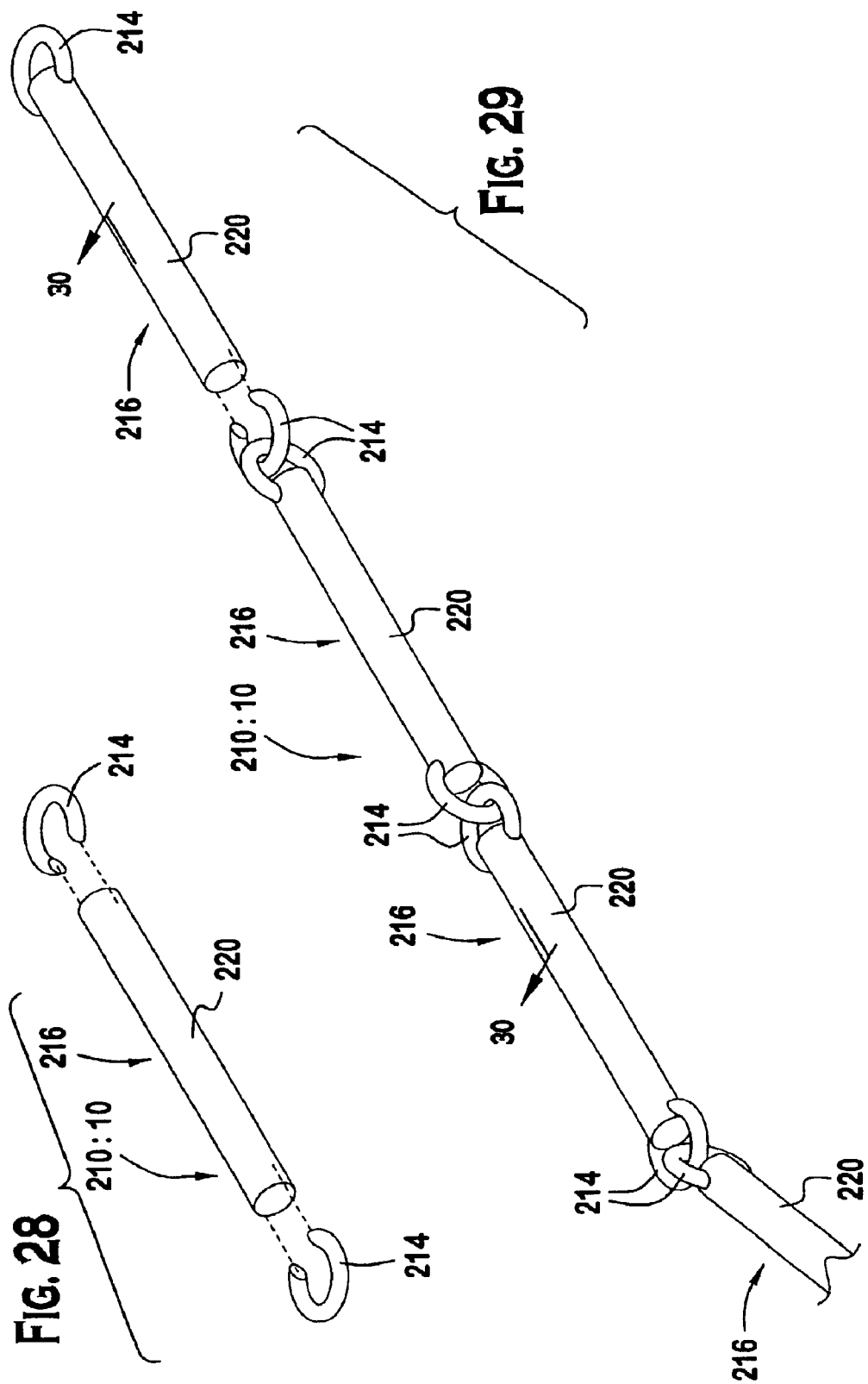

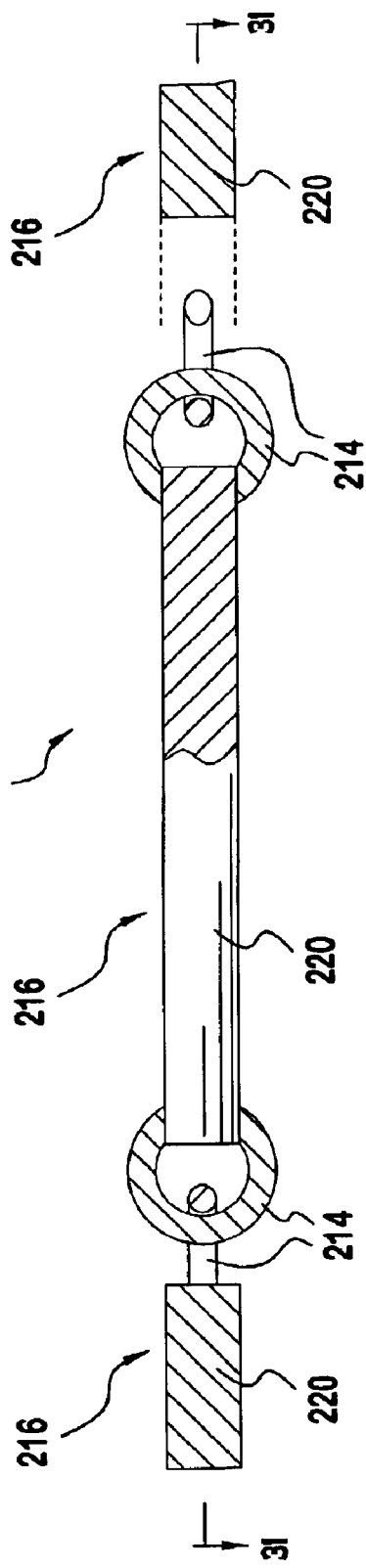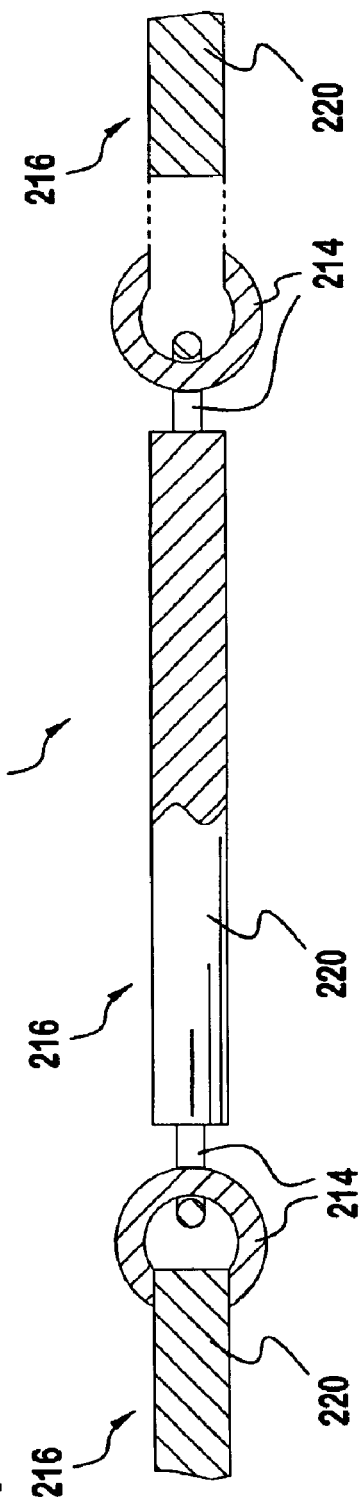

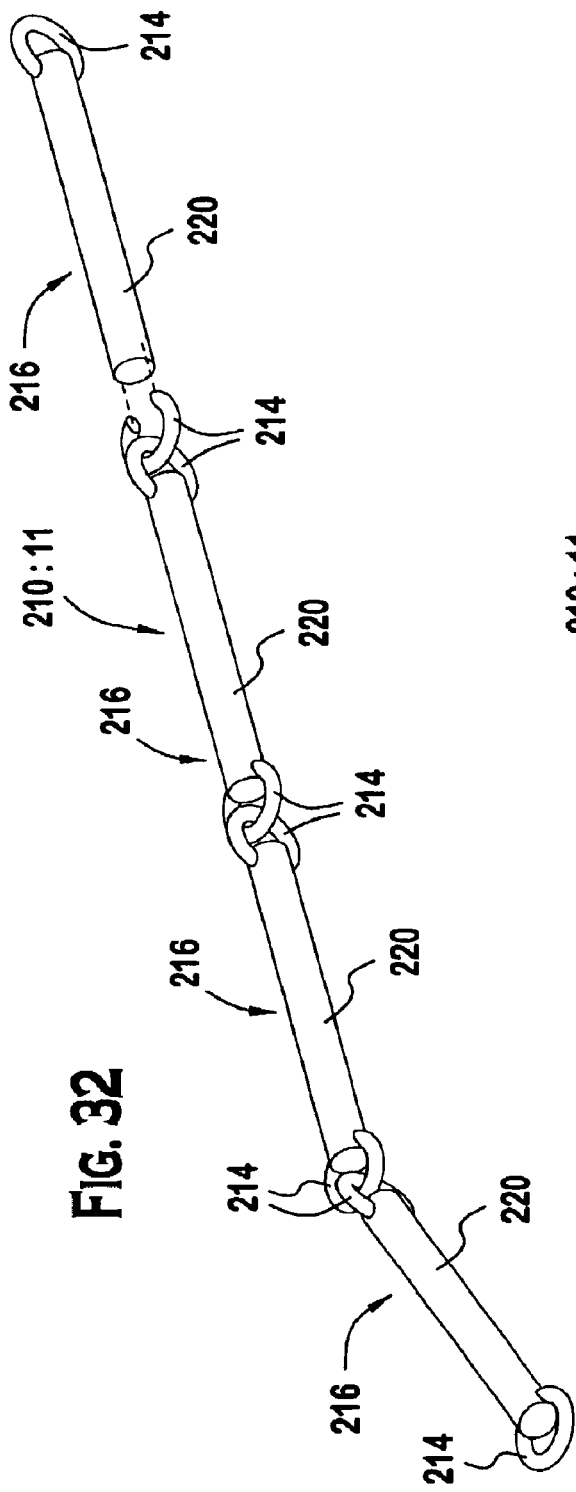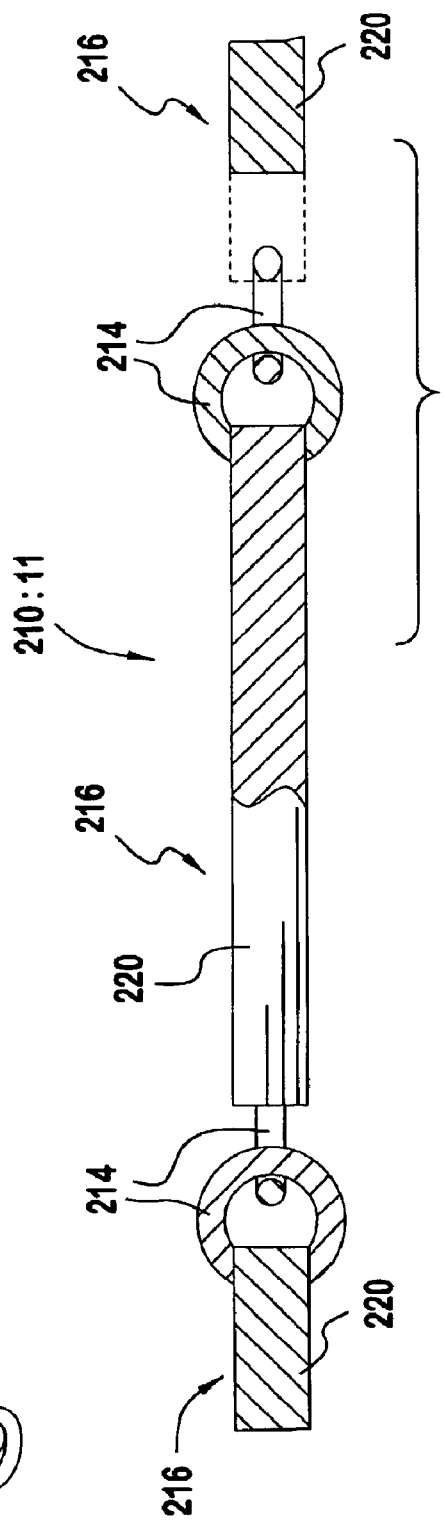

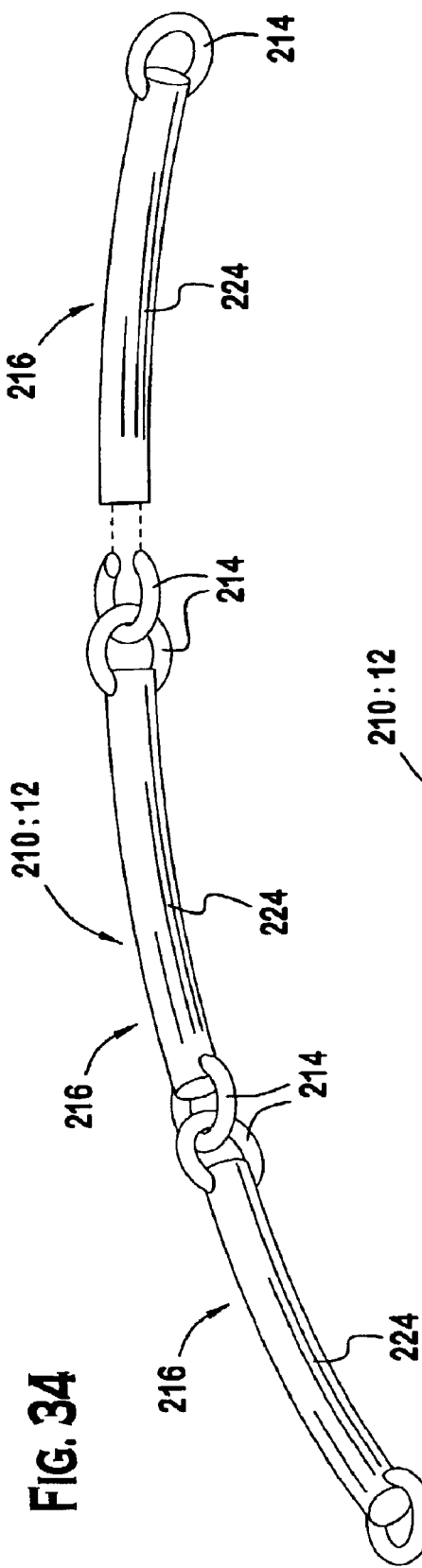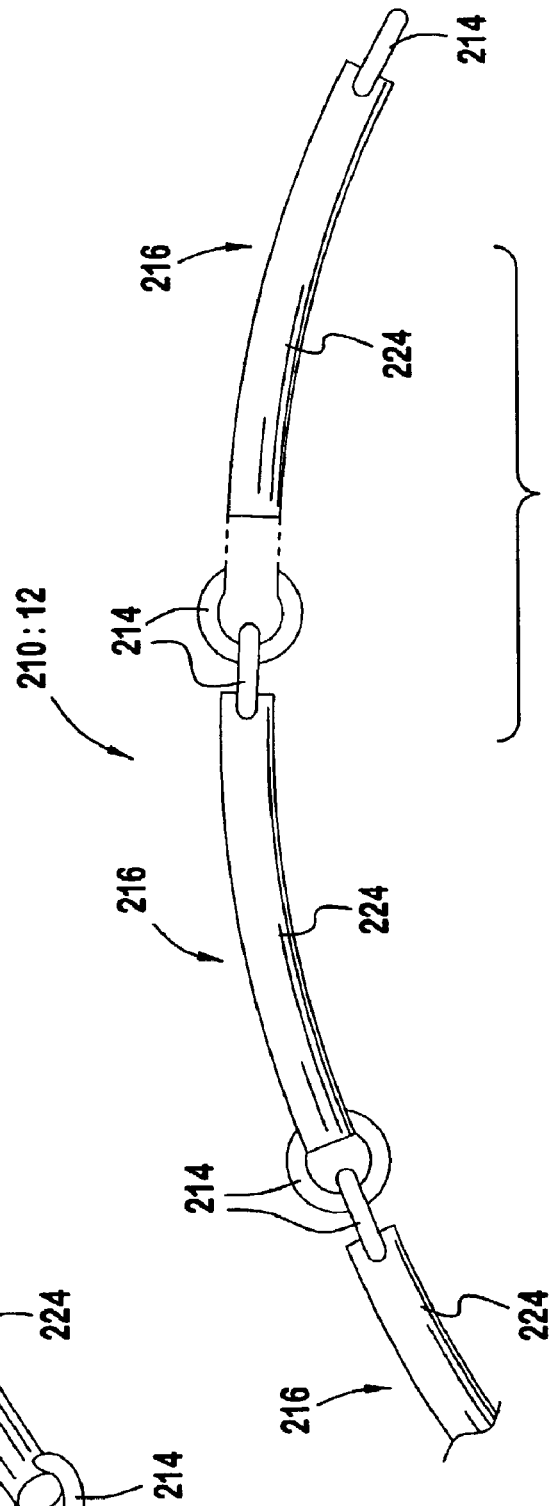

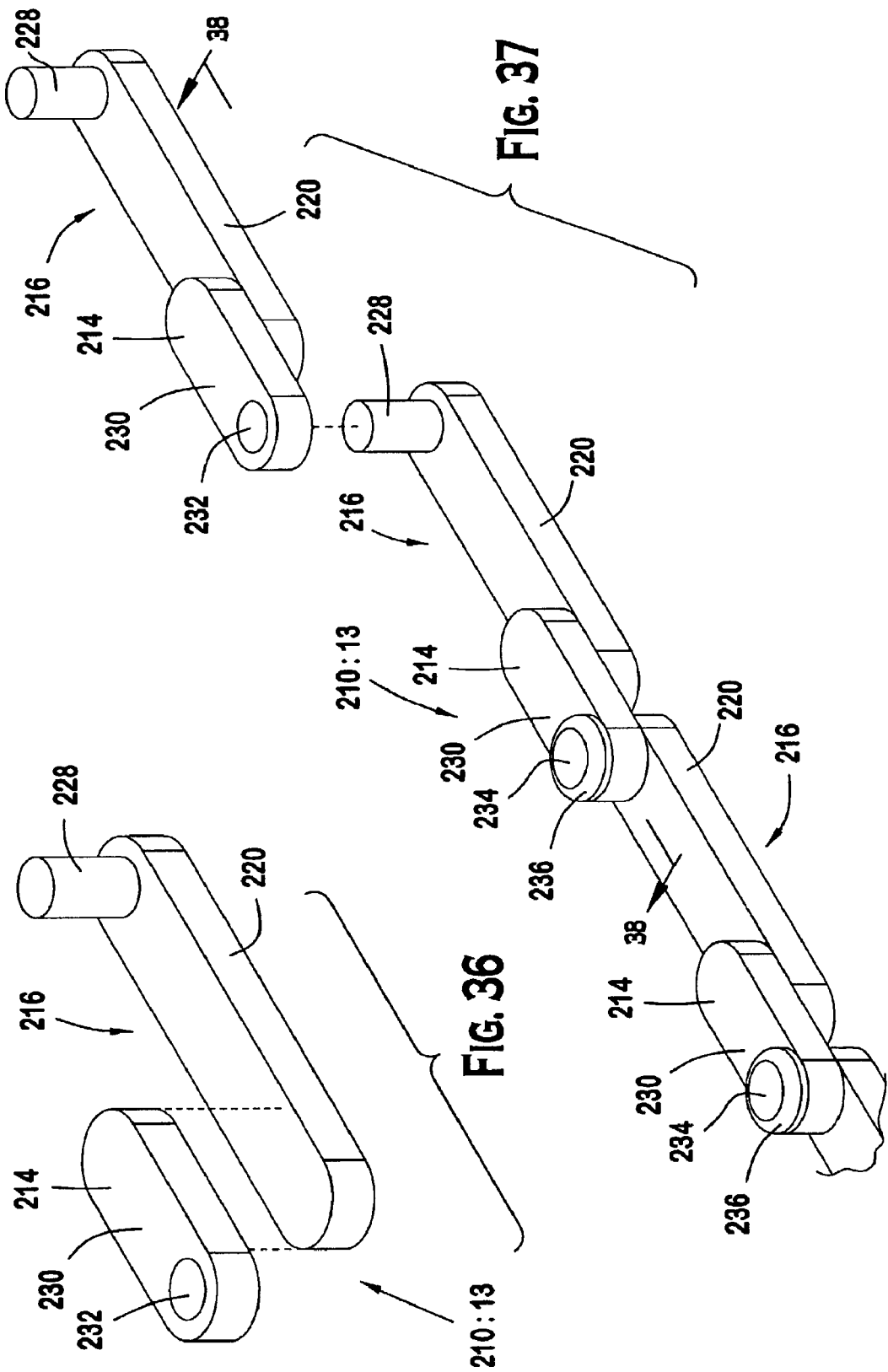

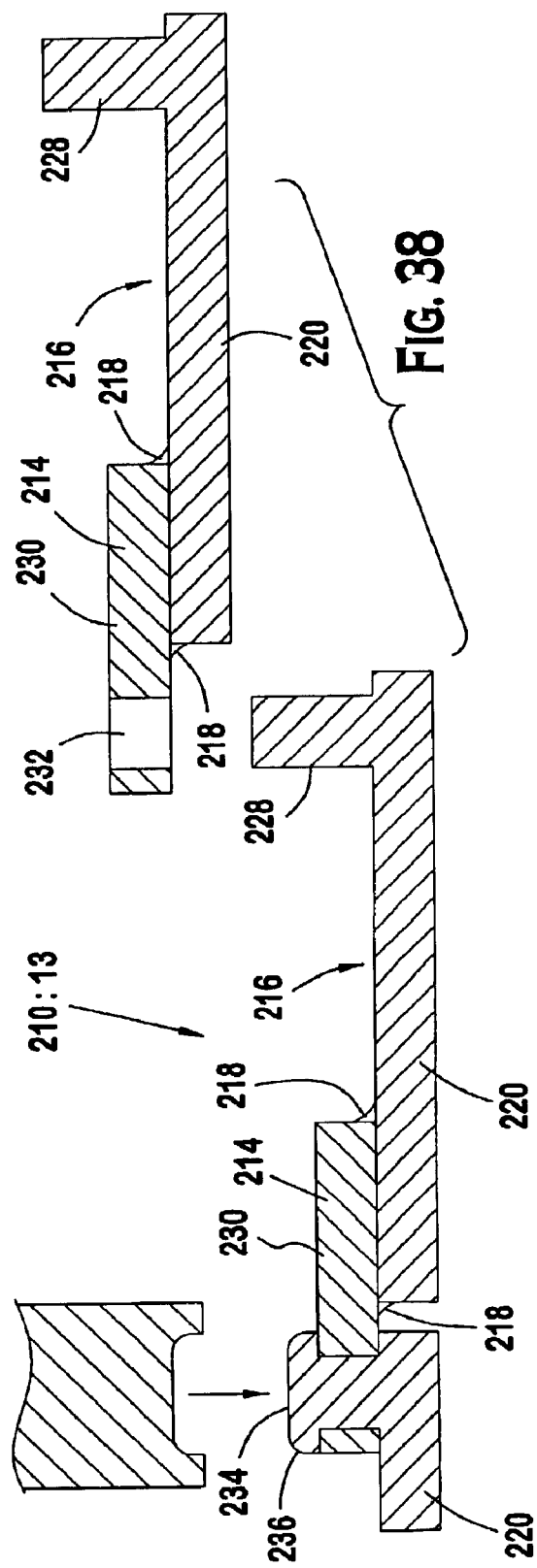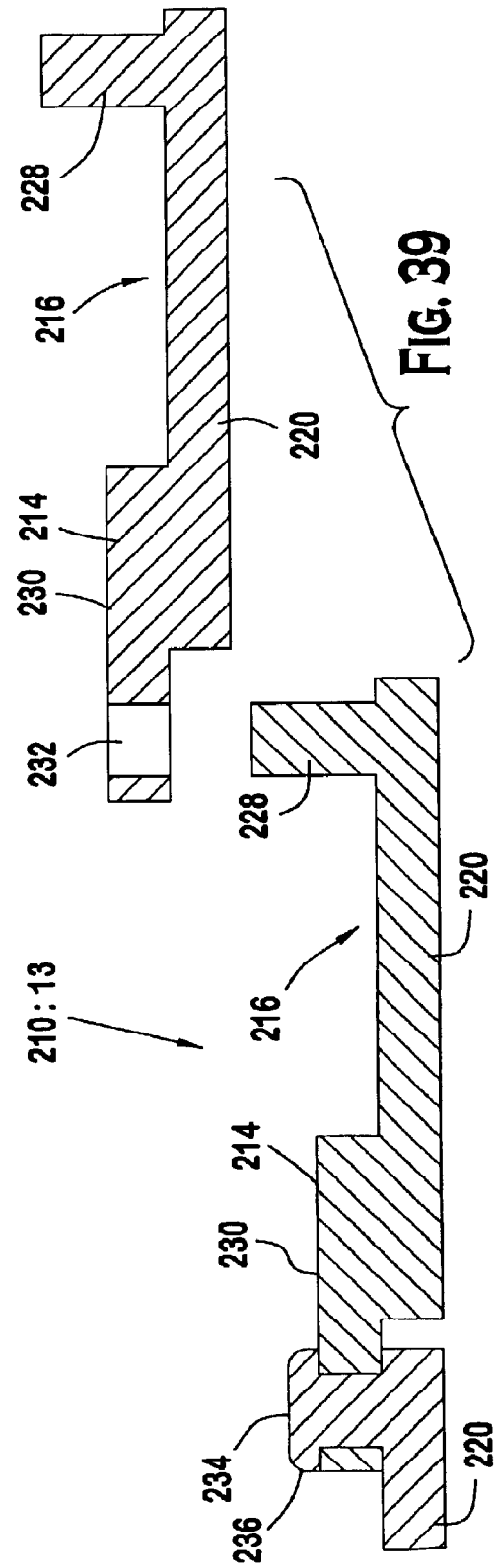

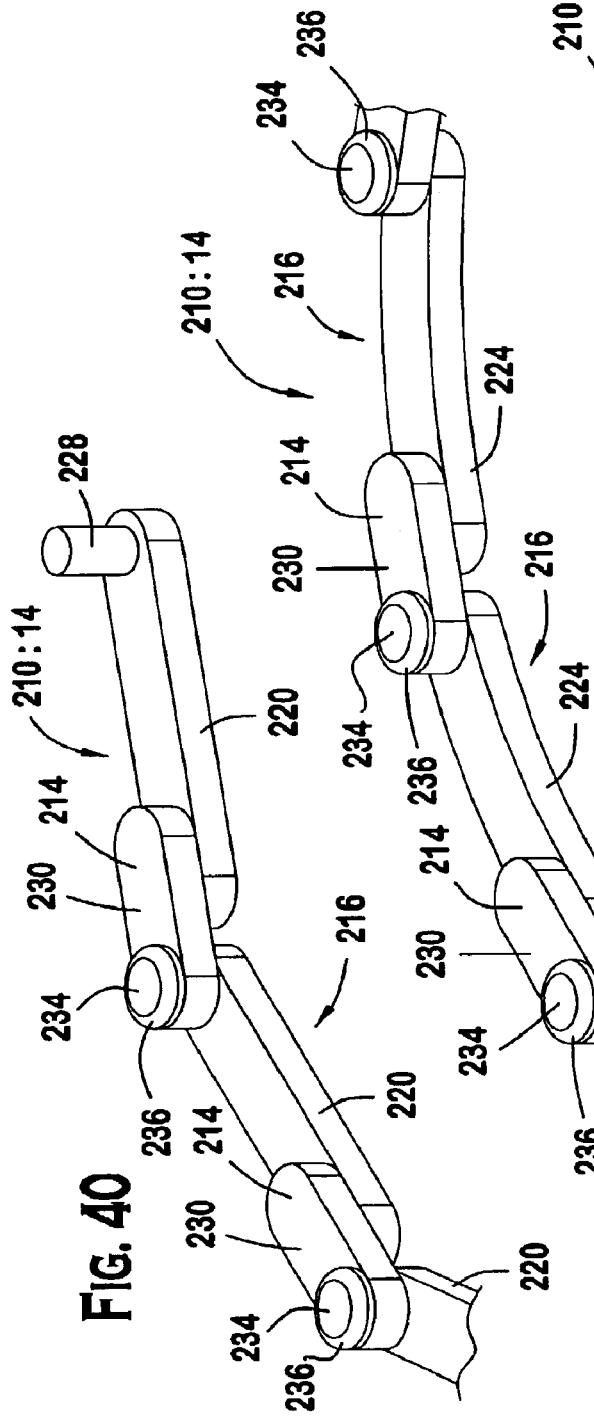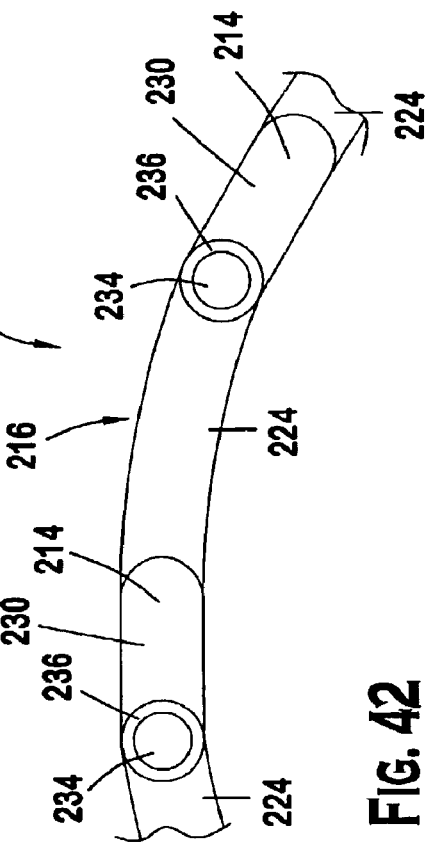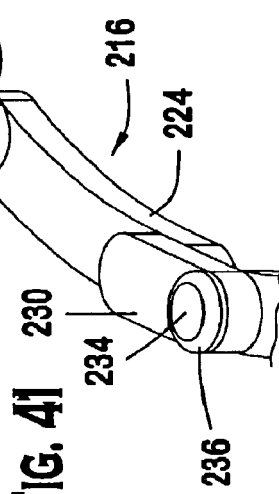

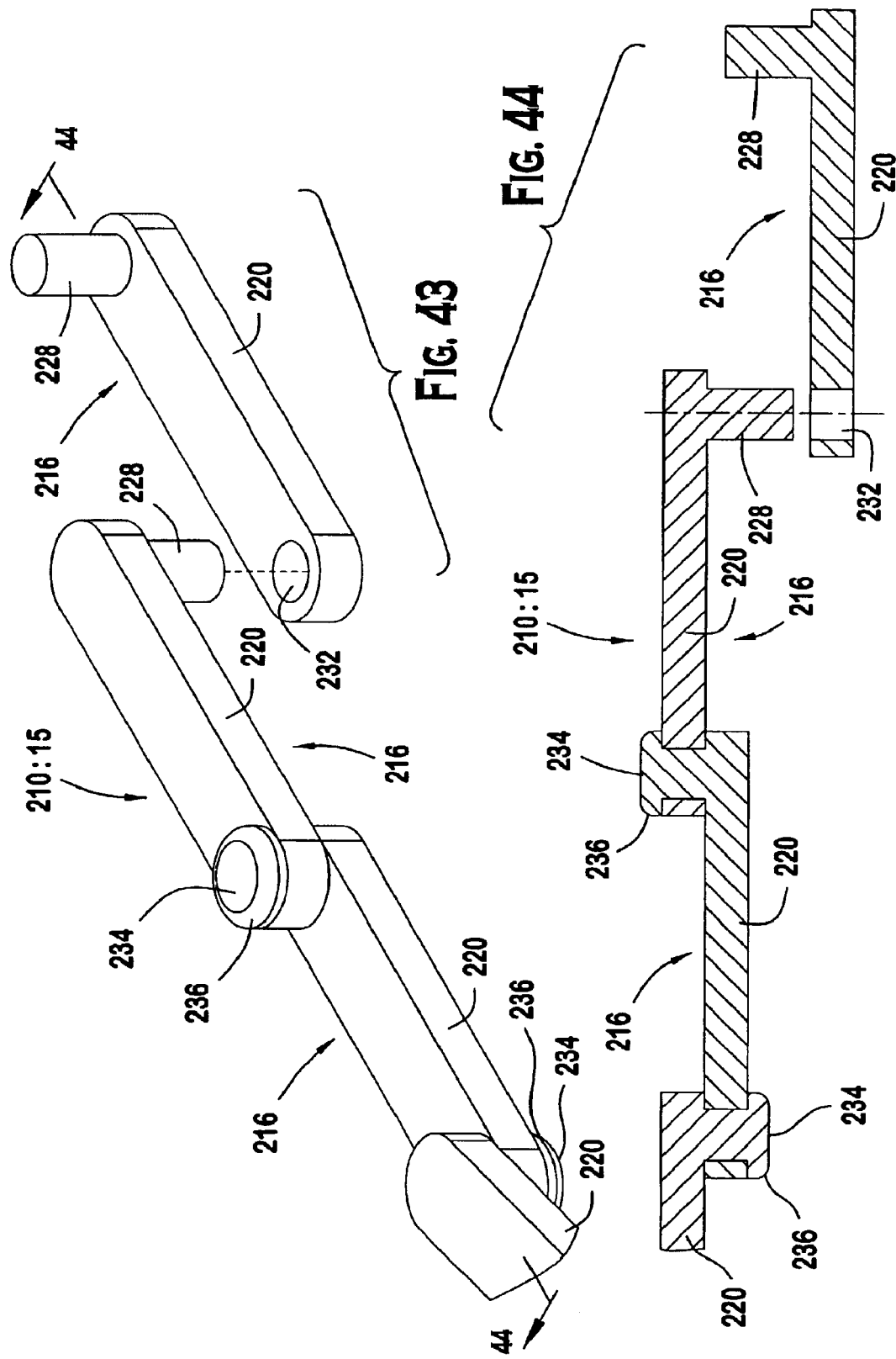

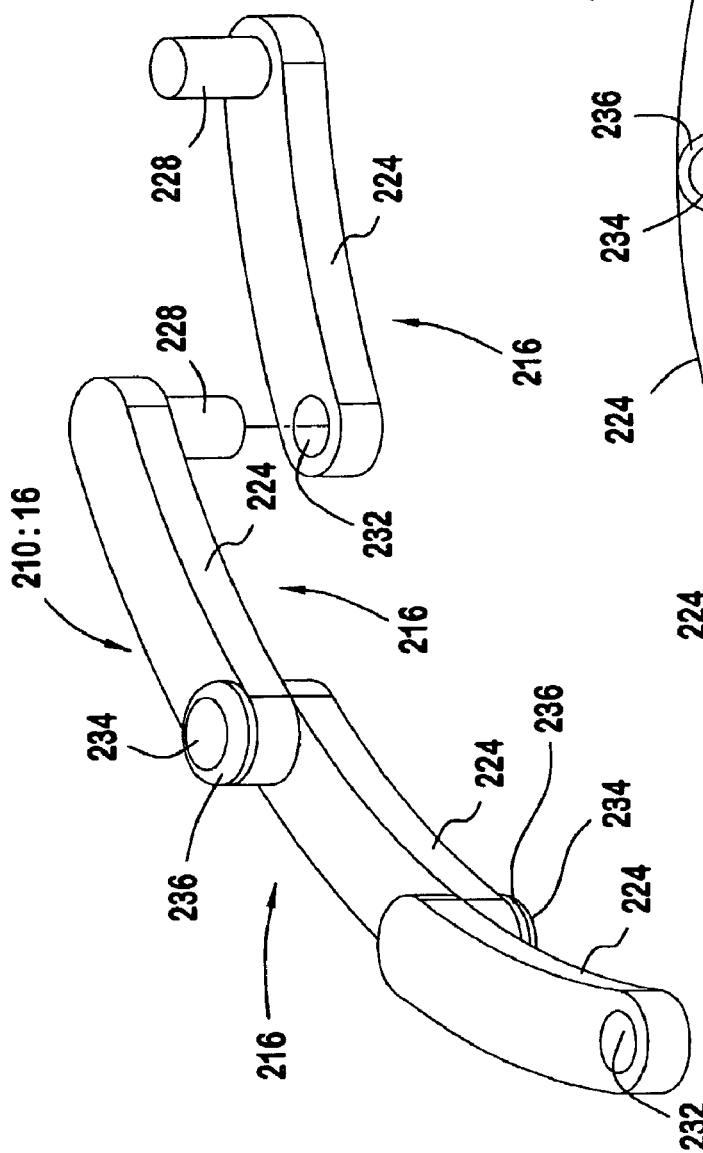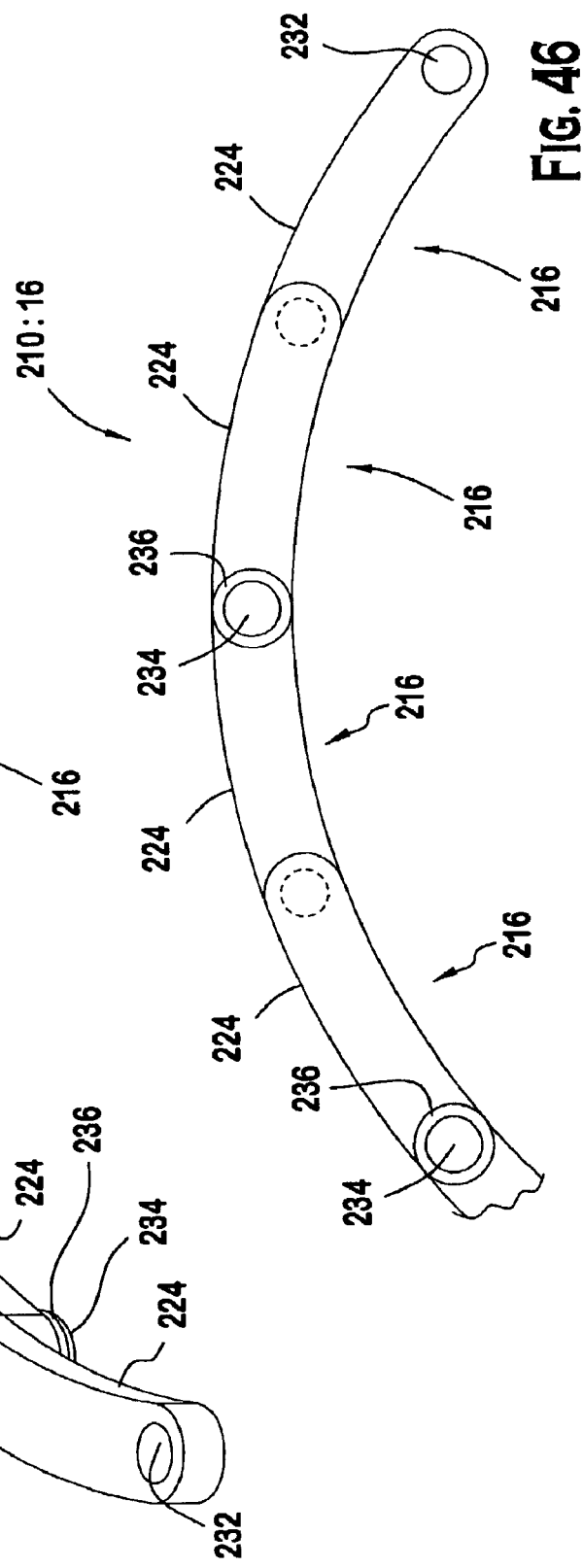

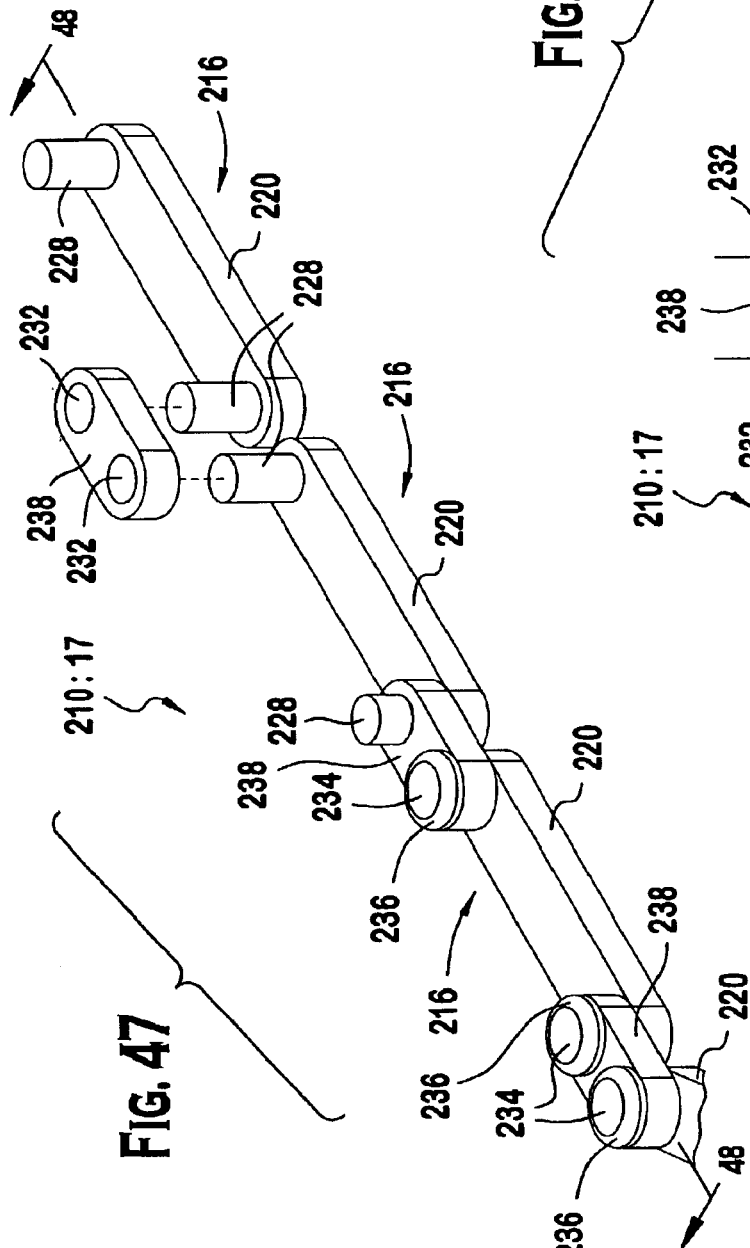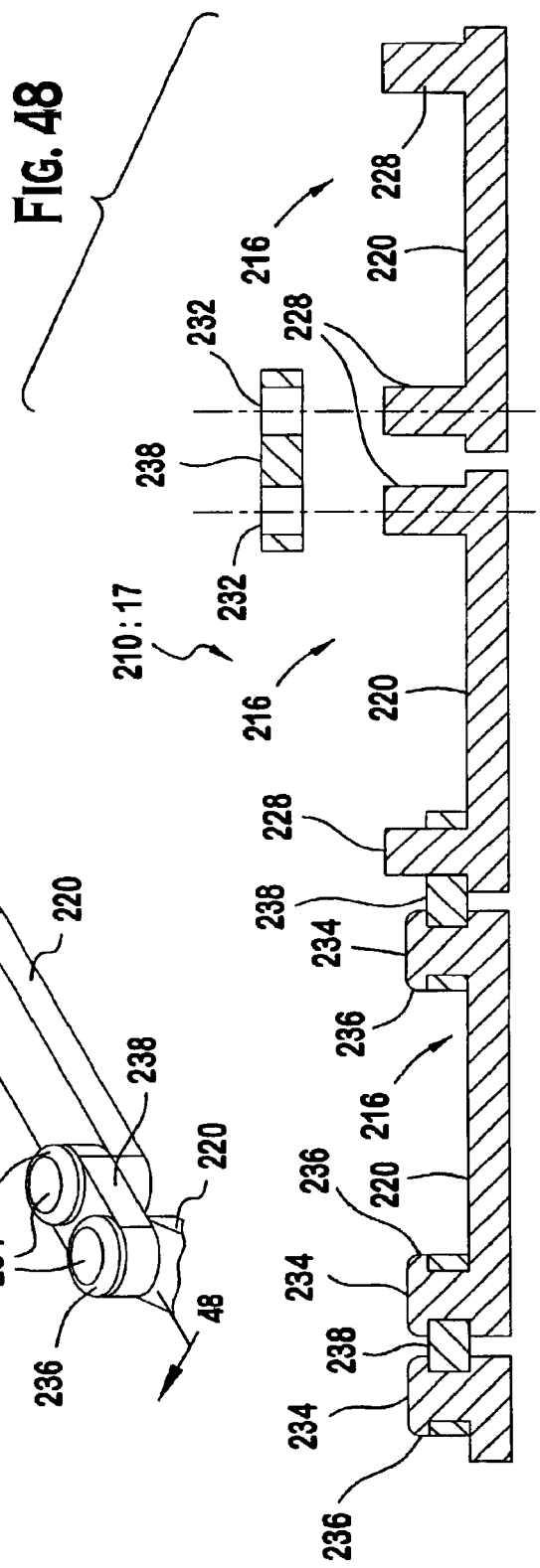

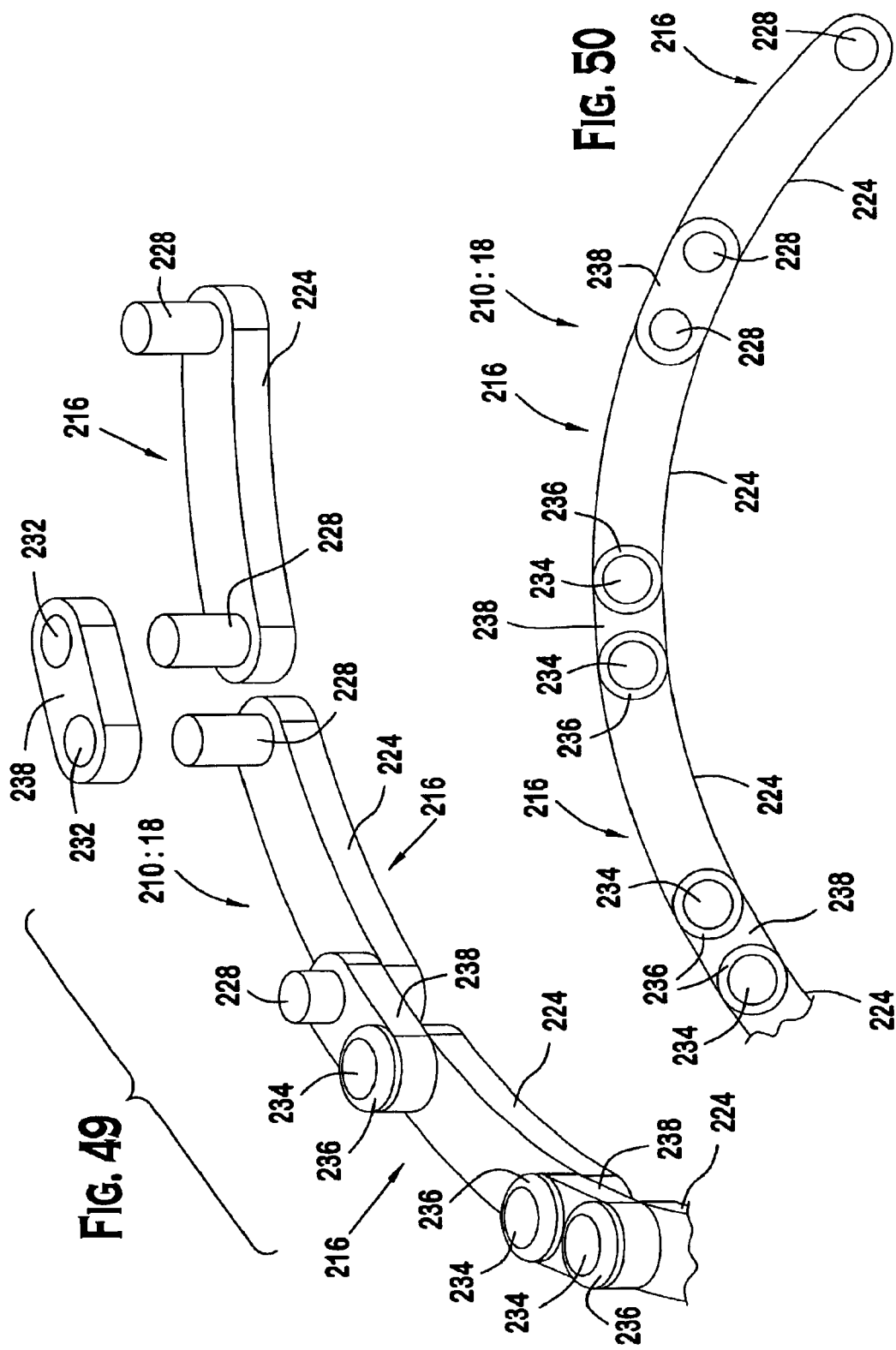

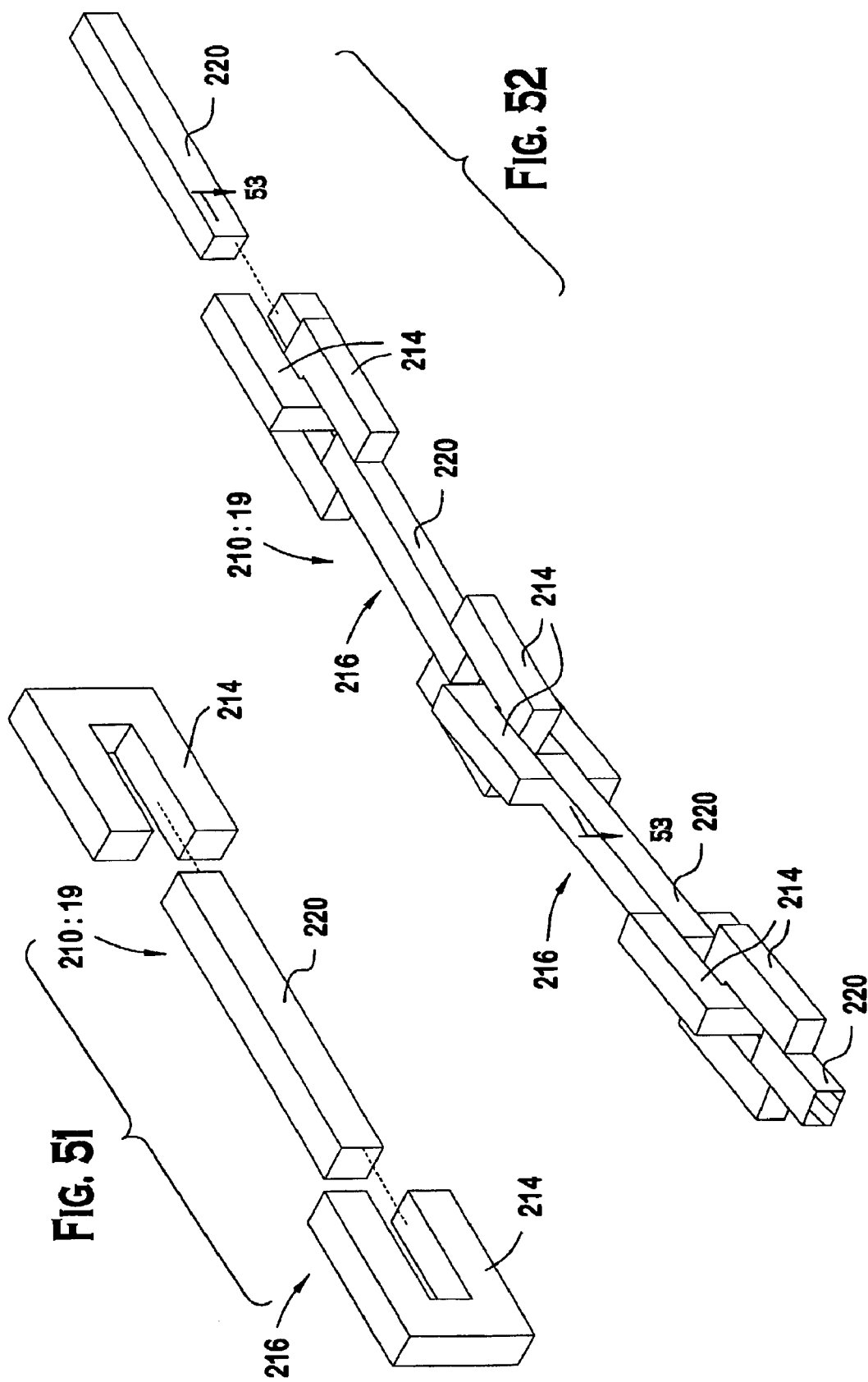

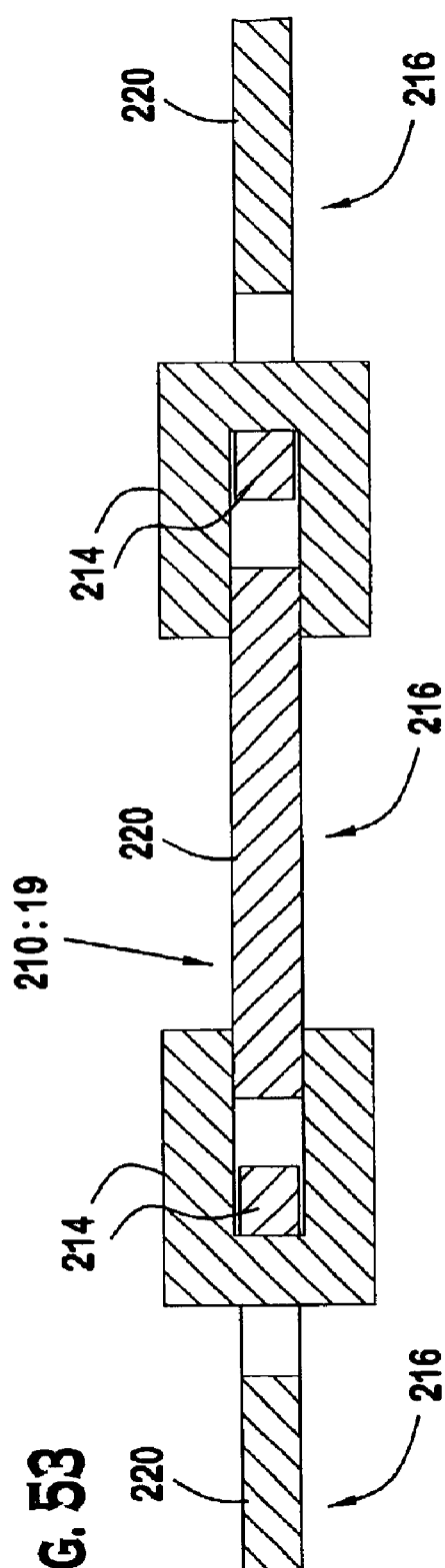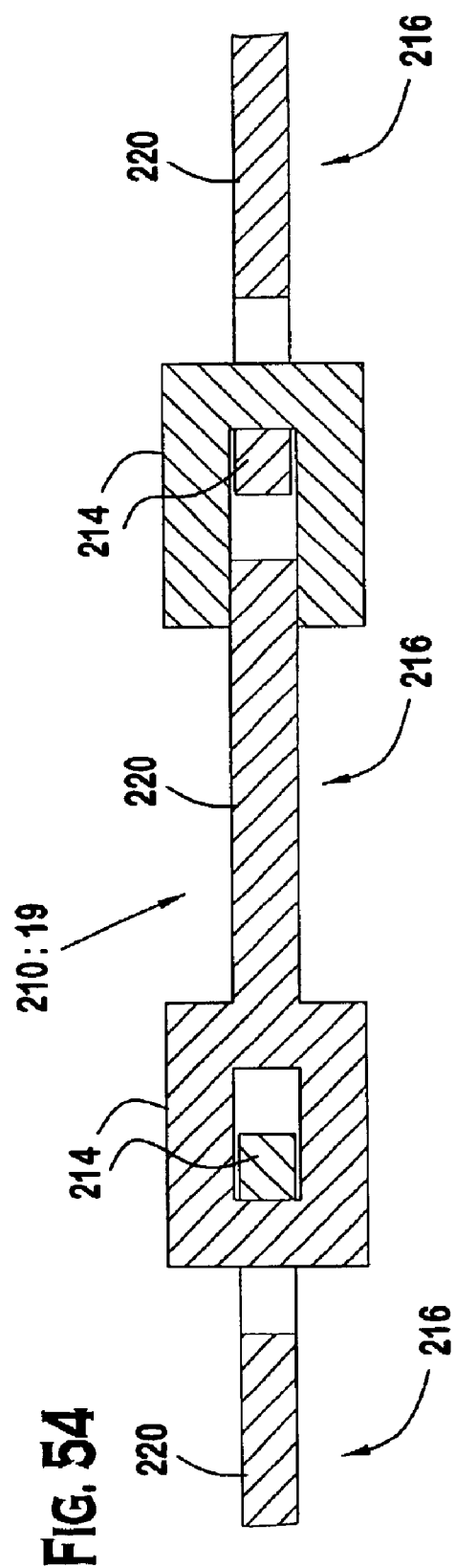

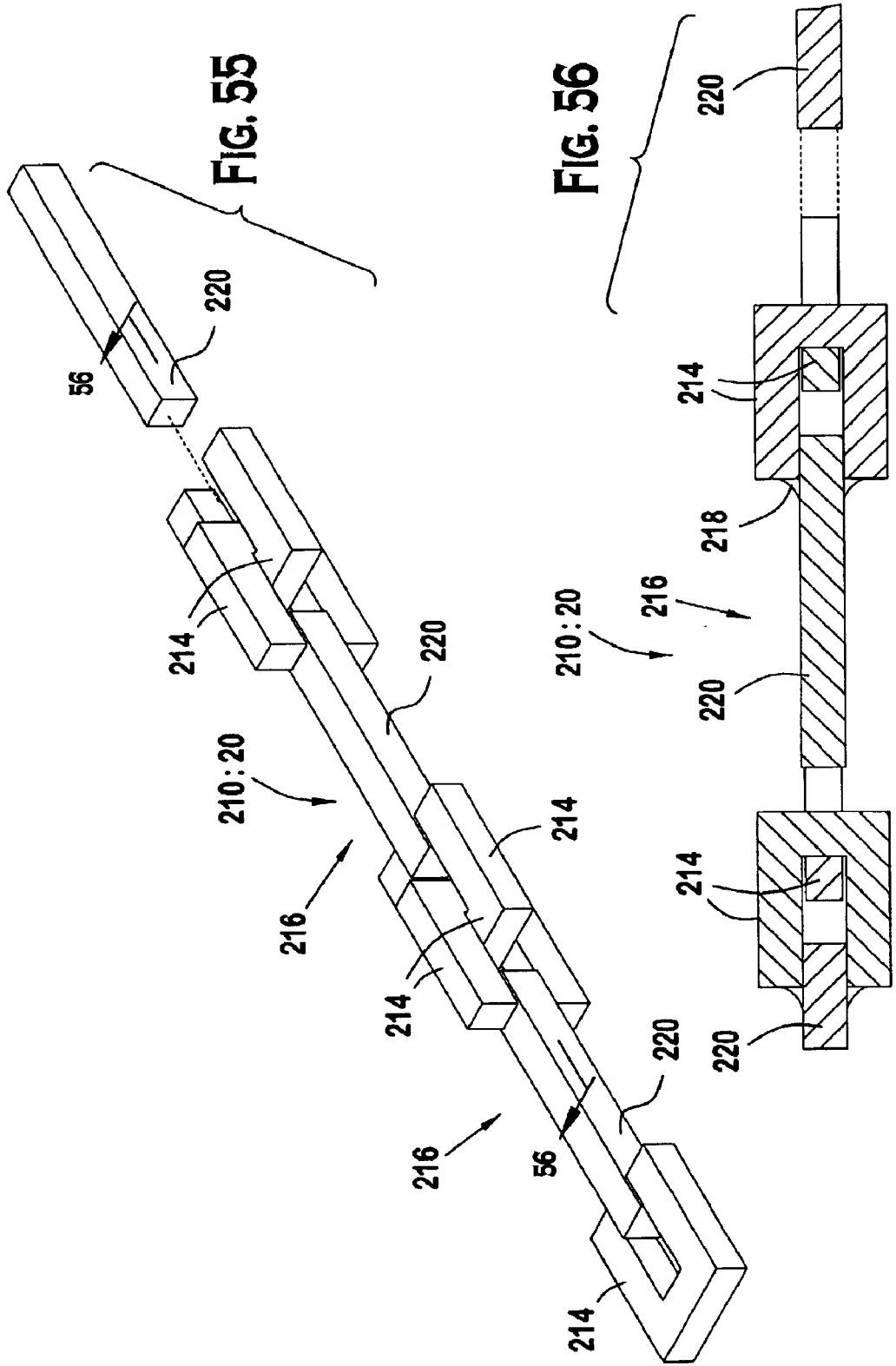

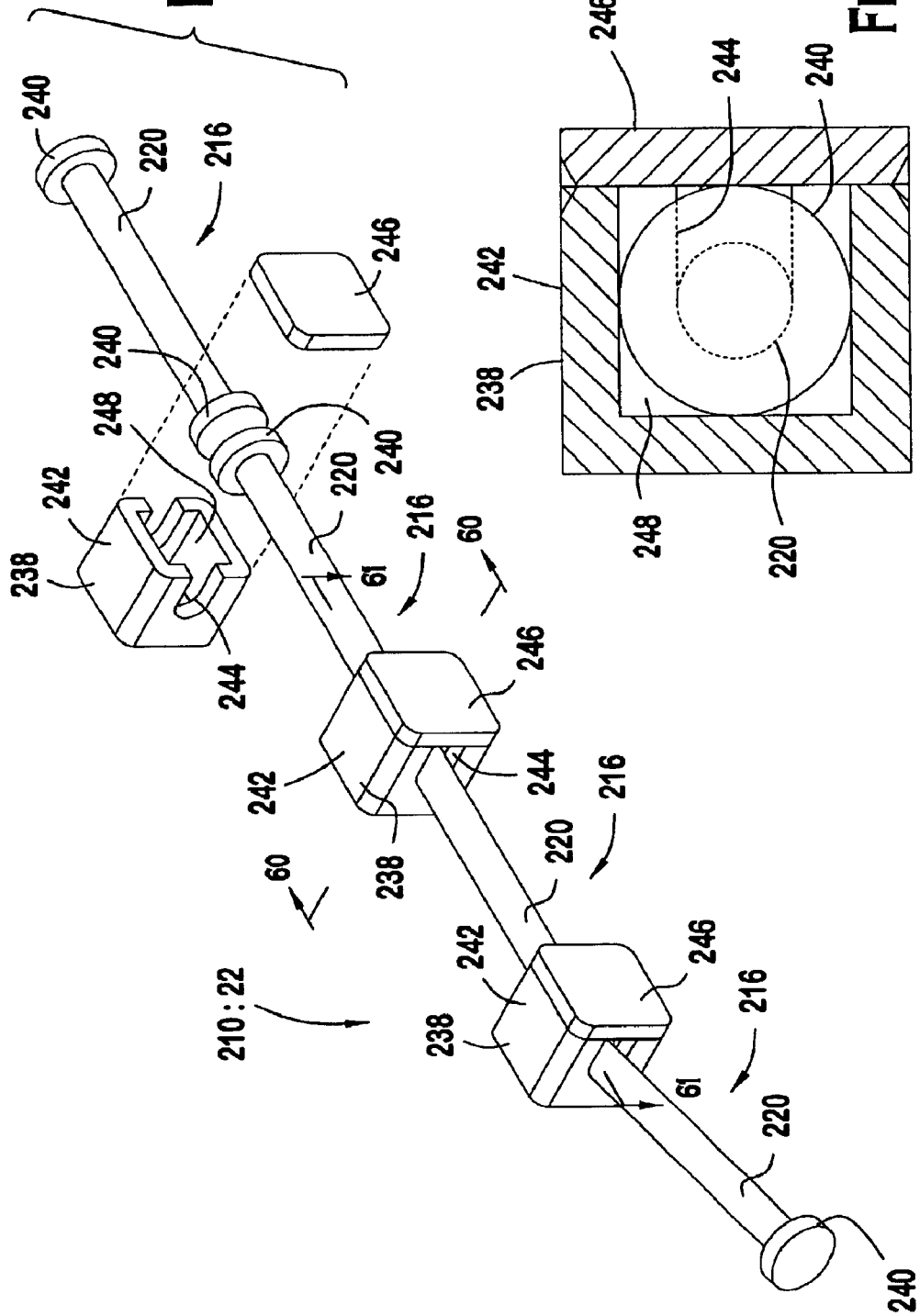

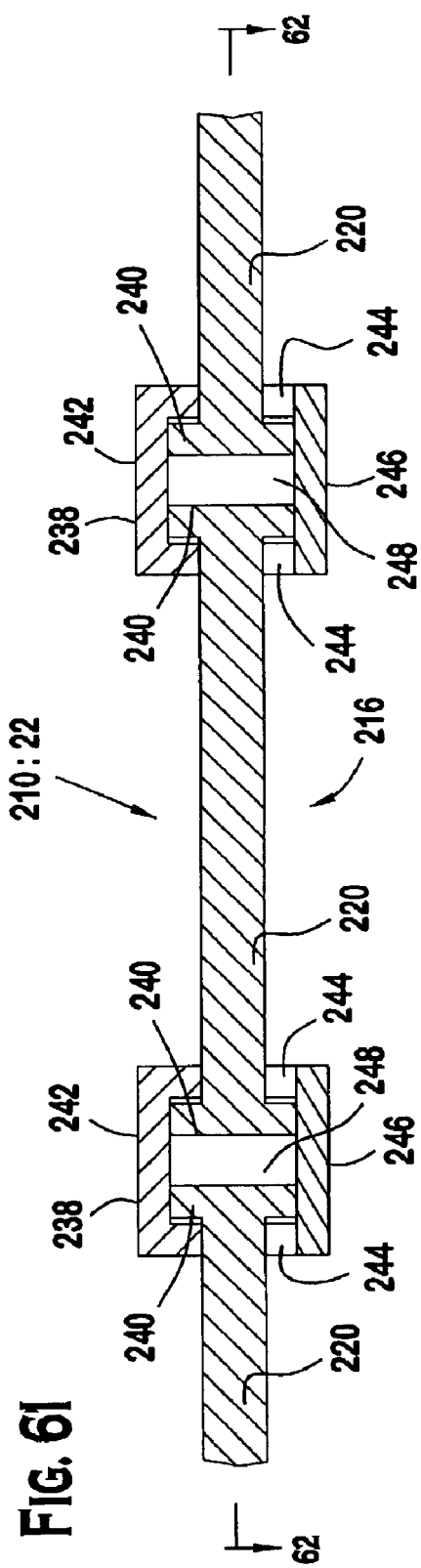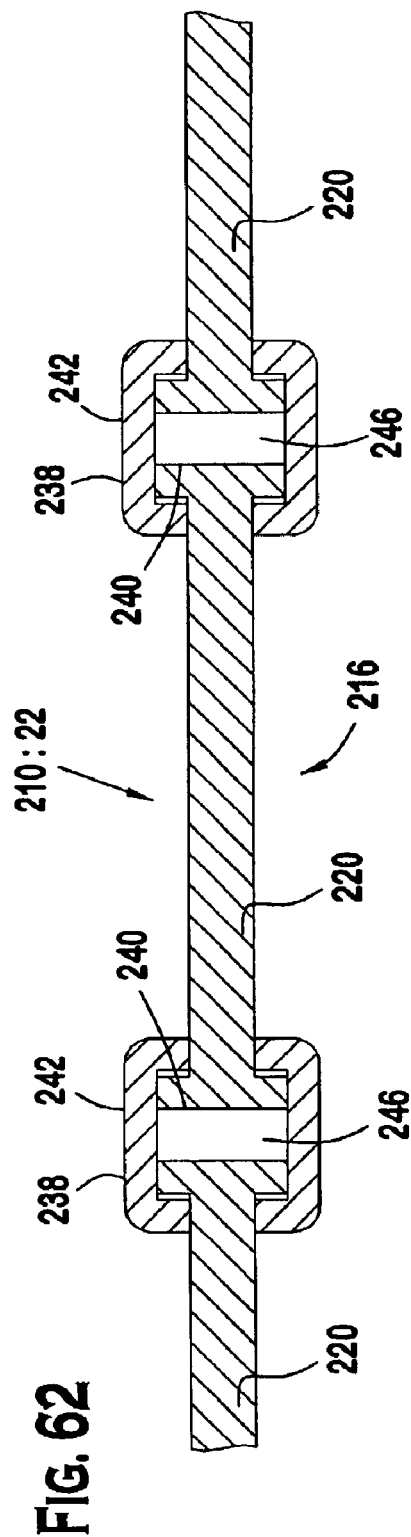

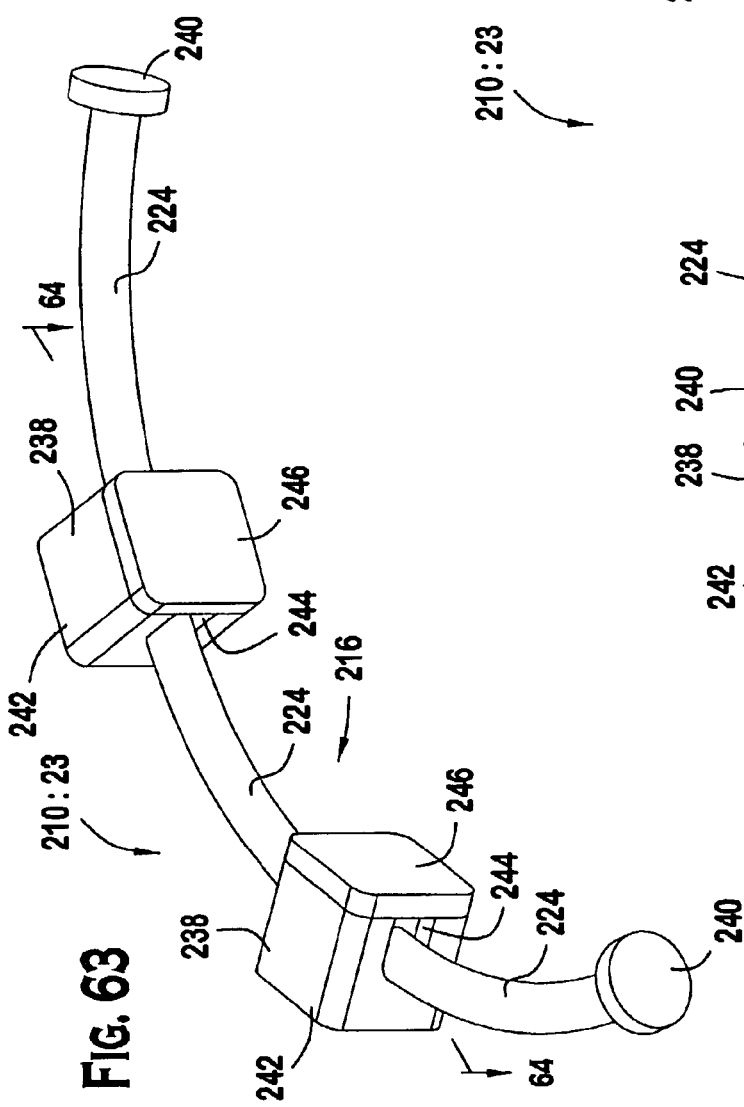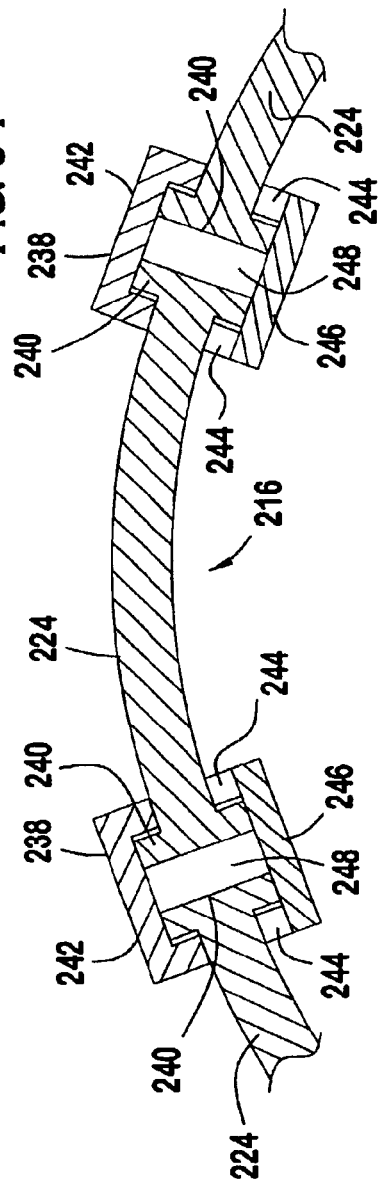

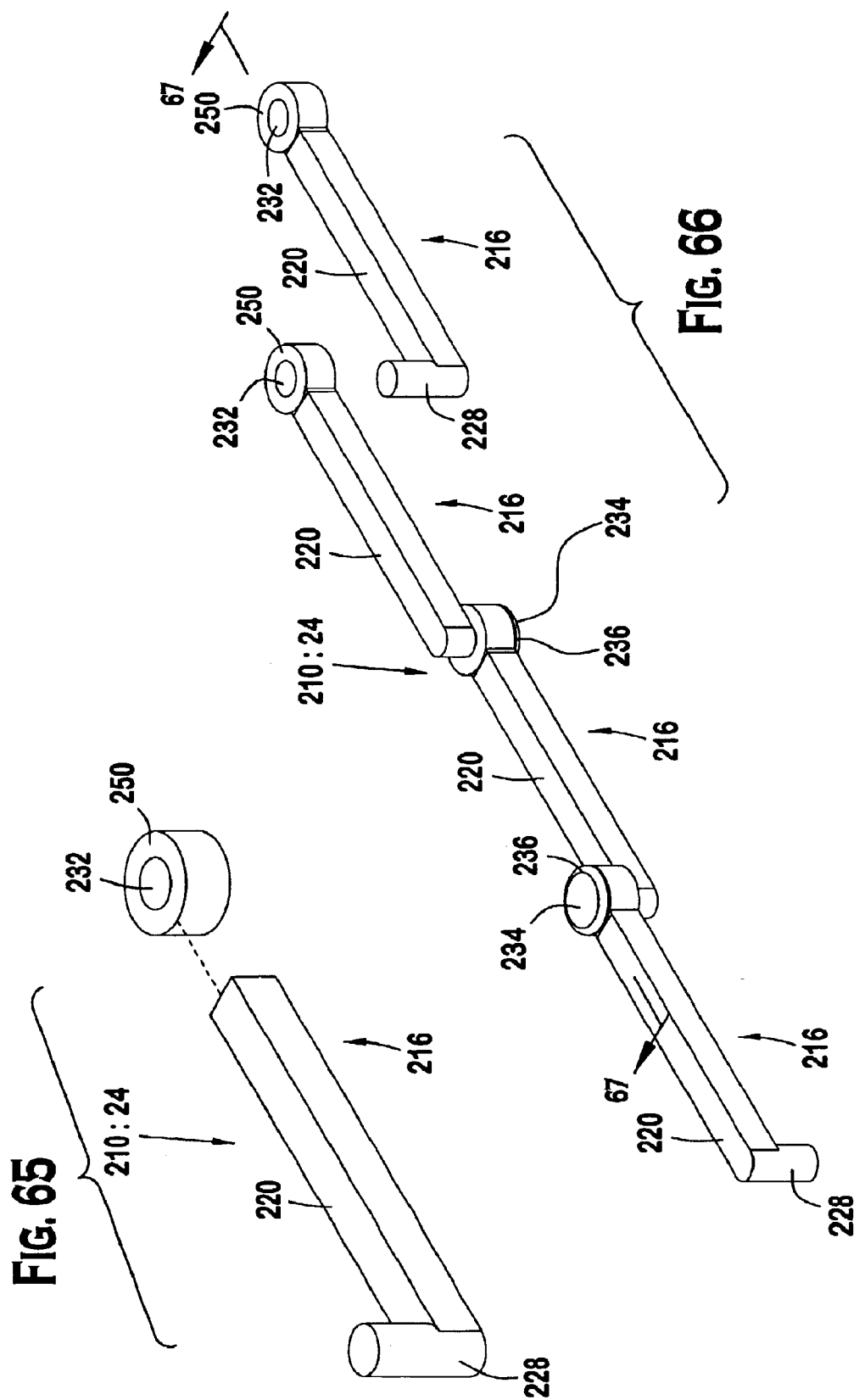

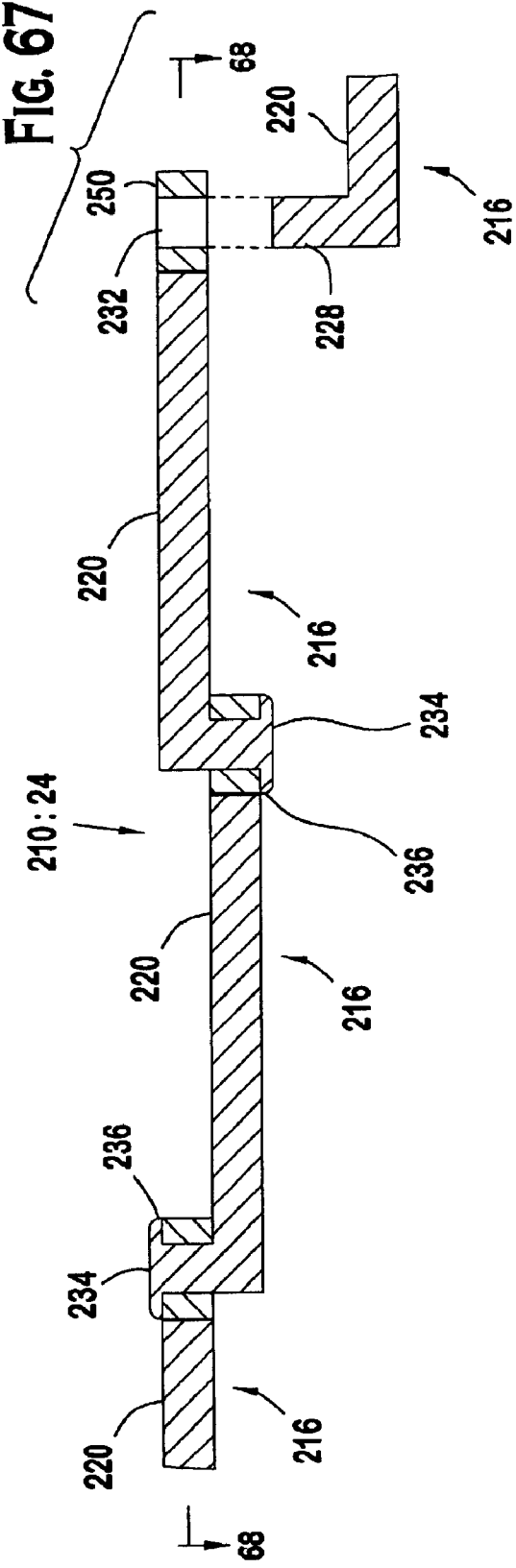

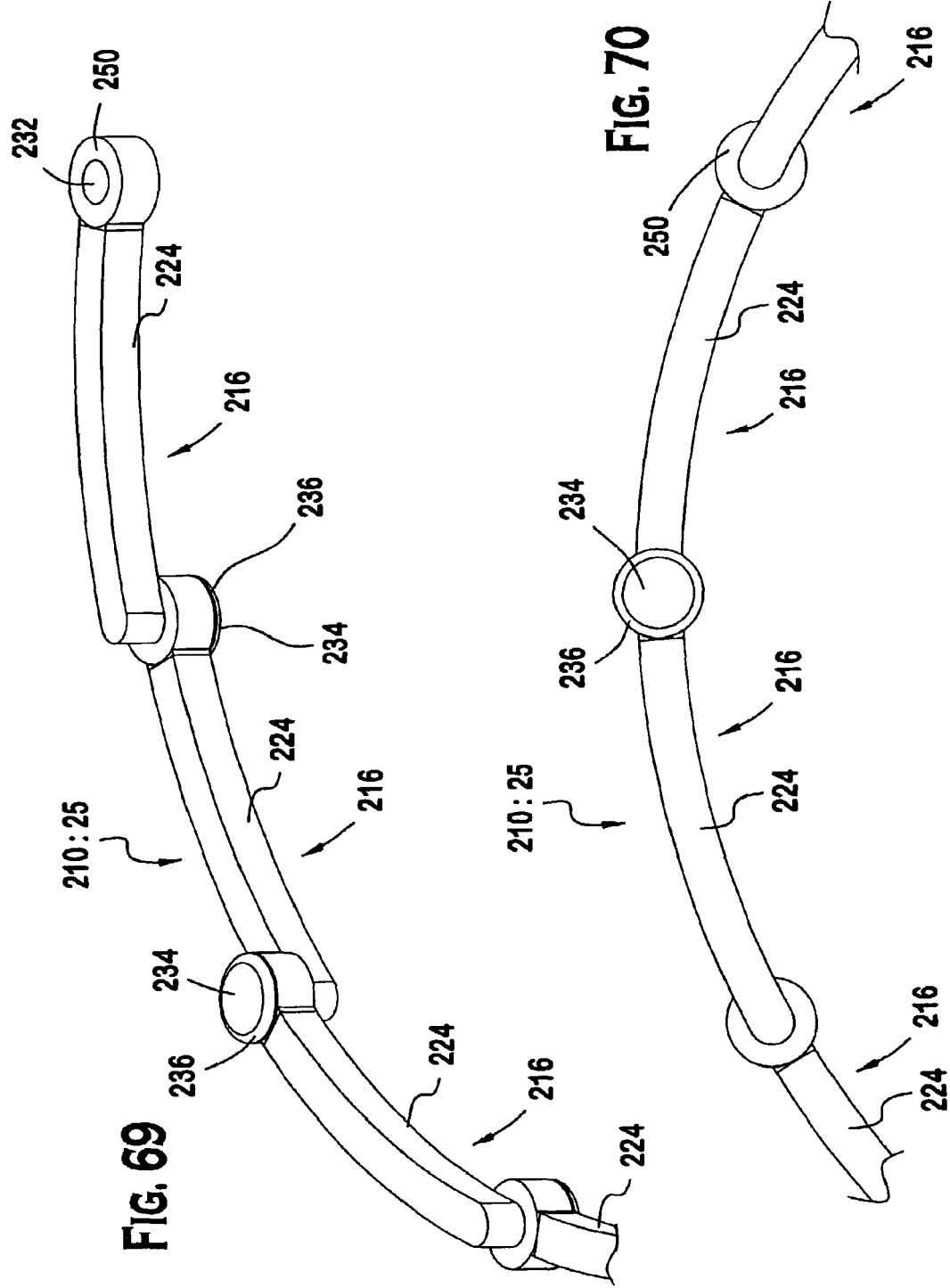

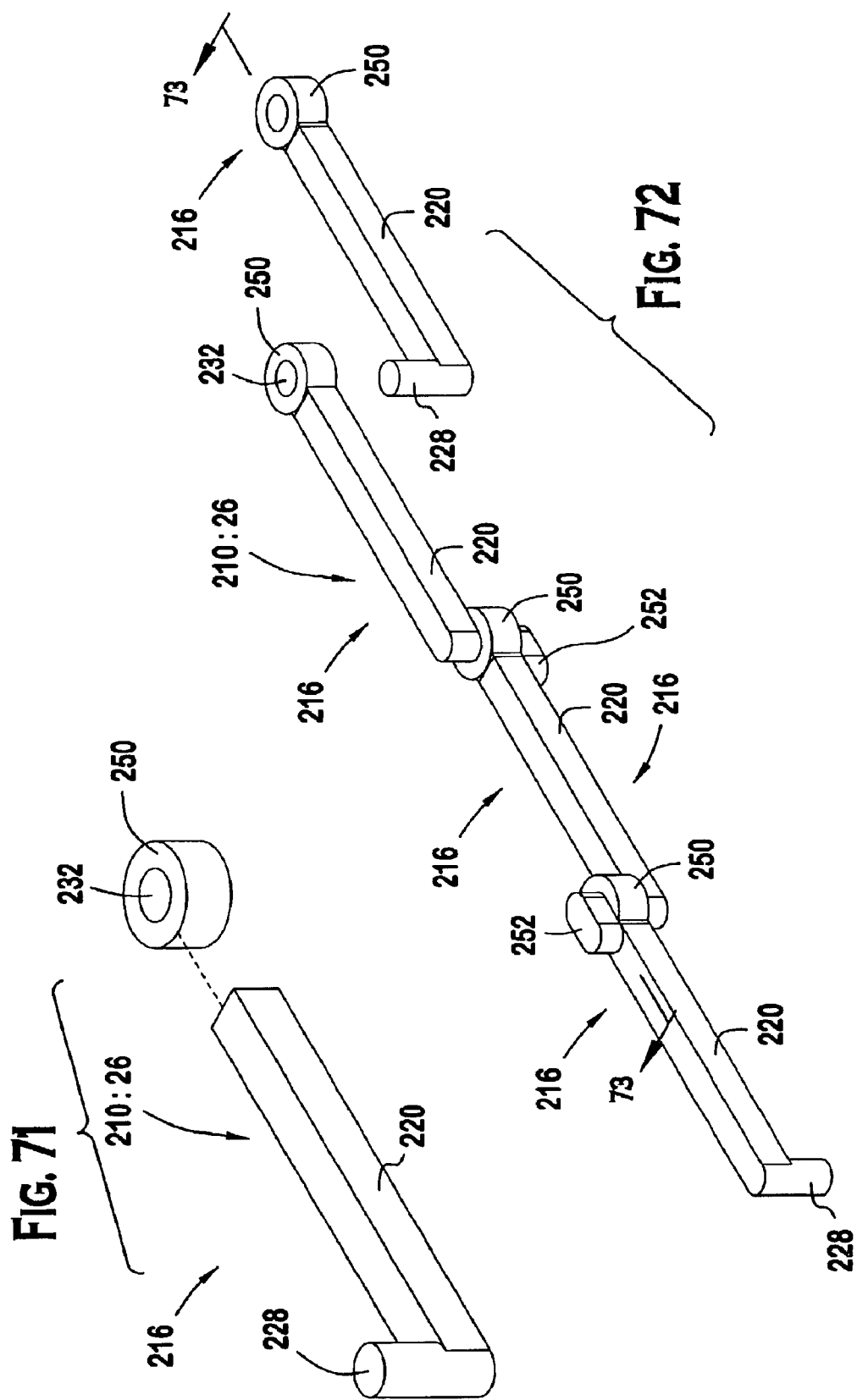

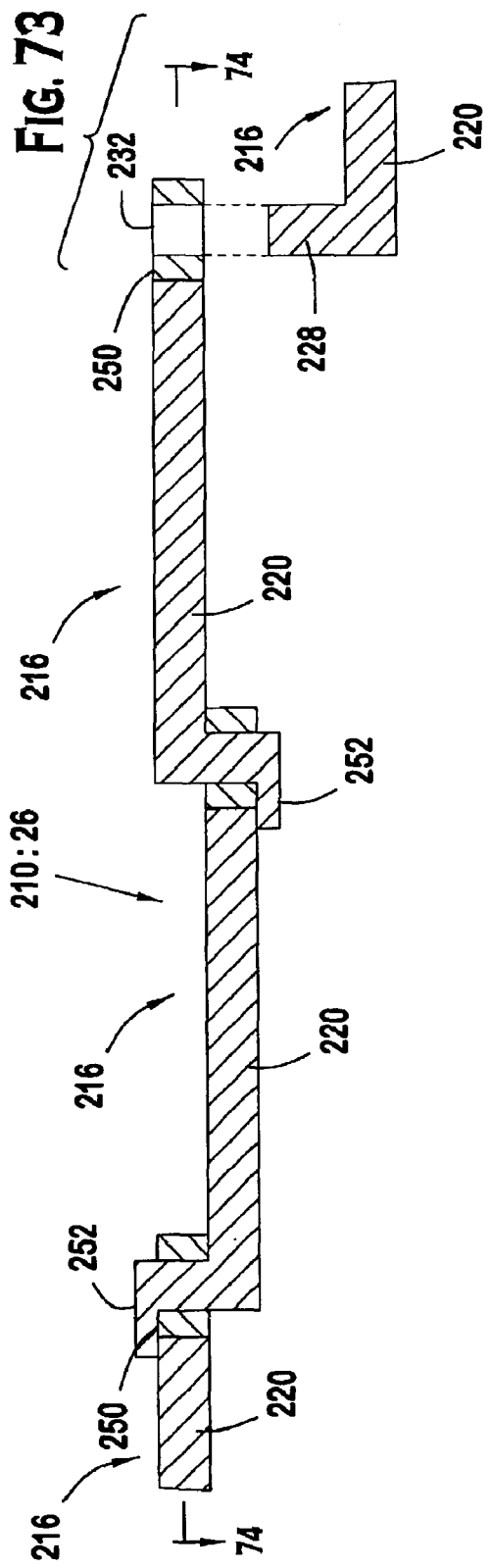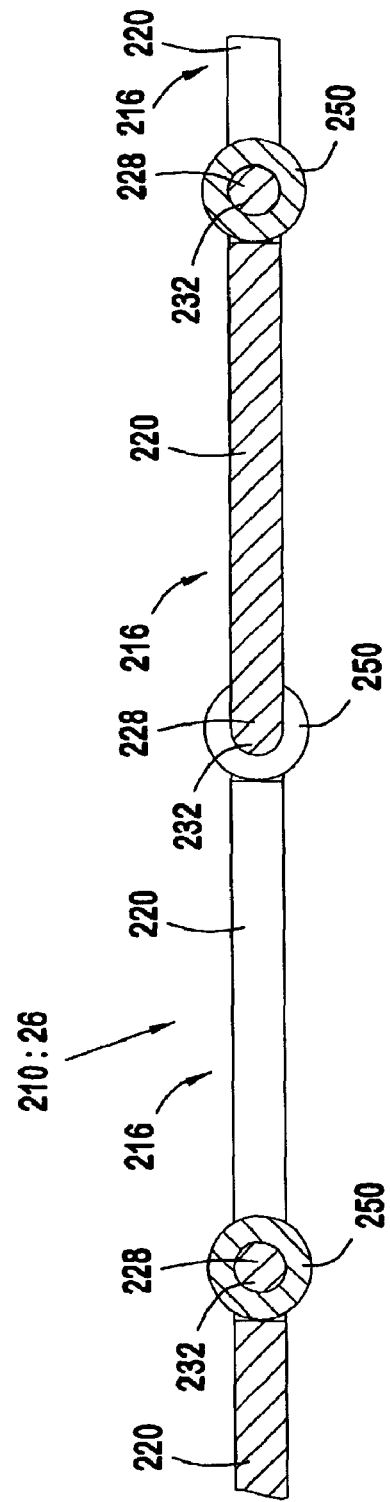

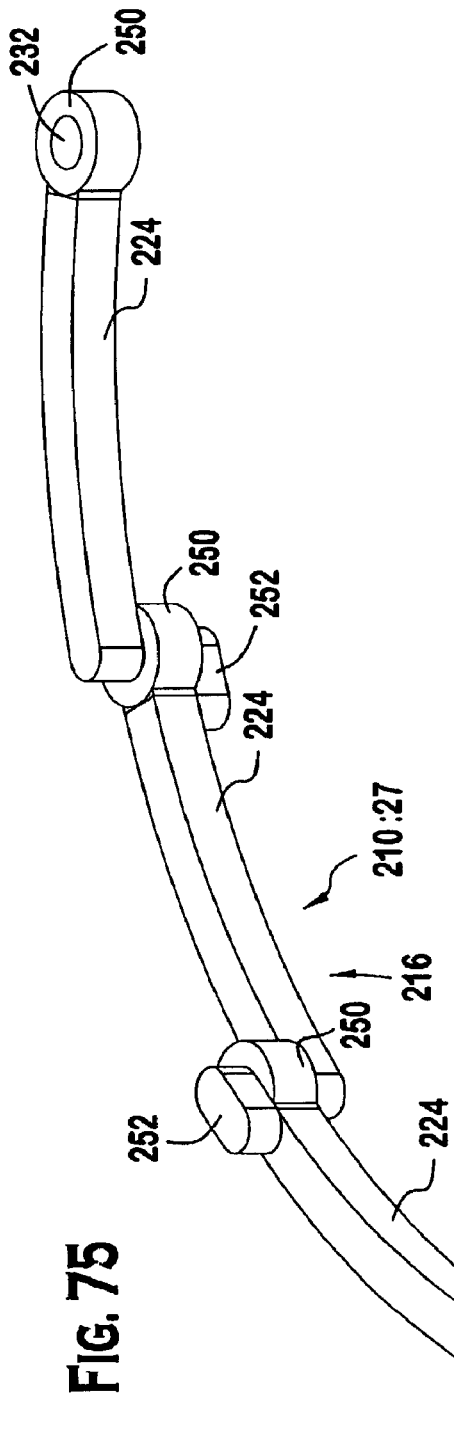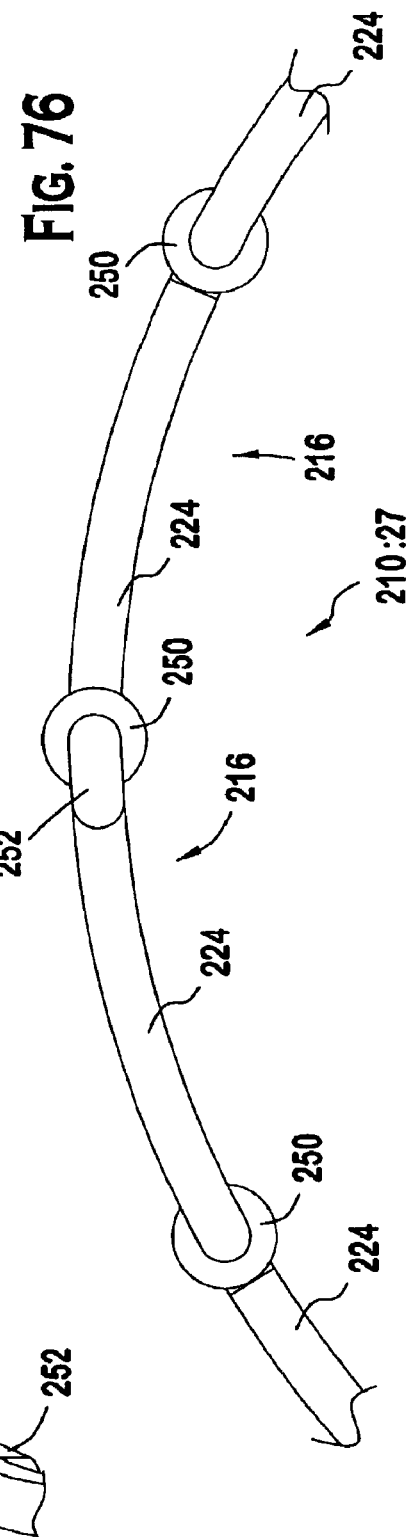

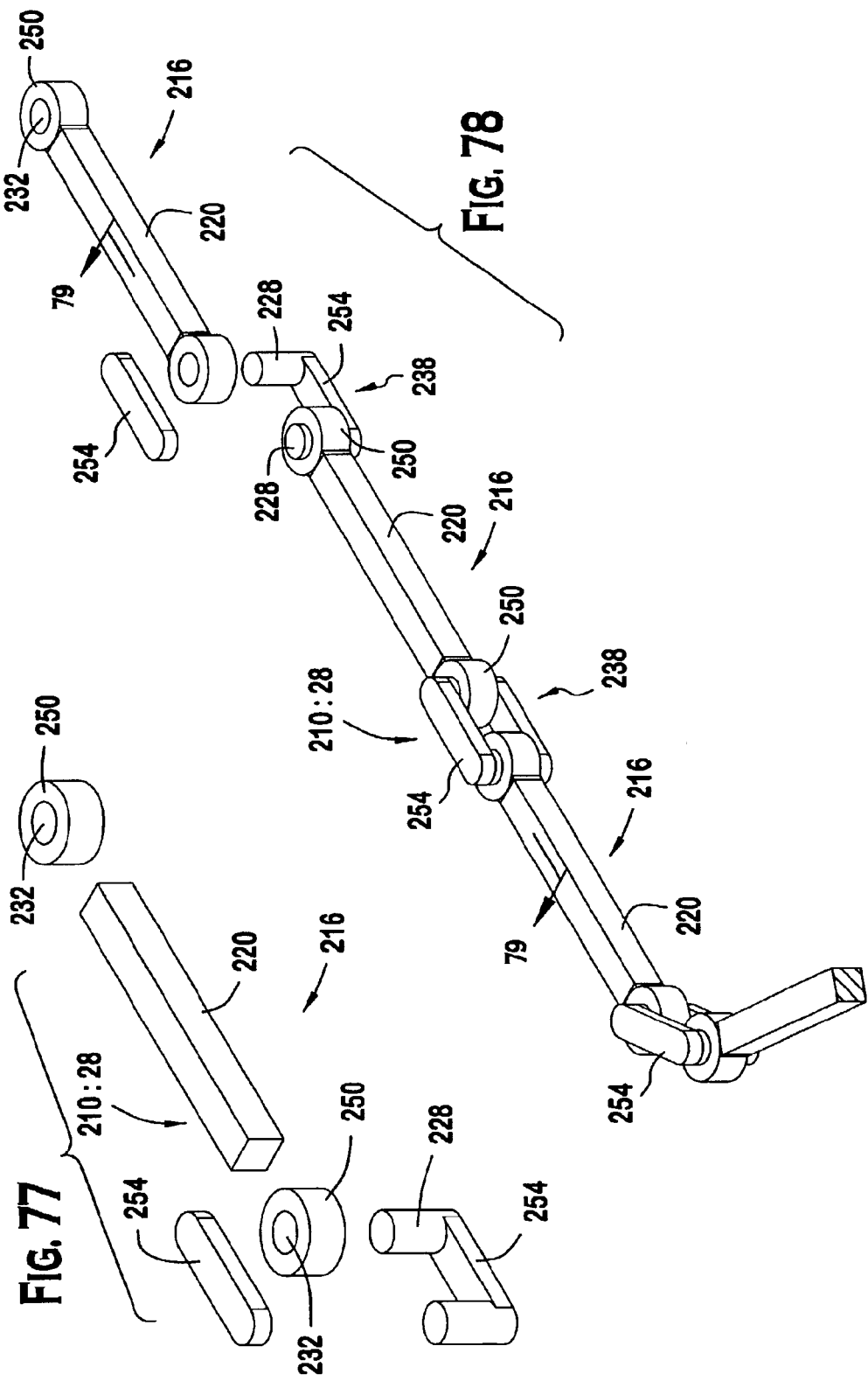

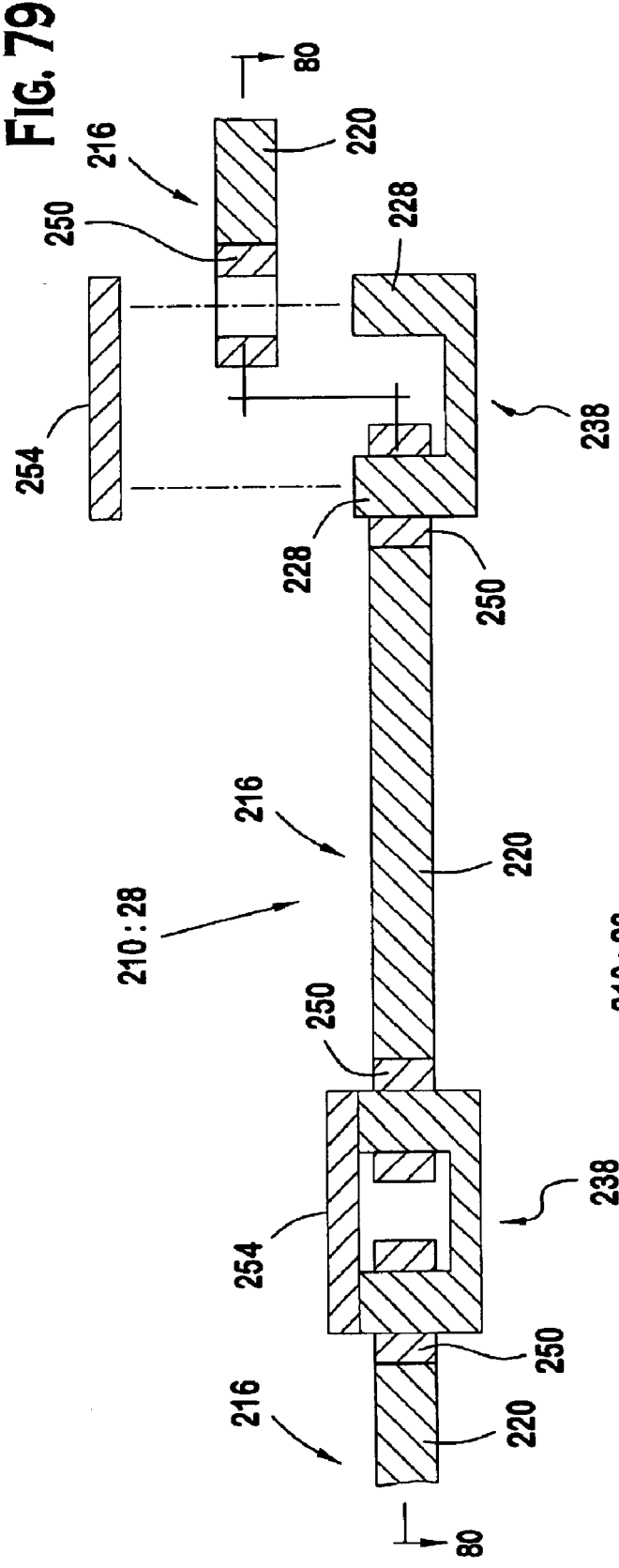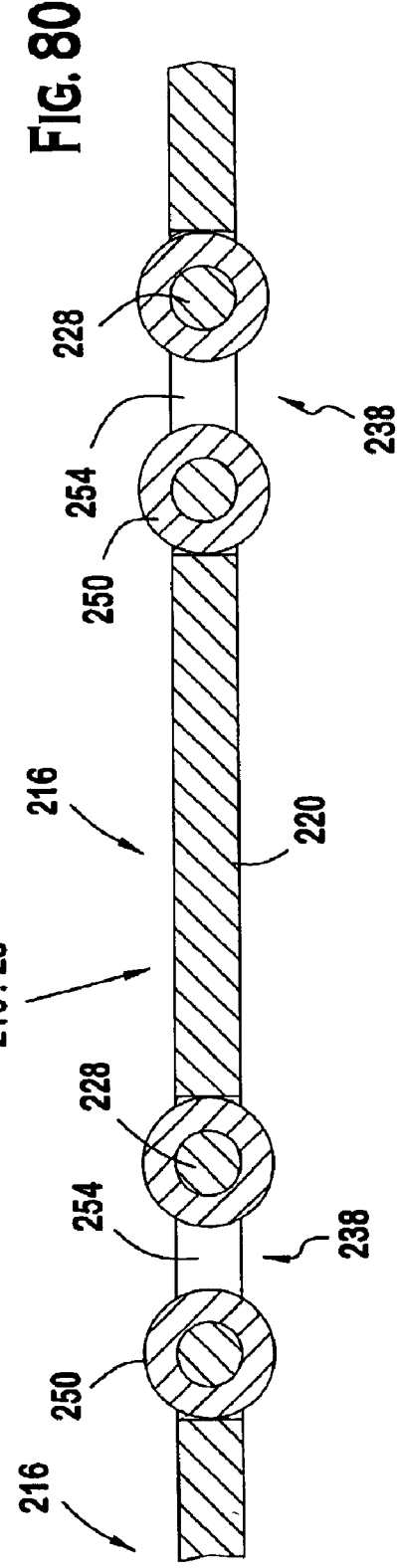

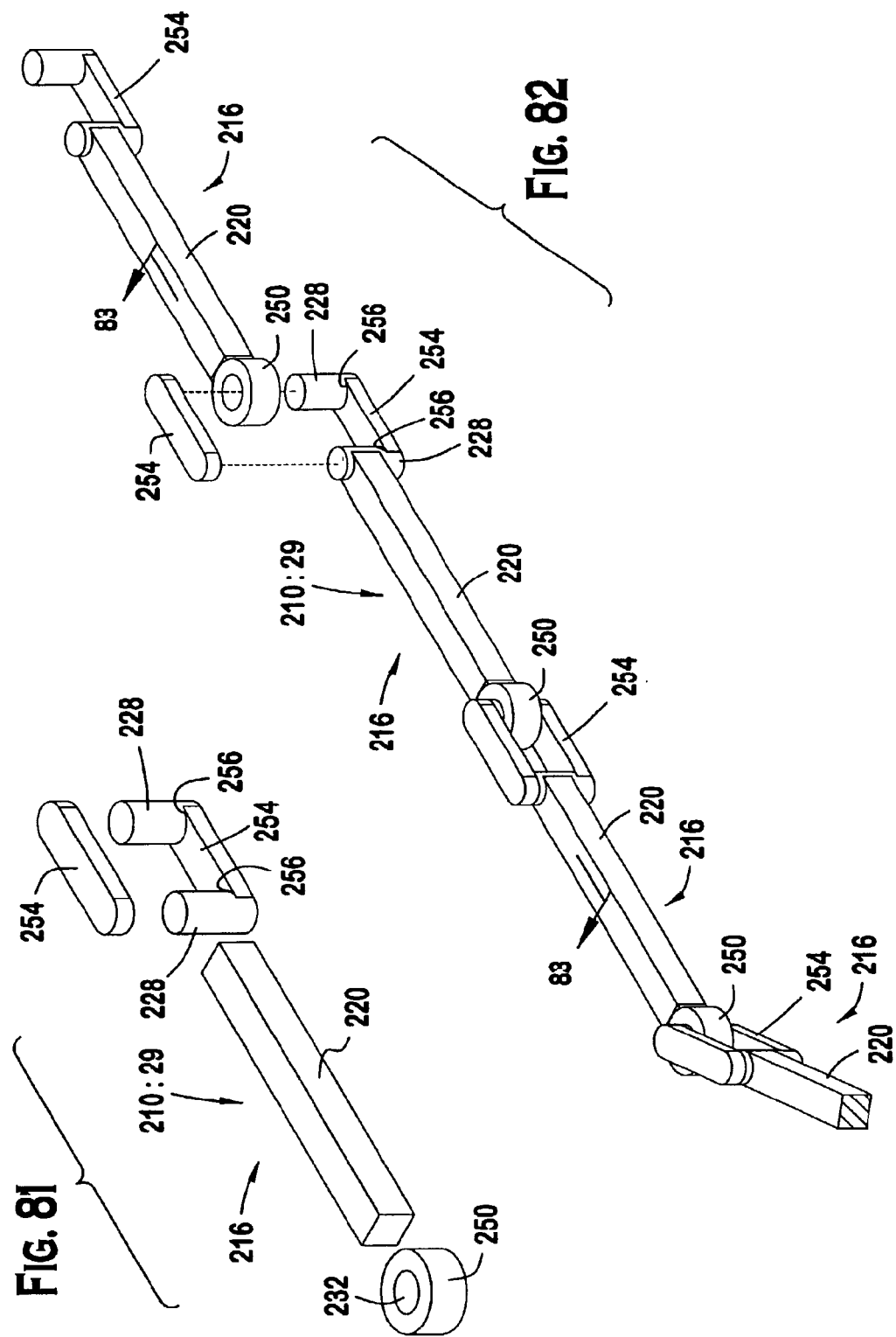

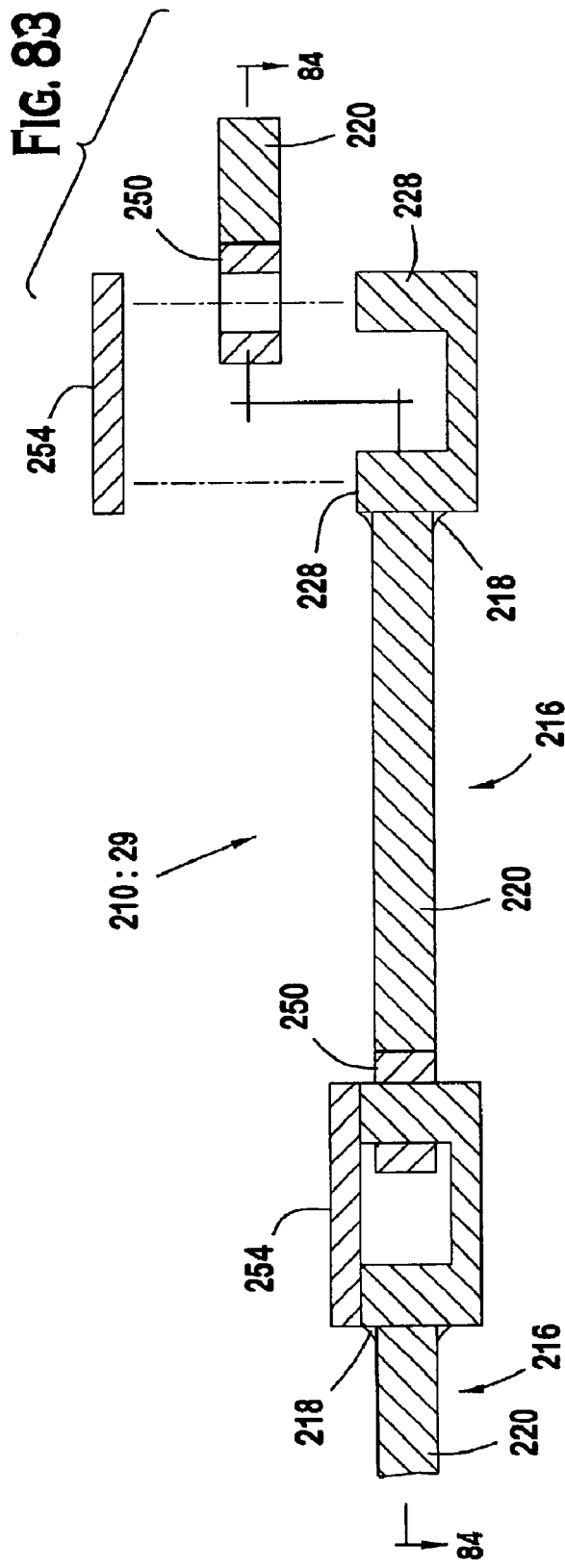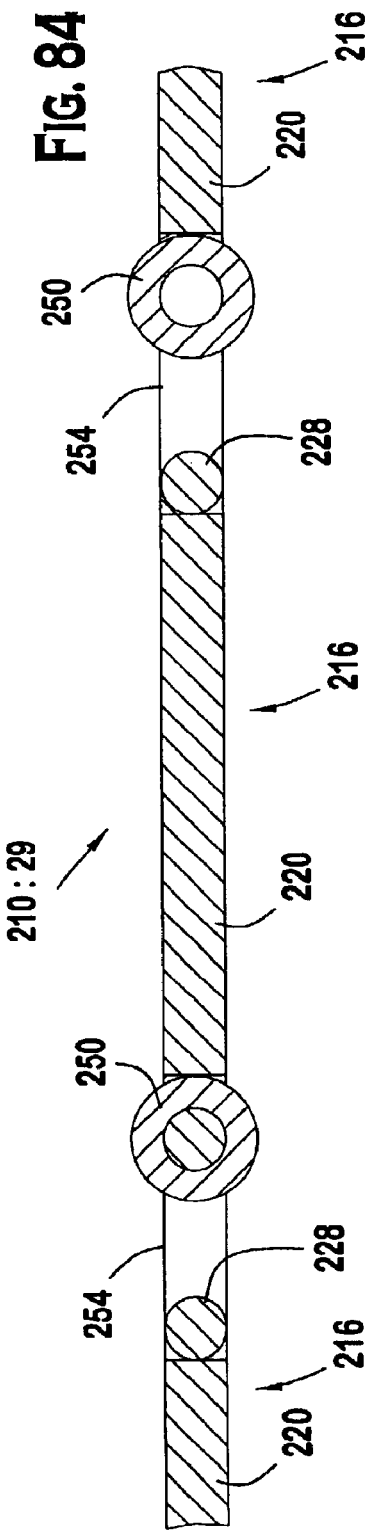

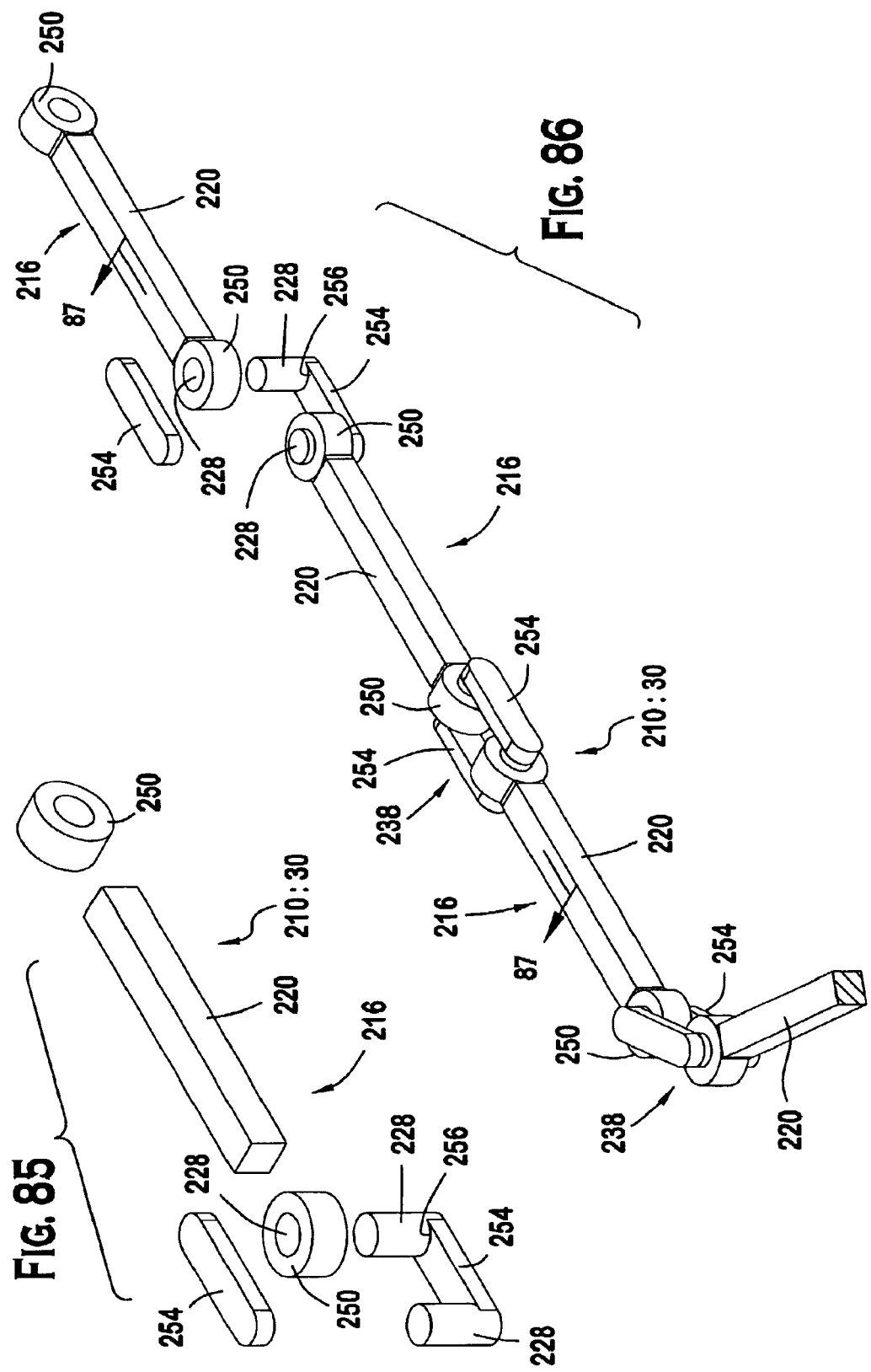

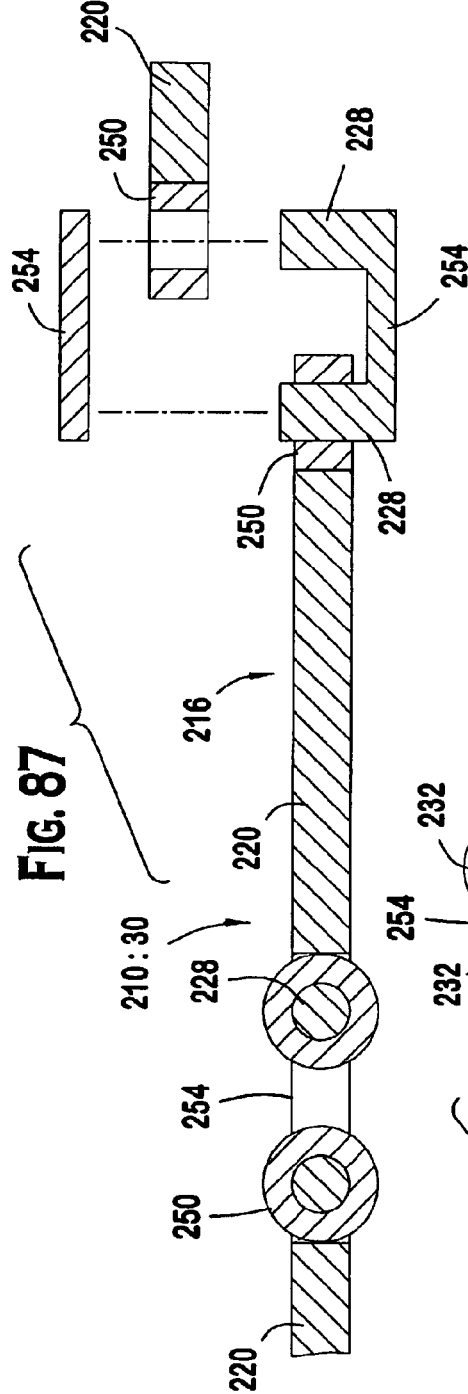
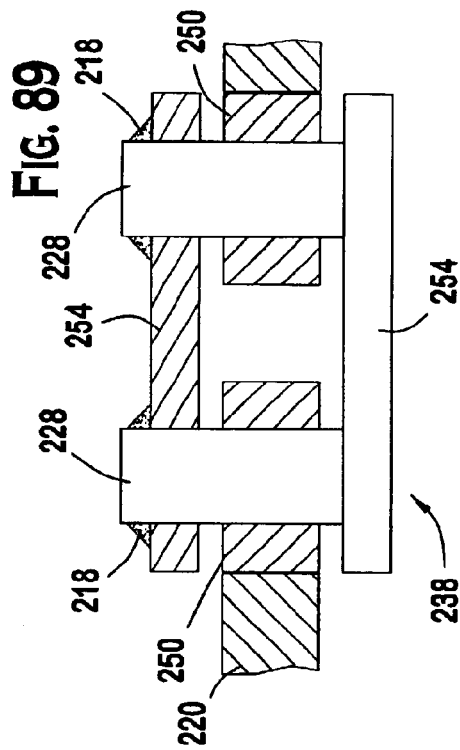
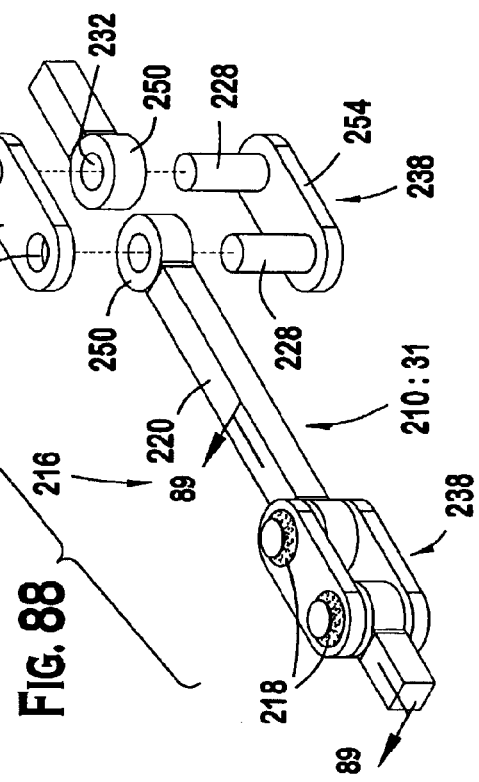

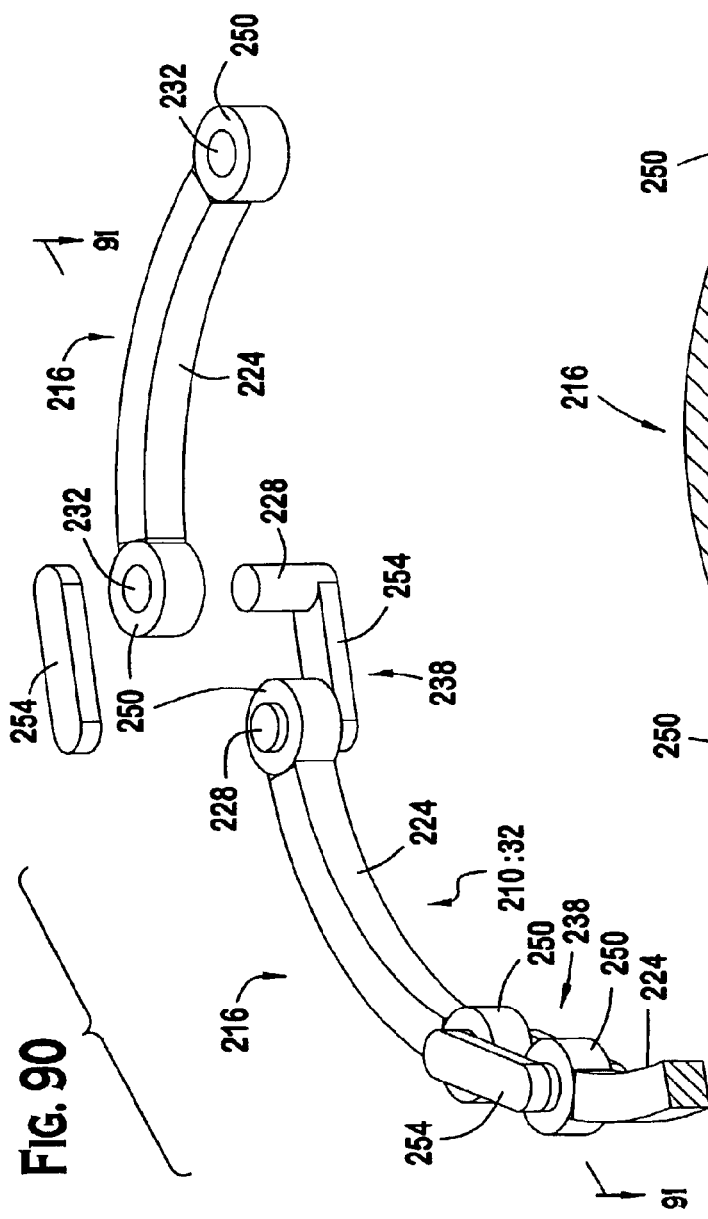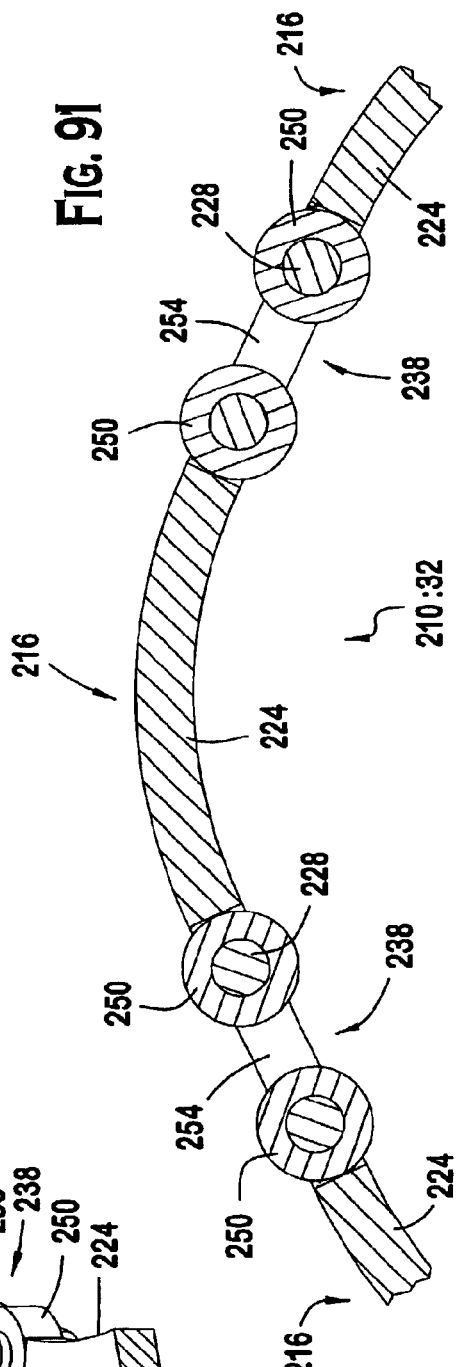

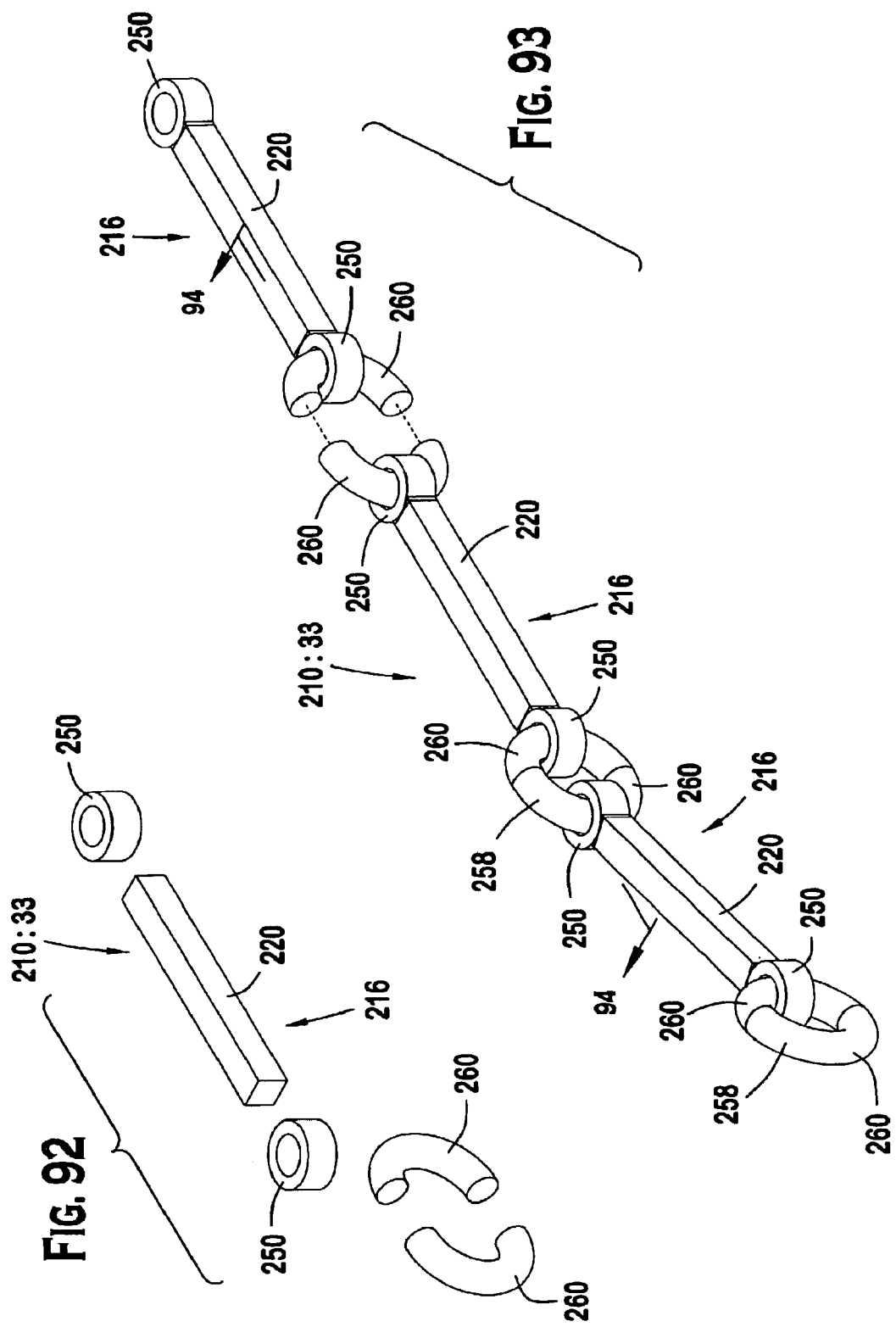

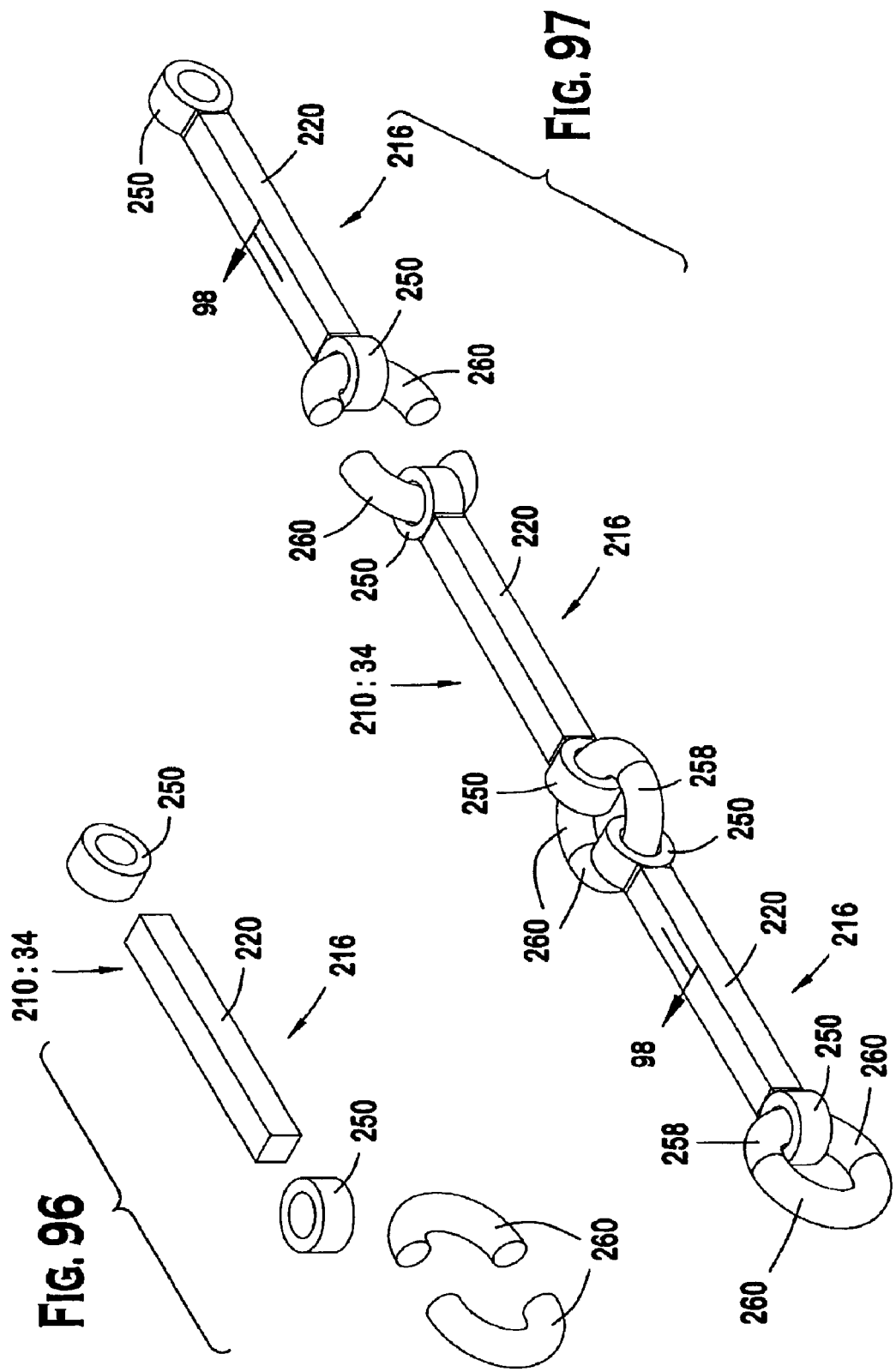

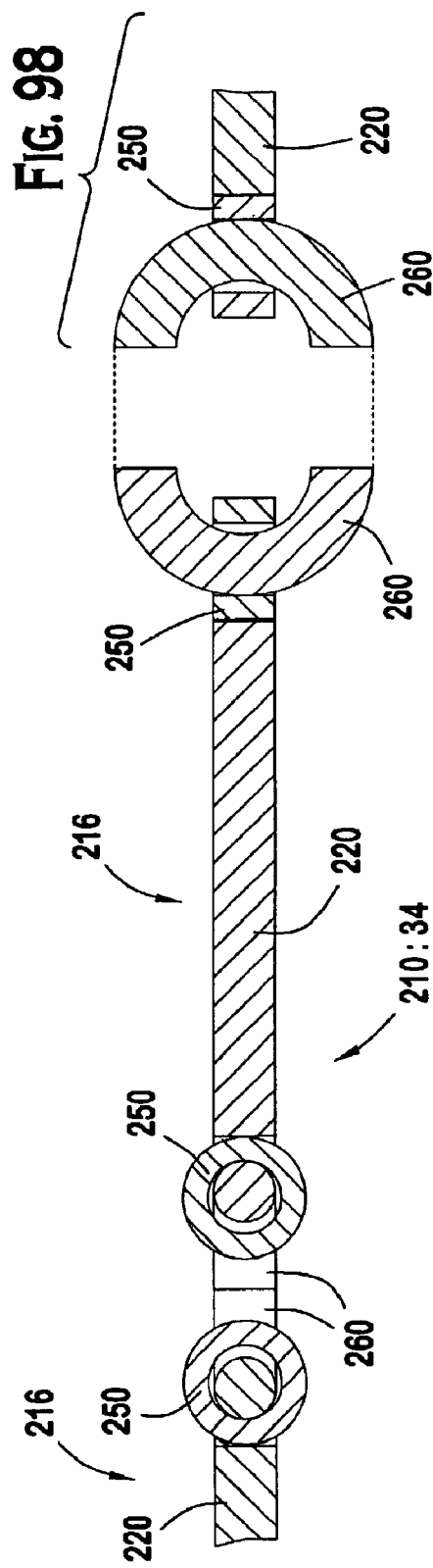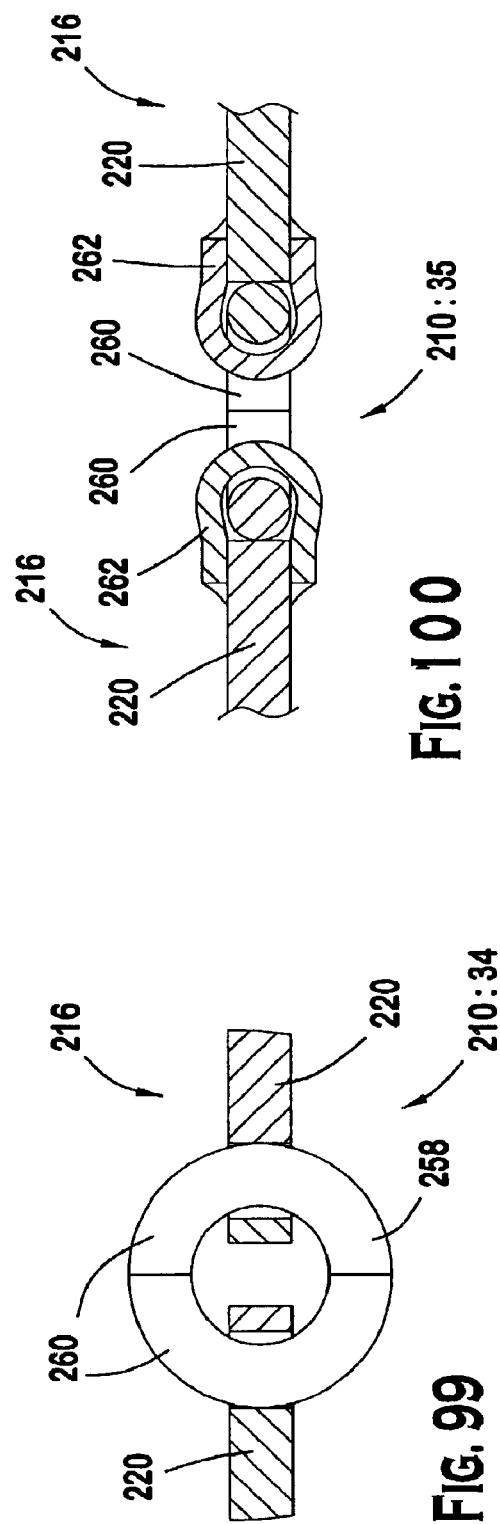

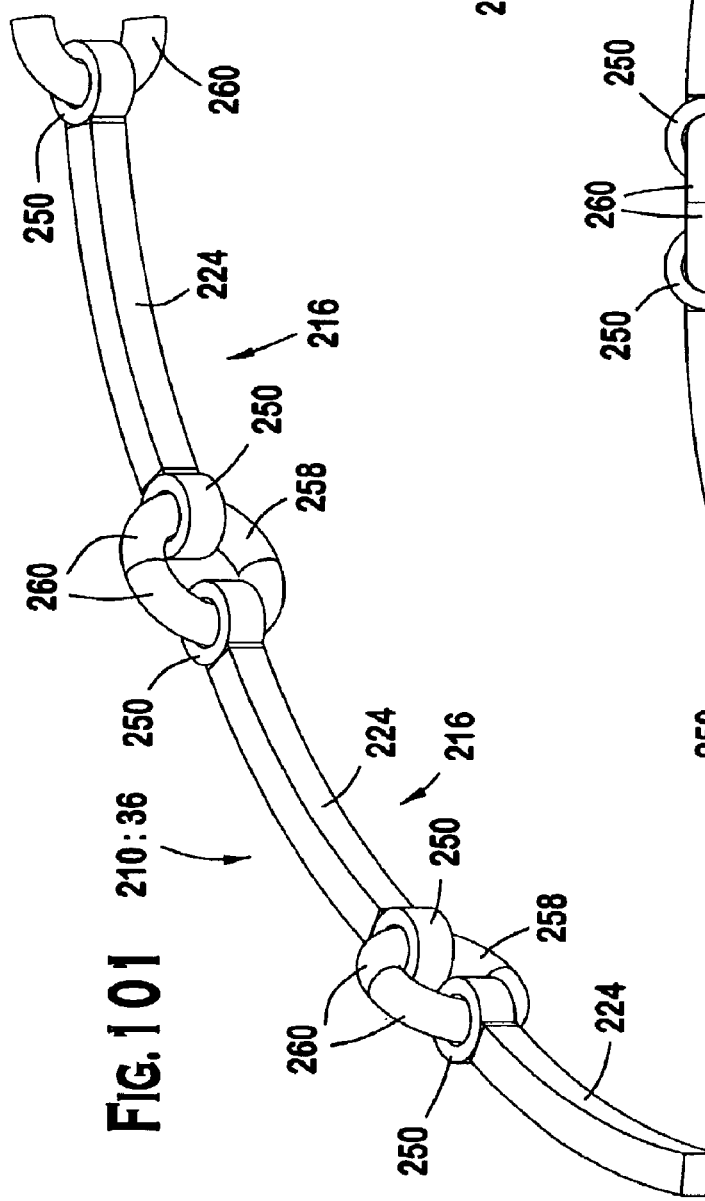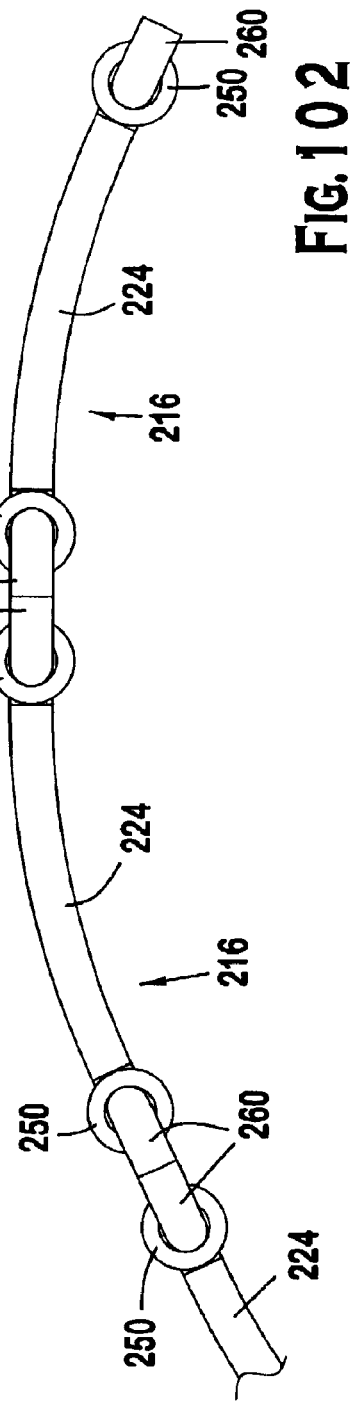

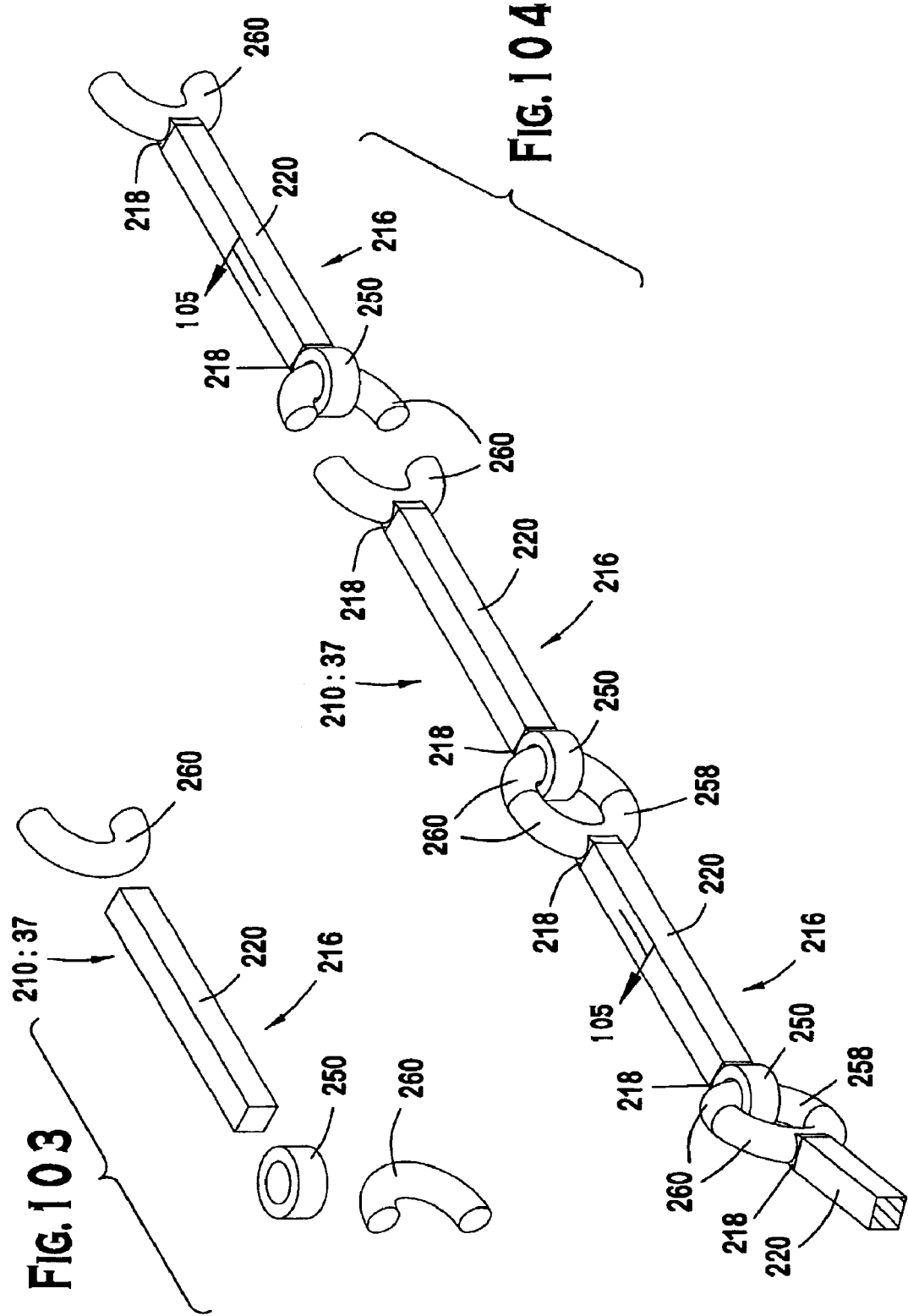

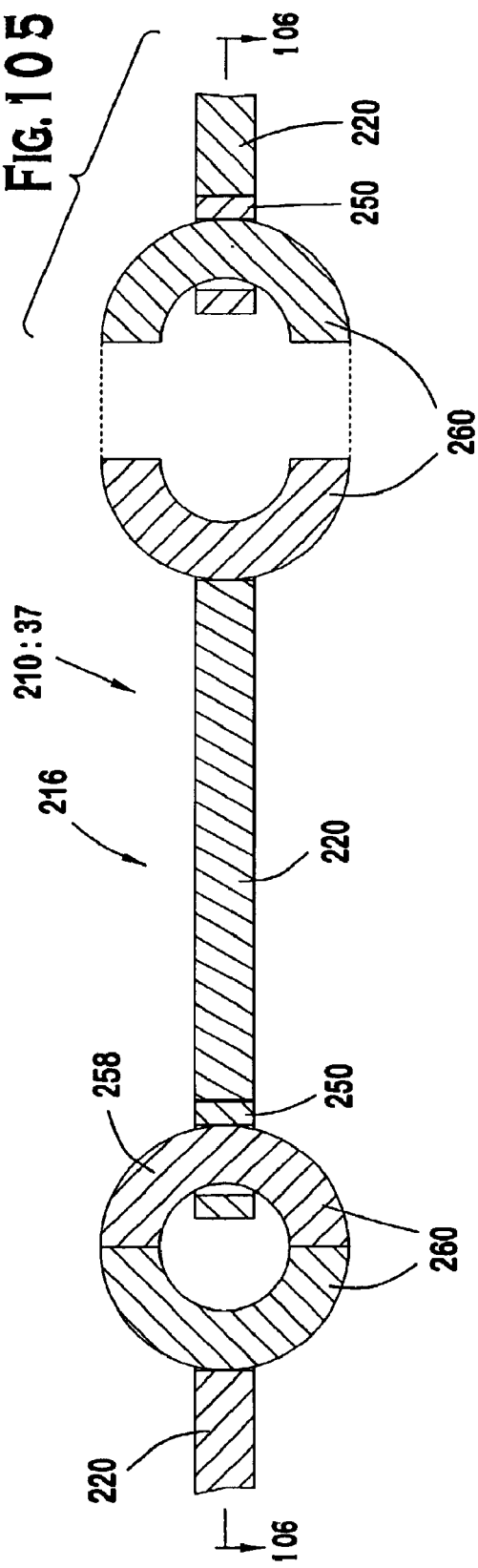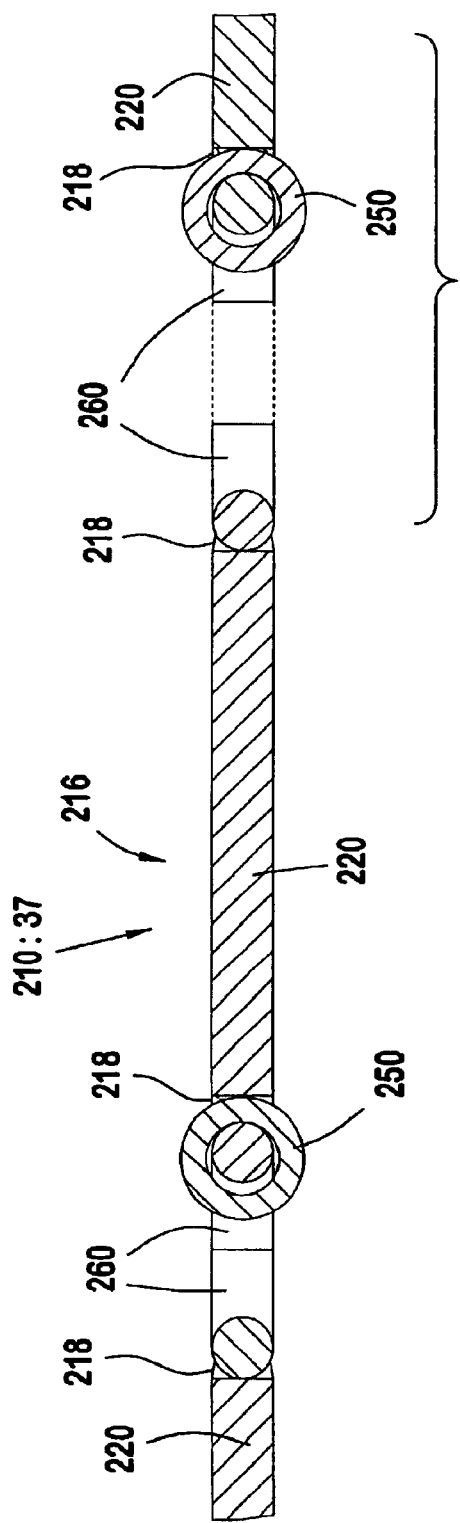

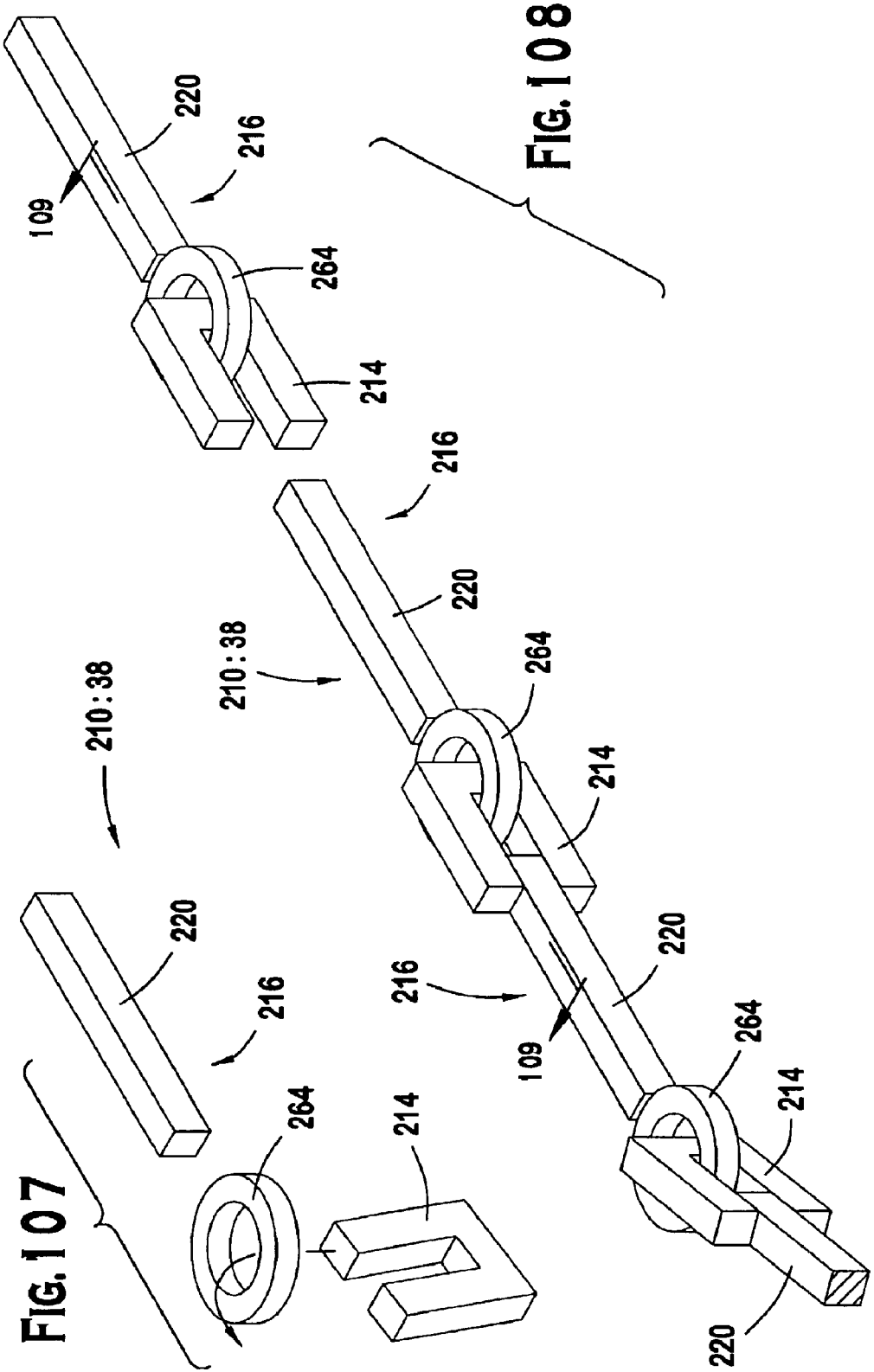

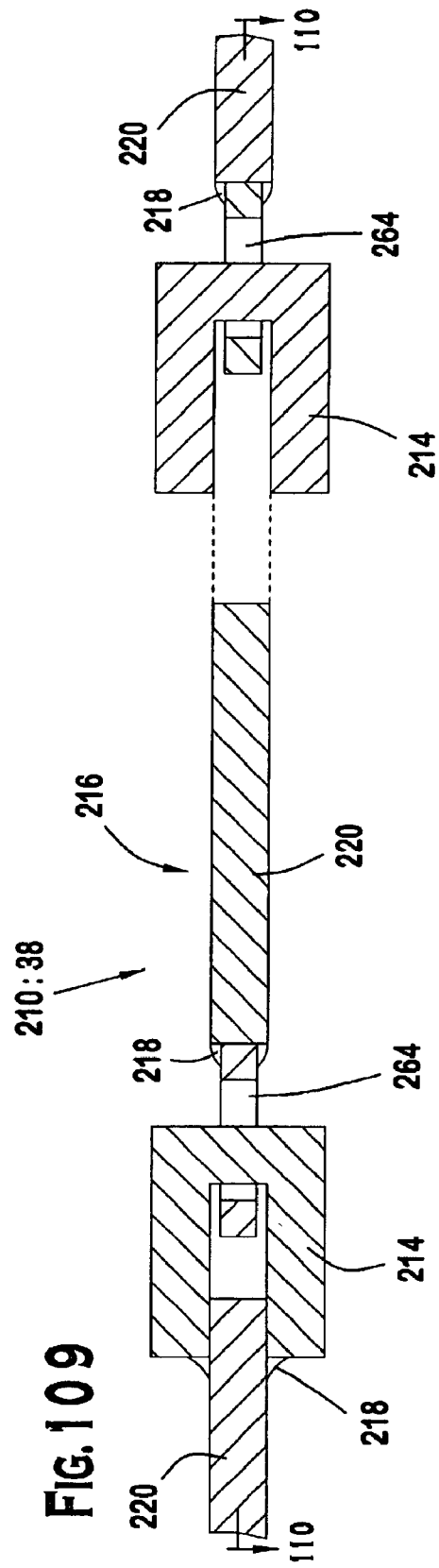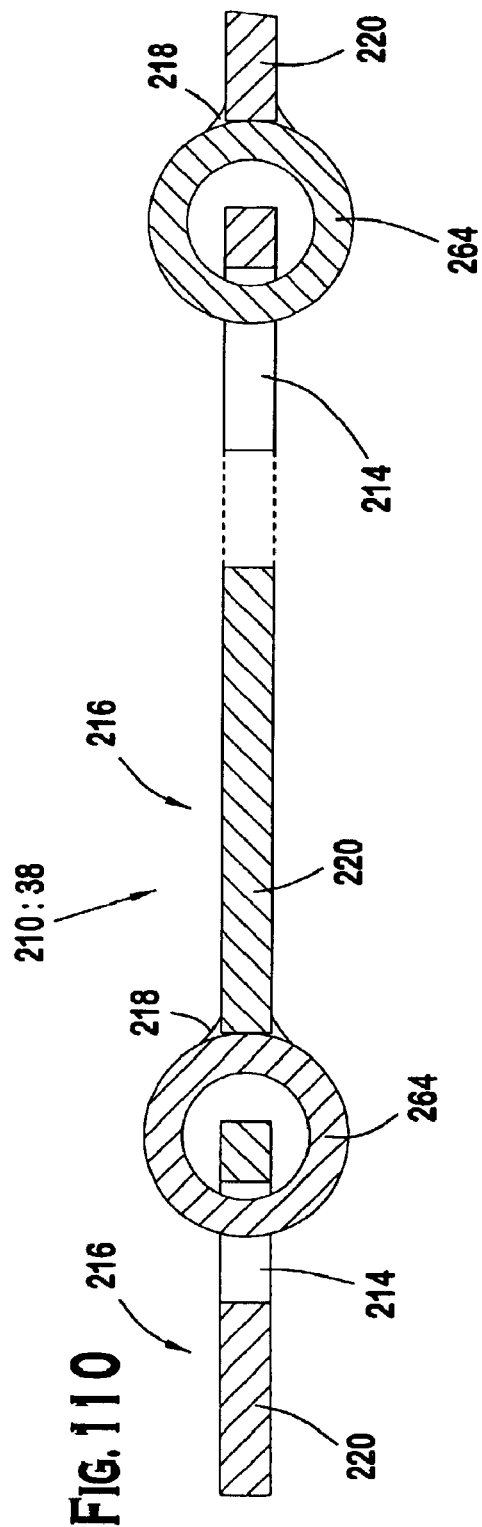

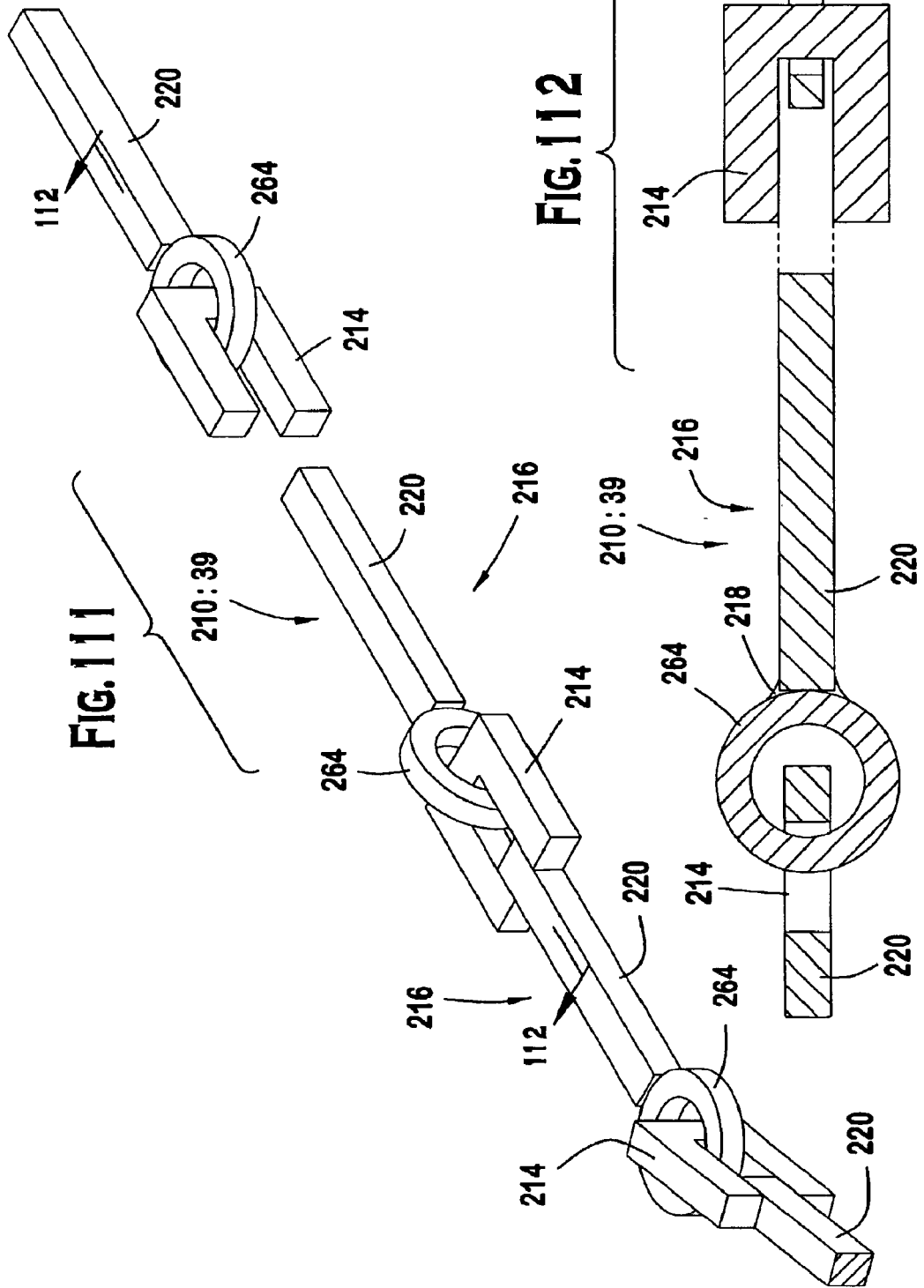

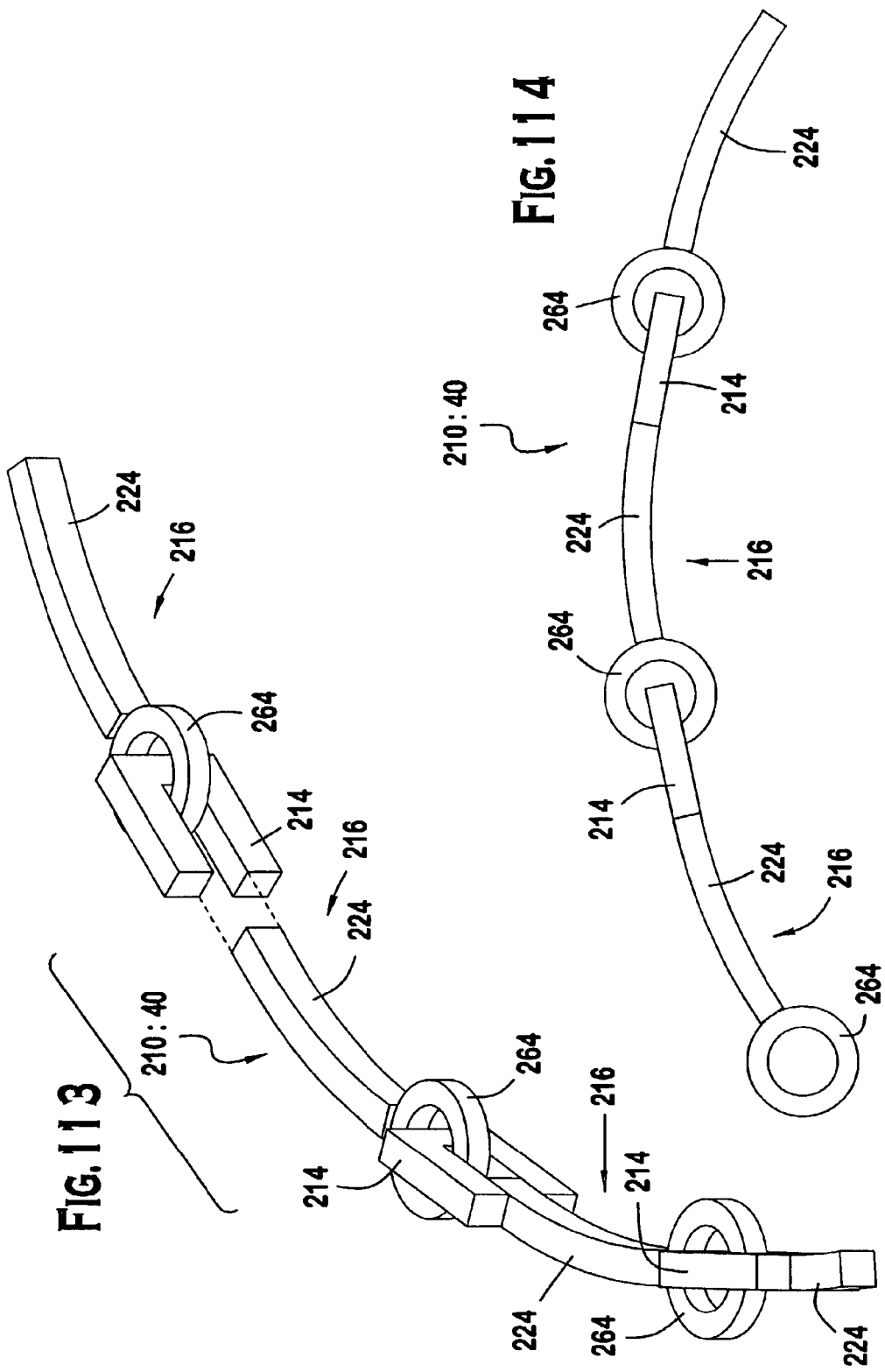

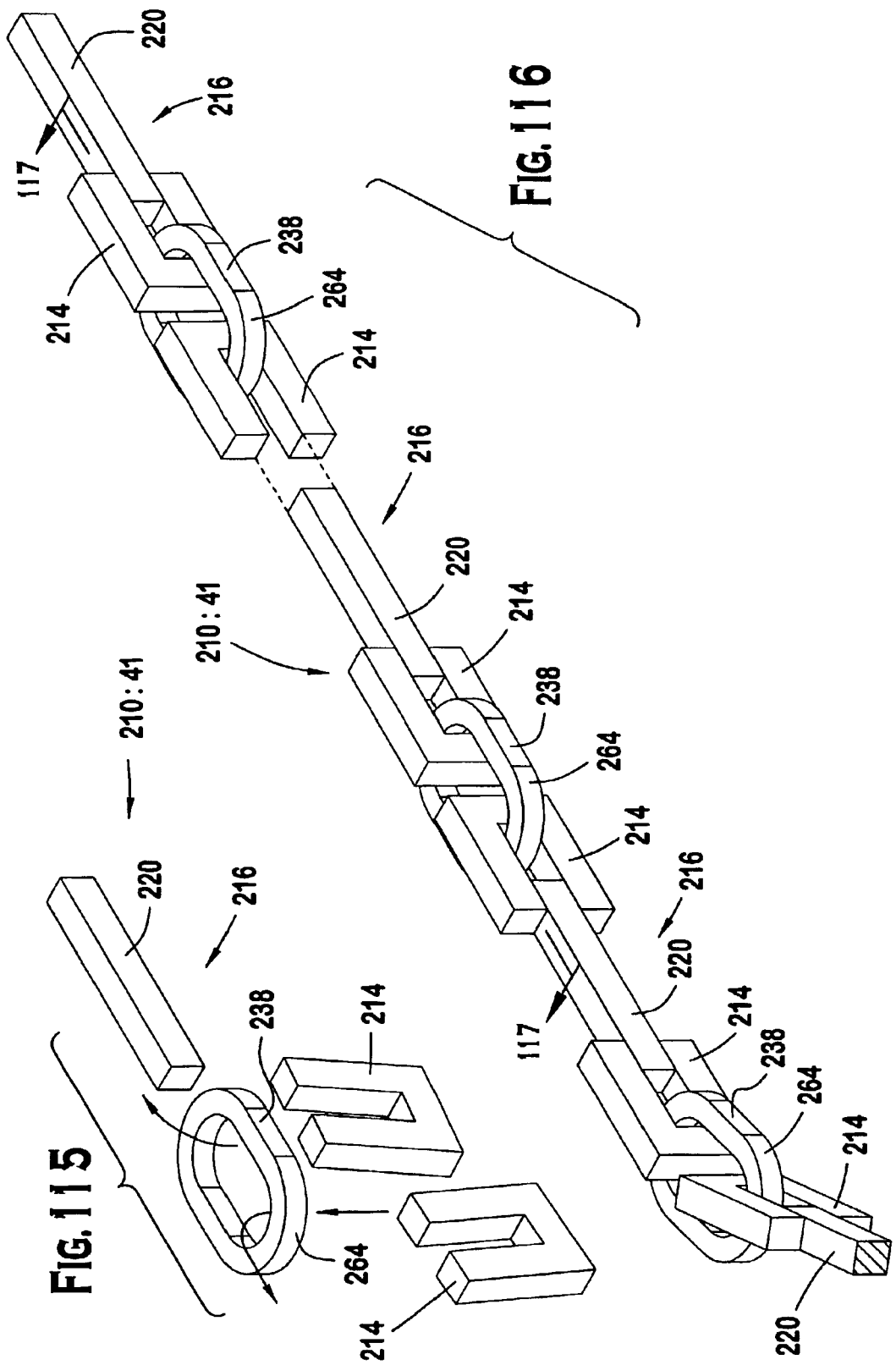

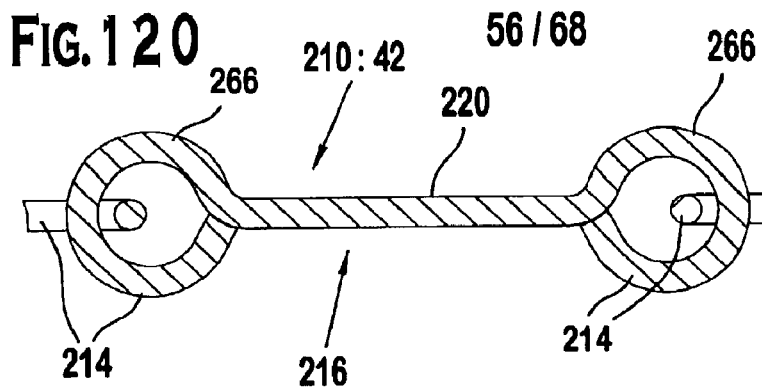
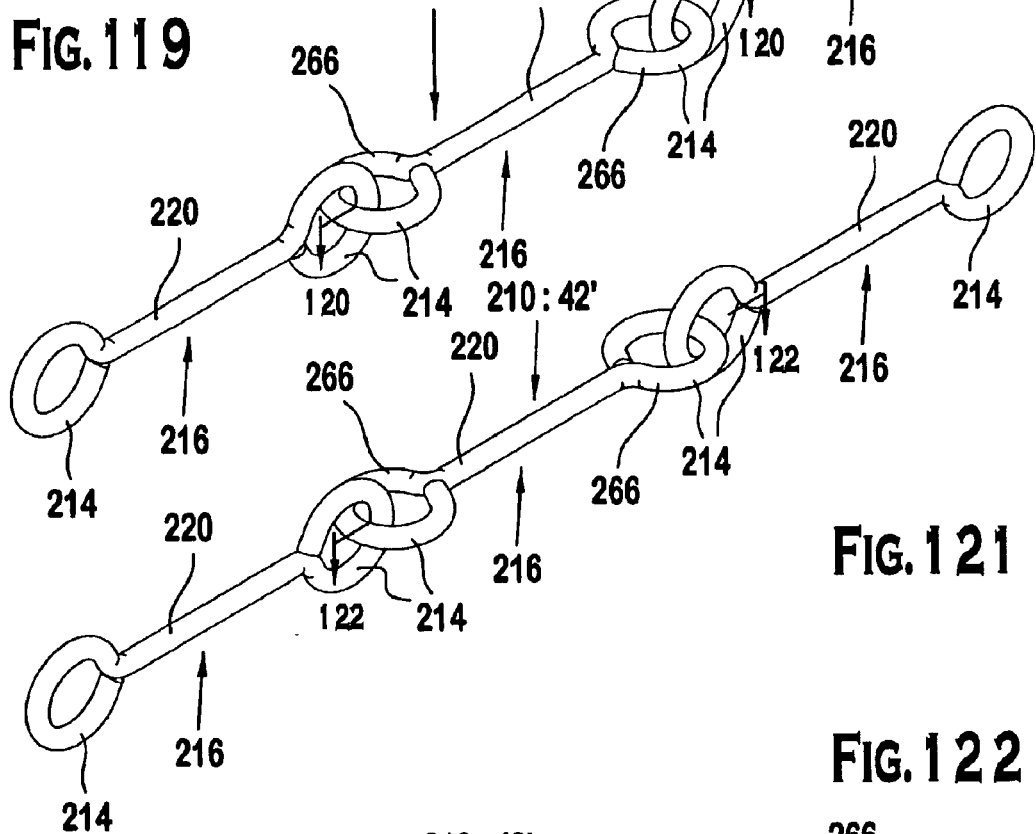
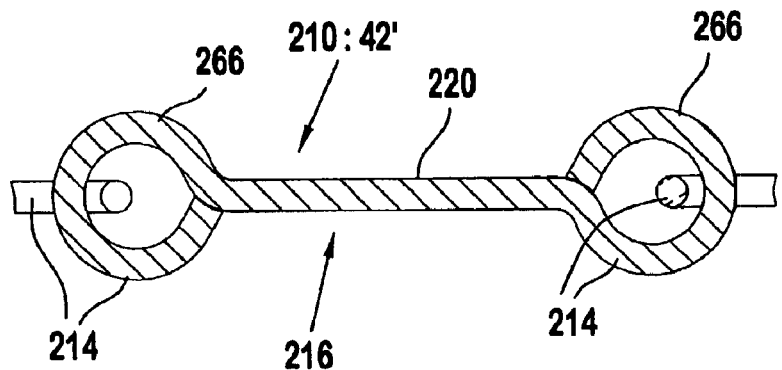

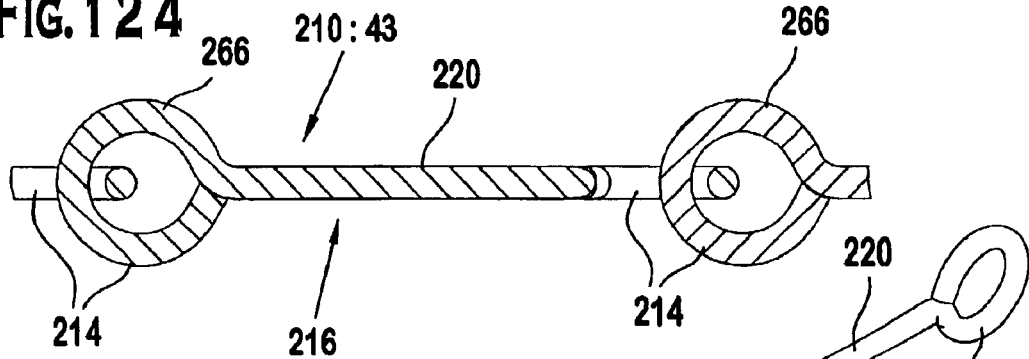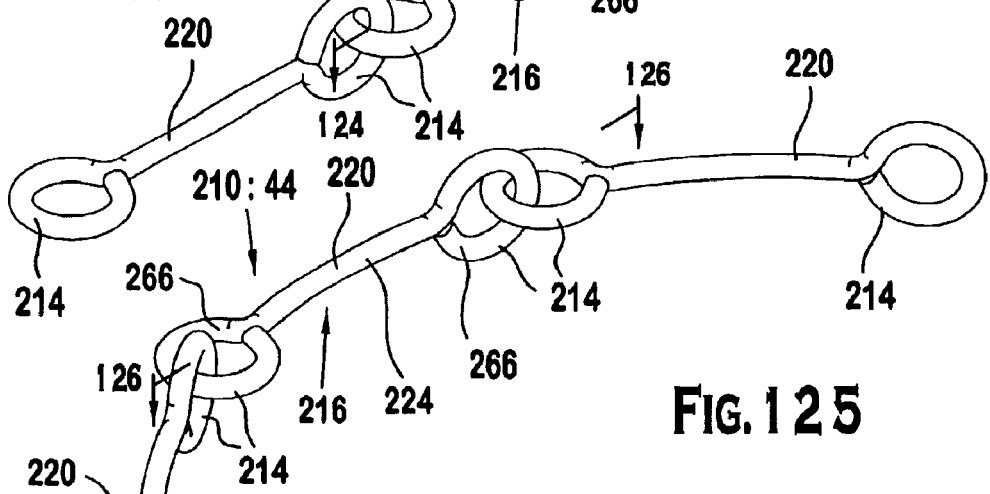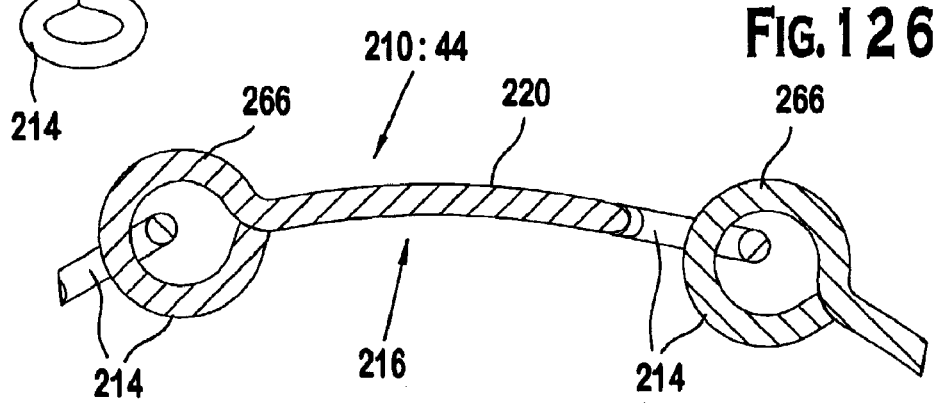

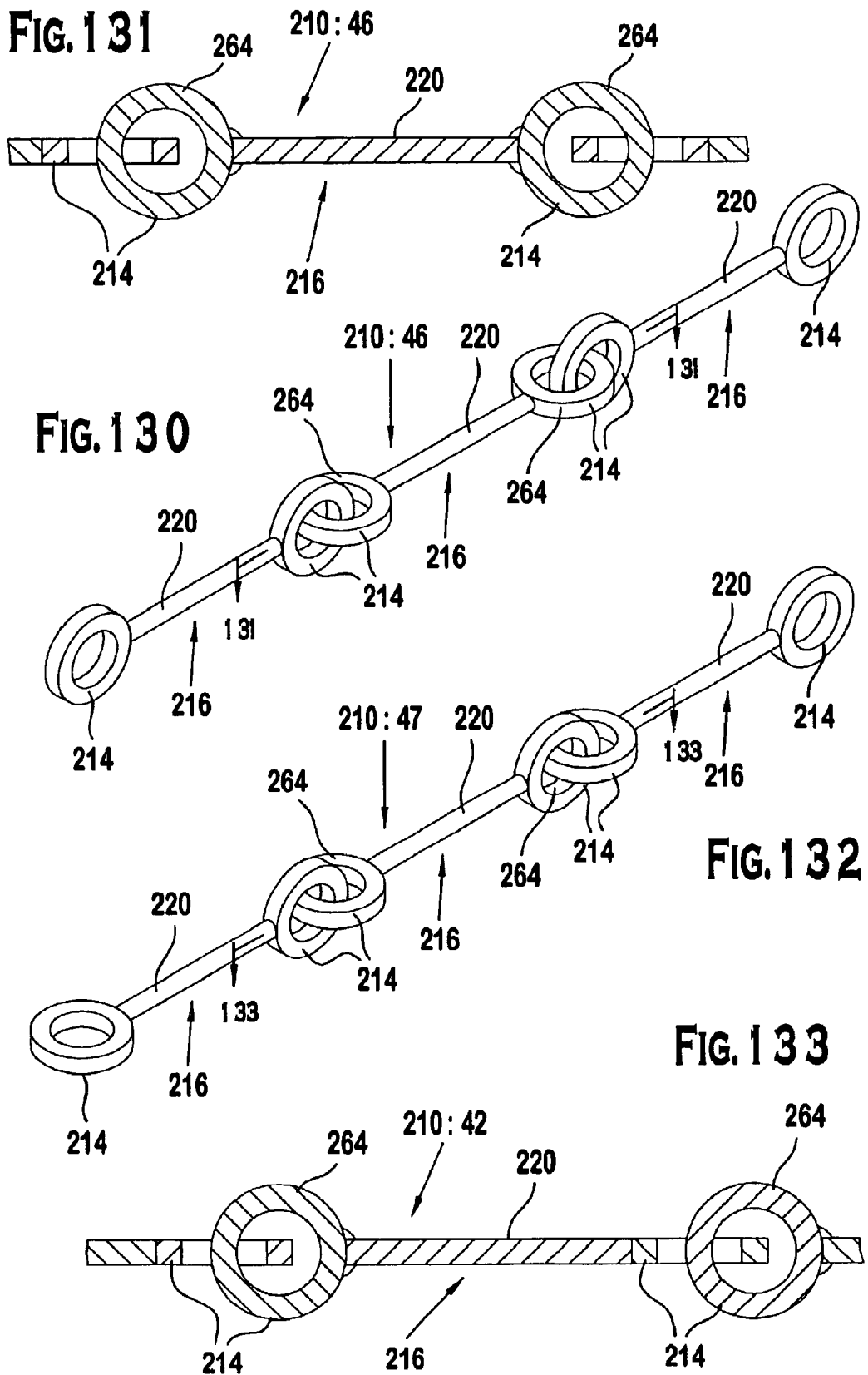

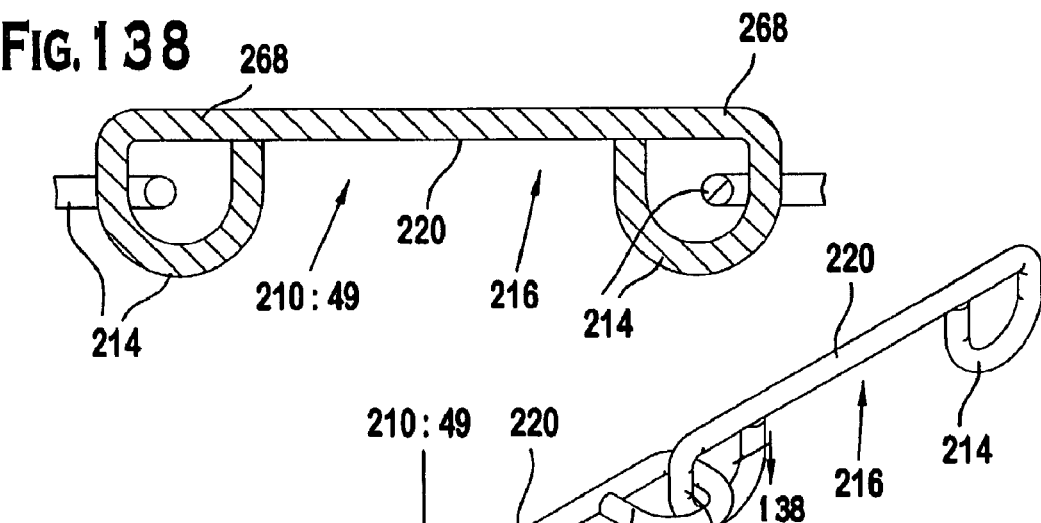
FIG. 138
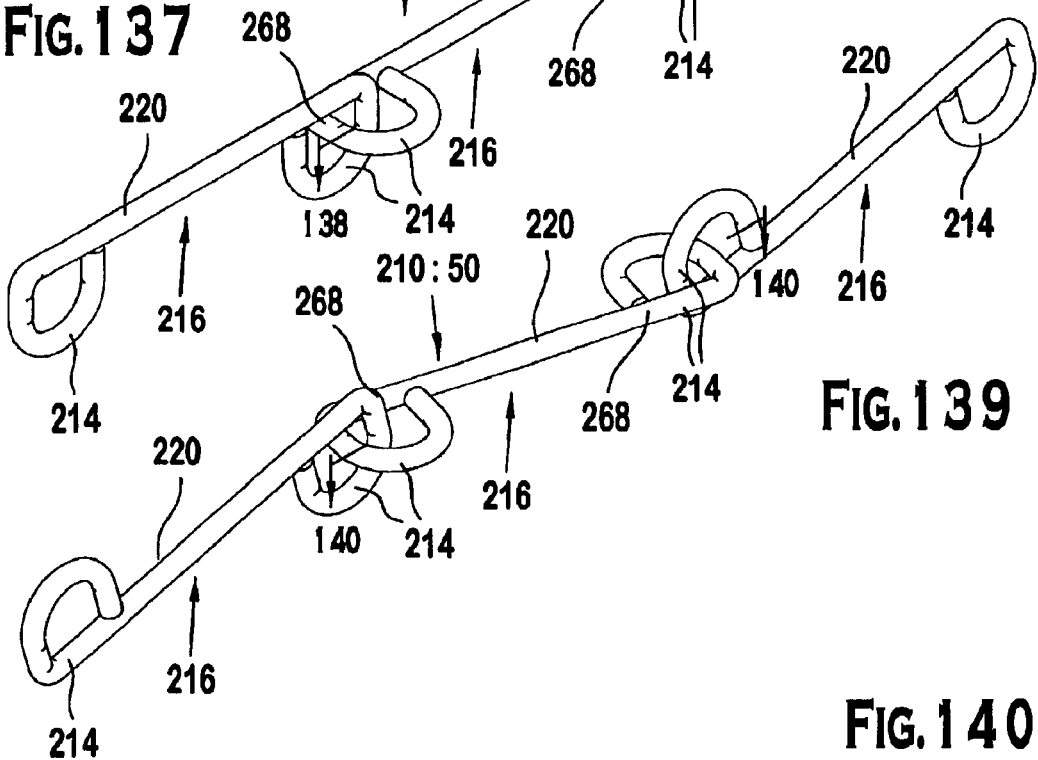
FIG. 137
FIG. 139
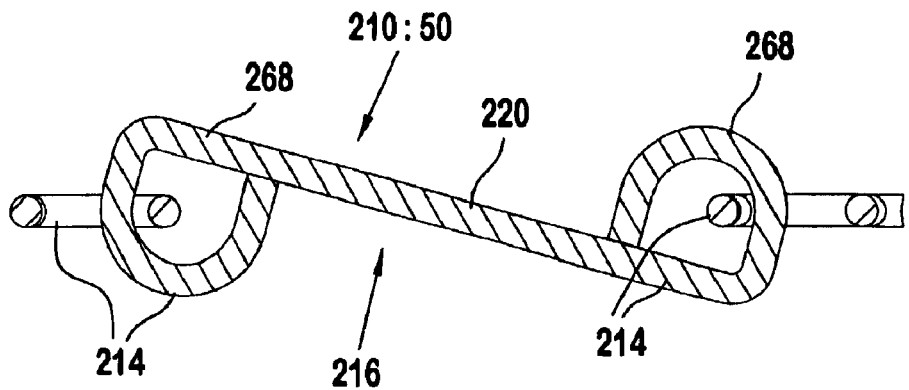
FIG. 140

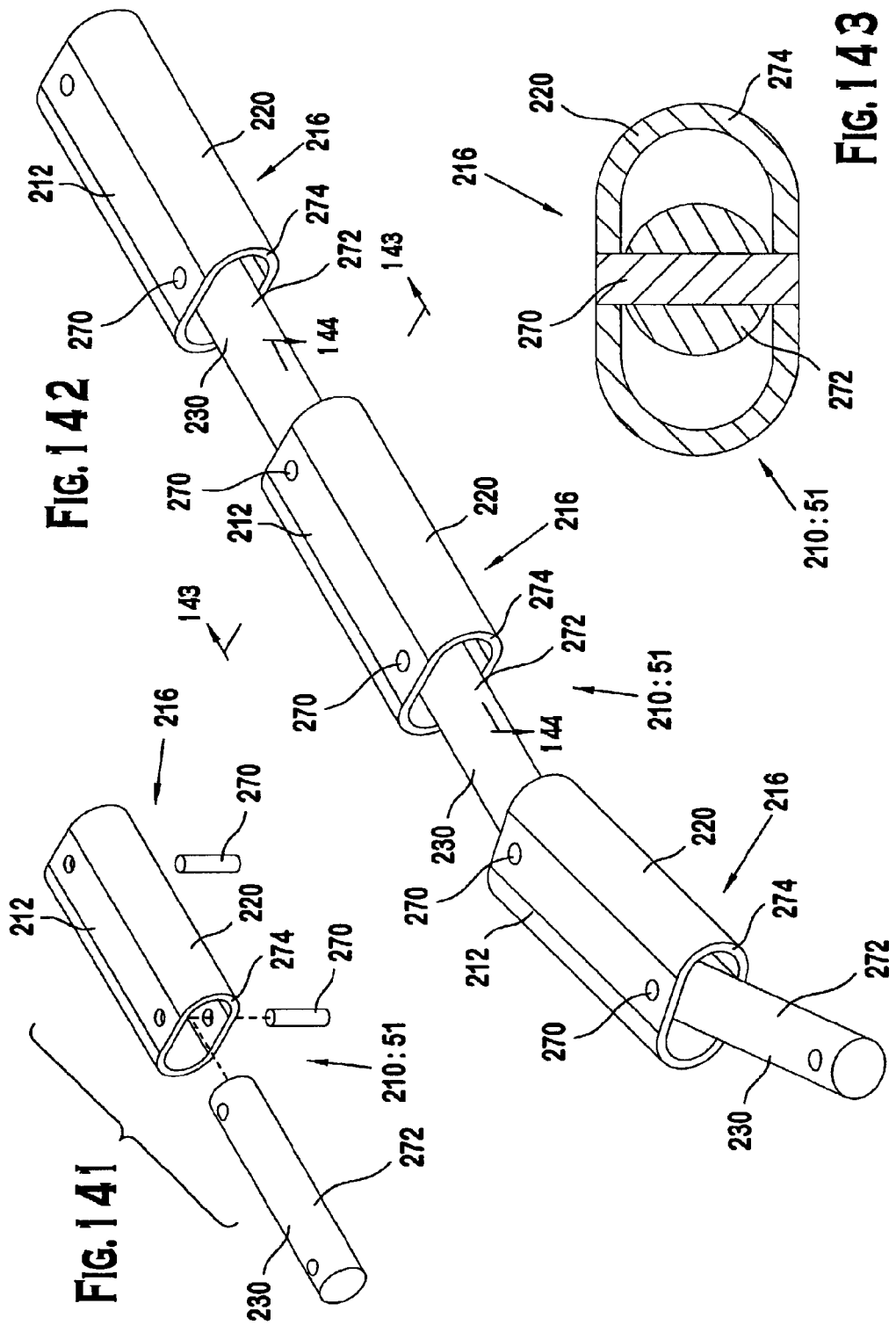

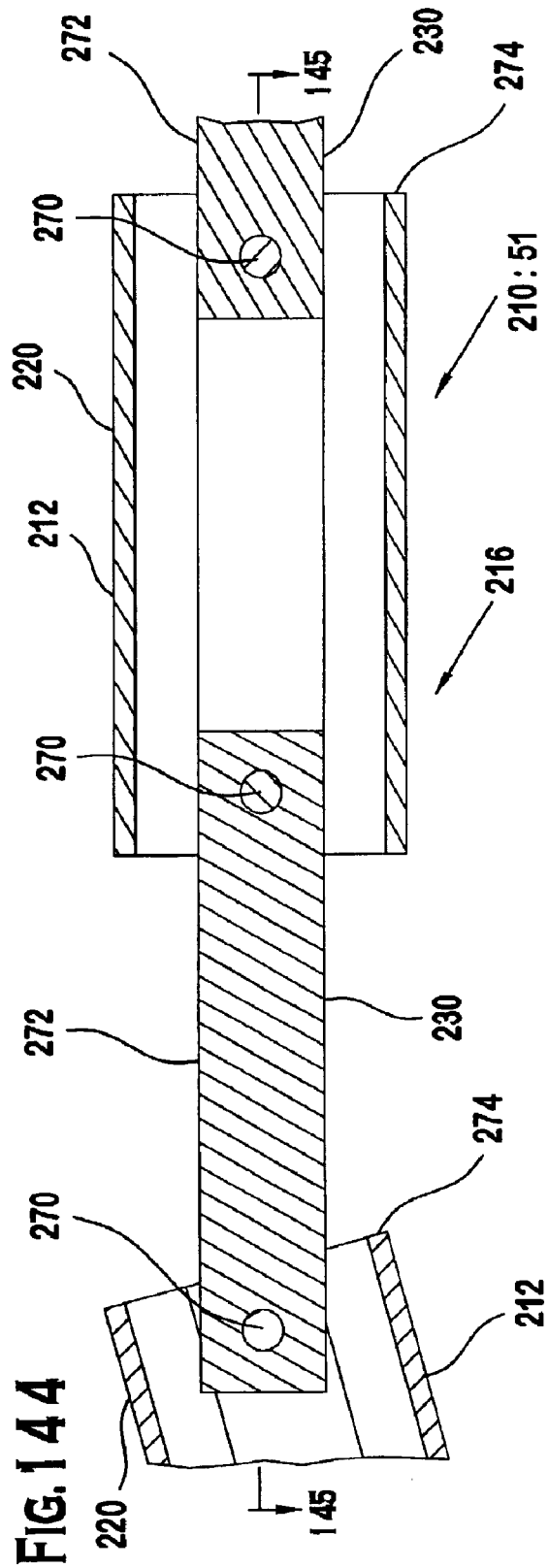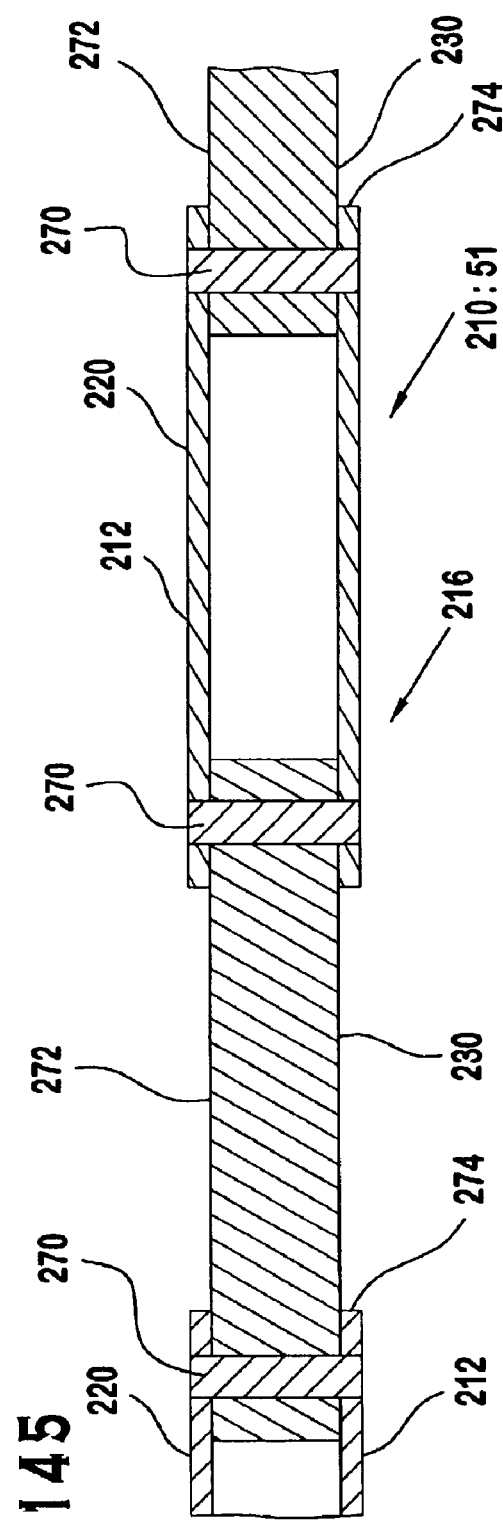

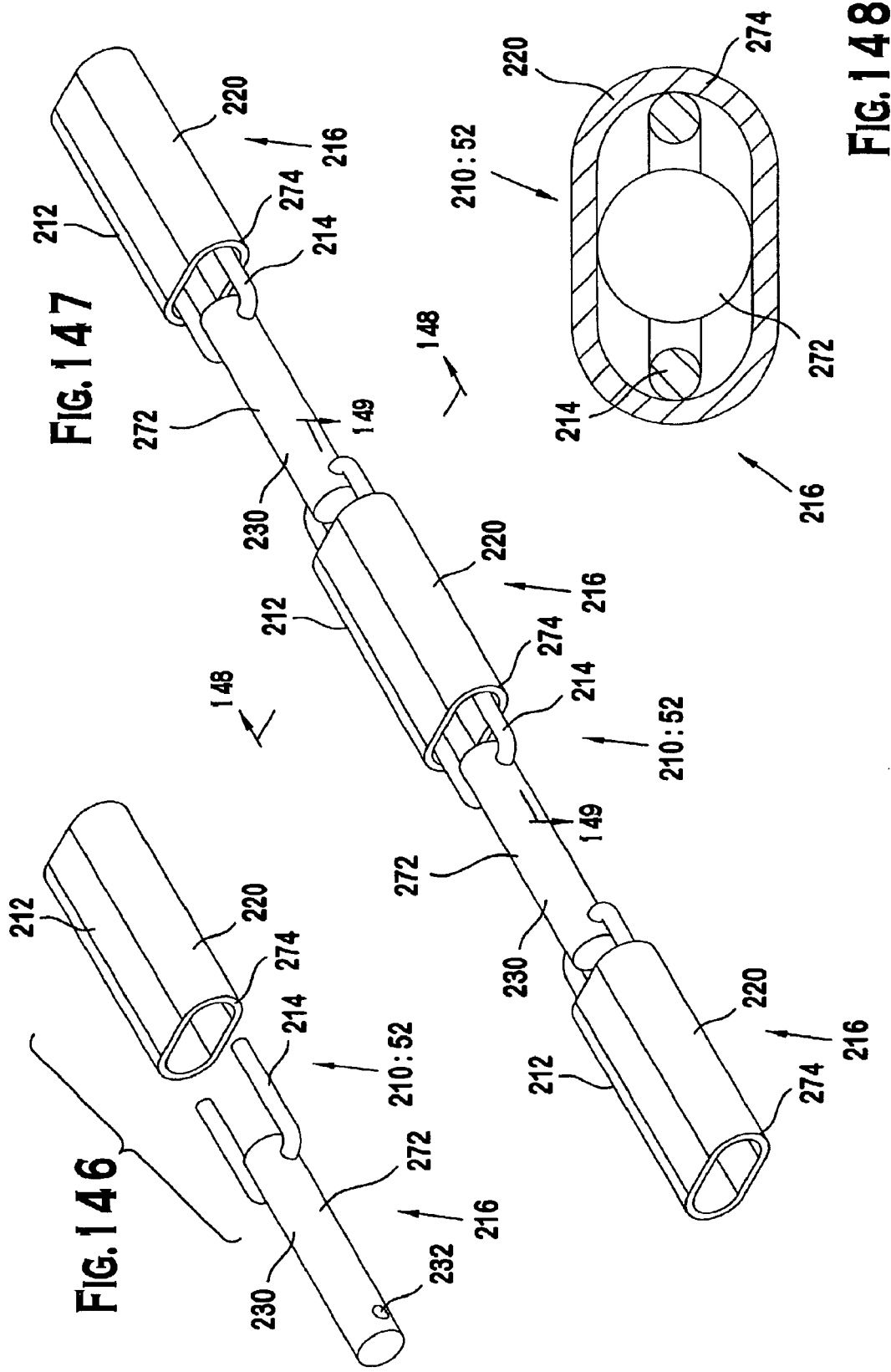

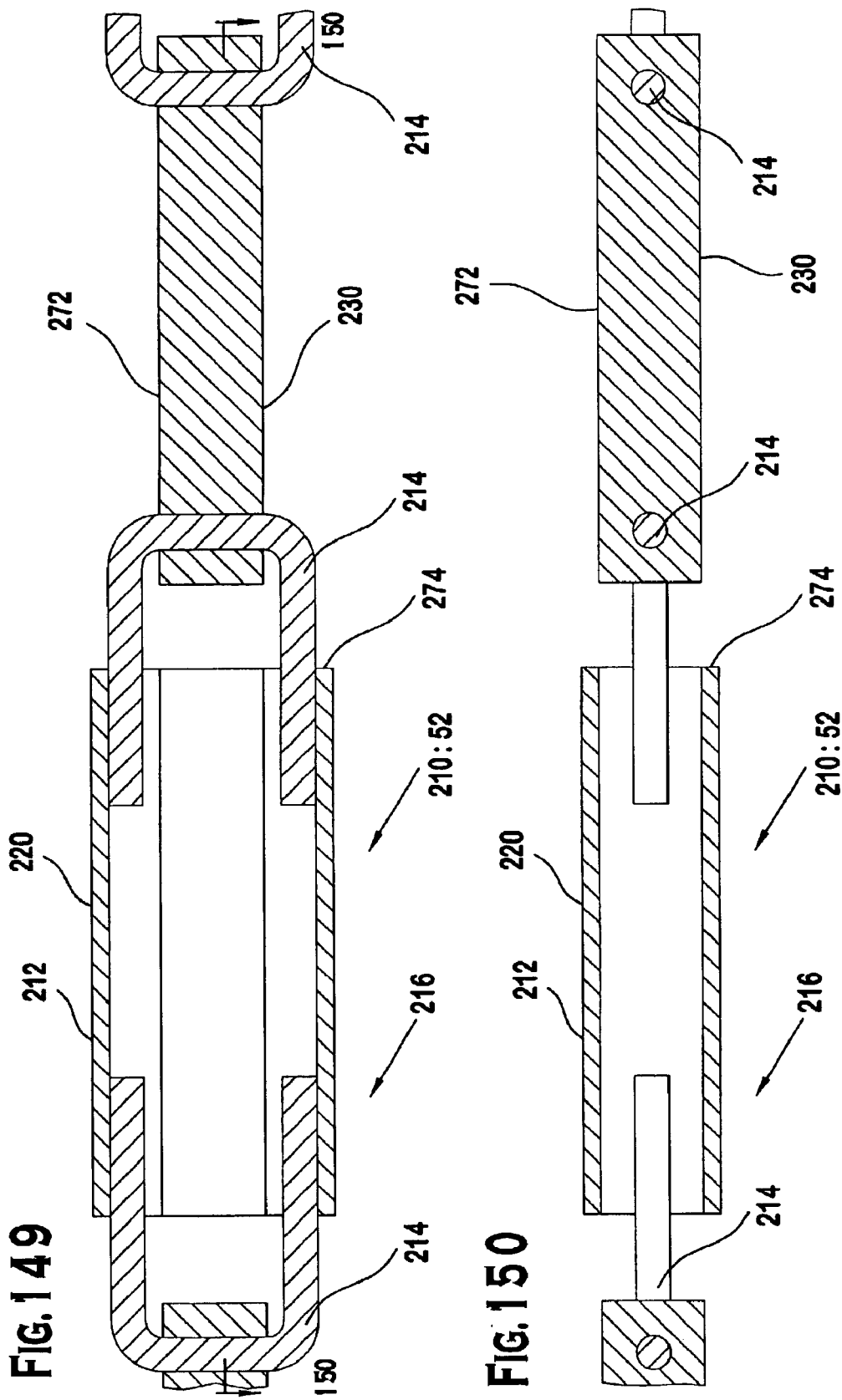

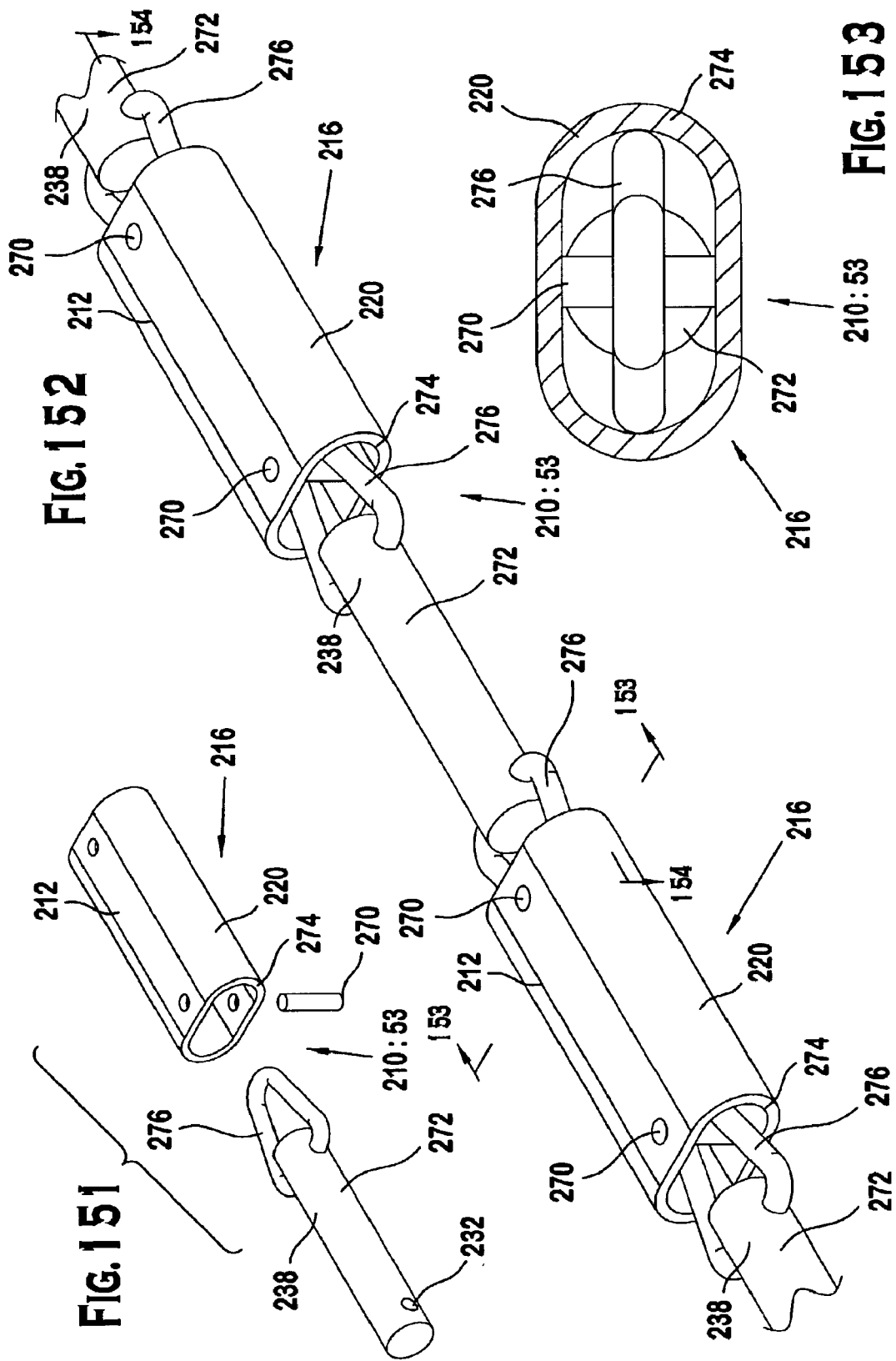

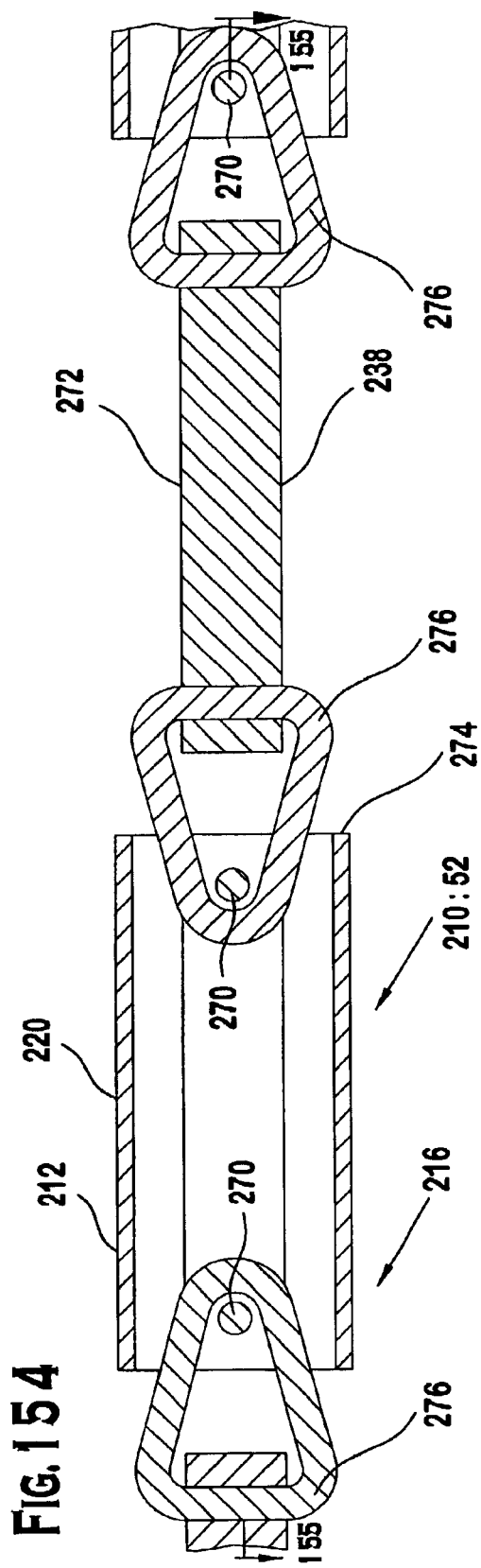
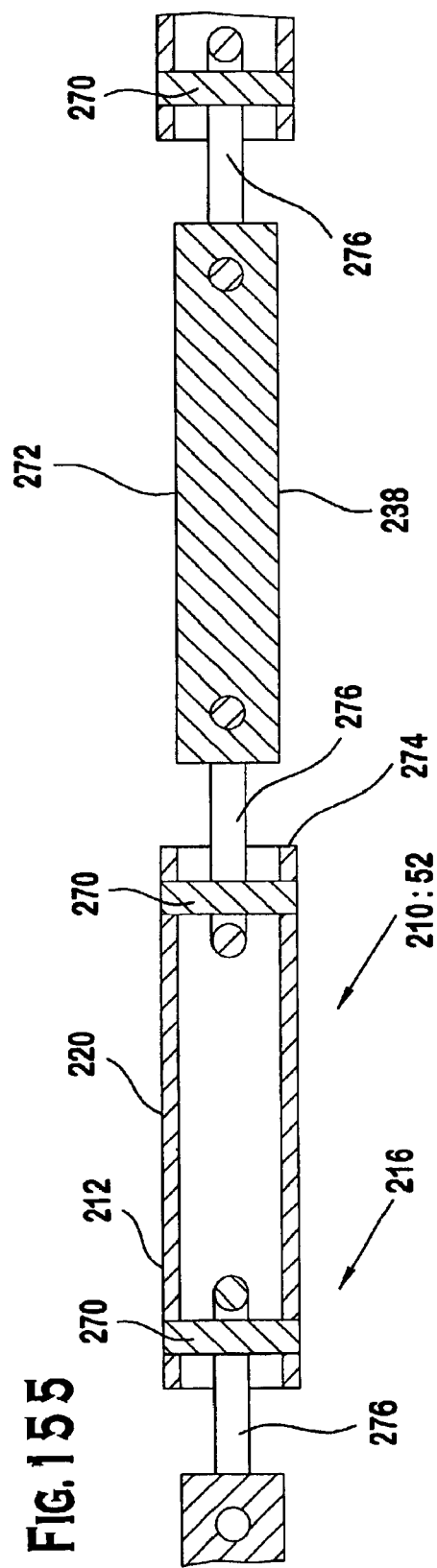
FIG.154
FIG.155

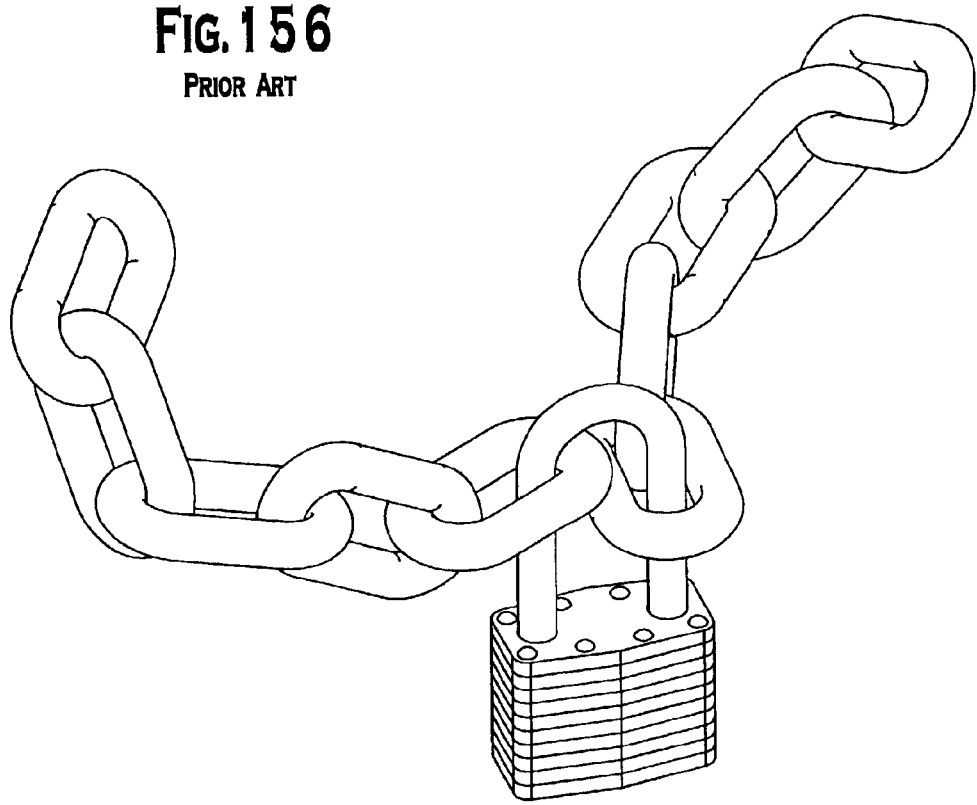
FIG. 156
PRIOR ART
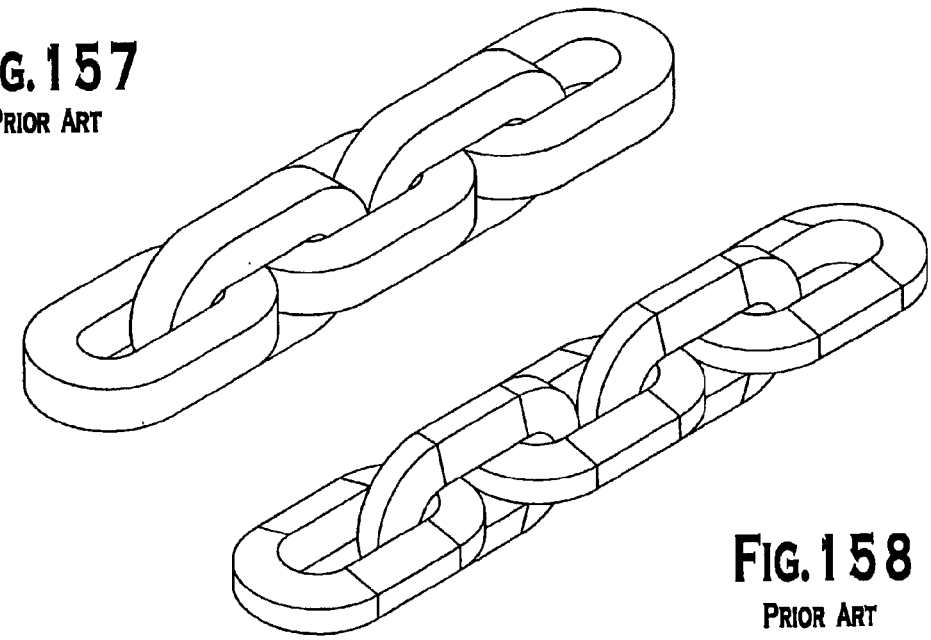
FIG. 157
PRIOR ART
FIG. 158
PRIOR ART

SECURITY CHAIN

BACKGROUND

The present invention is directed to chains and, more specifically, to improved security chain that is preferably relatively light weight and high strength.

Referring to FIGS. 156–158, the drive for improved security devices has led to chain manufacturers producing chains that have larger and heavier links. While the increased size and thickness of conventional chain links has increased the strength of chains, such increases have also resulted in a sharp increase in the weight of chains.

Clearly, what is needed is an improved security chain suitable for use in anti-theft applications that has links that provide high strength to resist cutting and breaking and that are preferably light weight relative to security chains of similar strength.

SUMMARY

One embodiment of the present invention is directed to a security chain including a plurality of links interconnected. Each link includes a central member having first and second ends. The central member is formed by a hollow elongated tube with openings at the first and second ends. The hollow elongated tube has a generally circular cross section. First and second connector members are each welded across a separate one of the openings providing a high strength security chain suitable for anti-theft applications.

A separate embodiment of the present invention is directed to high strength security chain including a plurality of links interconnected. Each link includes a central member having first and second ends formed by a hollow elongated tube having openings at the first and second ends. First and second connector members are each welded across a separate one of the openings. Each of the first and second connectors has a generally U-shape with first and second legs each welded to the central tube.

A separate embodiment of the present invention is directed to a security chain including a plurality of links interconnected. Each link includes a central member having first and second ends formed by a hollow elongated tube with openings at the first and second ends. First and second connector members are each welded across a separate one of the openings. Wherein the central member is curved such that each central member generally defines an arc between the first and second connector members.

A separate embodiment of the present invention is directed to a security chain including a plurality of links interconnected. Each link includes an elongated central member formed by a single solid rod having an outer surface. First and second connector members are each disposed on a separate end of the elongated central member. Each of the first and second connector members are formed by a ring segment having first and second ends defining a gap therebetween. The first and second ends are welded to opposite sides of the outer surface of the elongated central member.

A separate embodiment of the present invention is directed to a security chain including a plurality of links interconnected. Each link includes an elongated central member formed by a single solid rod having an outer surface. First and second connector members are each disposed on a separate end of the elongated central member. Each of the first and second connector members are formed by a three sided, rectilinear, generally U-shaped member formed of rectangular tubing having first and second ends. The first and second ends are welded to opposite sides of the outer surface of the elongated central member.

A separate embodiment of the present invention is directed to a security chain including a plurality of links interconnected by a plurality of connecting rings. Each link includes an elongated central member formed by a single solid rod having first and second ends. A first ring is disposed on the first end of the elongated central member. The ring receives one of the plurality of connecting rings therein. The second end of the elongated central member is engaged with another one of the plurality of connecting rings.

A separate embodiment of the present invention is directed to a security chain including a plurality of links interconnected. Each link includes an elongated central member formed by a single solid rod having an outer surface. First and second connector members are each disposed on a separate end of the elongated central member. The first connector member is formed by a three sided, rectilinear, generally U-shaped member formed of rectangular tubing having first and second ends. The first and second ends are welded to opposite sides of the outer surface of the elongated central member. The second connector member is formed by an enlarged ring. The first and second connector members lie in first and second planes, respectively. The first and second planes being oriented generally perpendicularly to each other.

A separate embodiment of the present invention is directed to a security chain including a plurality of links interconnected. Each link includes a central member formed by a single rod. First and second connector members are each disposed on a separate end of the central member. The central member is curved to define an arc positioned between the first and second connector members. The curved central member facilitates the positioning of the security chain in a loop. Whereby the weight of the security chain is reduced as compared to a conventional chain formed of polygonal links because the single rod of each link of the security chain can be longer, than if the single rod were straight, while still allowing the security chain to be positioned in a loop defining a relatively smooth perimeter.

A separate embodiment of the present invention is directed to a method of making a security chain having relatively low weight for the strength provided by the security chain as compared to that of a conventional chain formed of polygonal links. The method includes: providing a plurality of links interconnected to form the security chain, each link having a central member and first and second connector members each on a separate end thereof, the central member being formed by a single rod, wherein the central member is curved to define an arc positioned between the first and second connector members, the curved central member facilitating the positioning of the security chain in a loop, the curved central member allows the length of the single rod to be increased, relative to the length of a straight rod, while still allowing the security chain to be positionable in a loop defining a relatively smooth perimeter.

A separate embodiment of the present invention is directed to a security chain including a plurality of links interconnected. Each link is formed of a single bar. The single bar has a central portion and first and second bar ends. The single bar is shaped to define: an elongated central member formed by the central portion of the shaped bar; and first and second connector members formed by the first and second end portions, respectively, of the single bar. The first and second connector members define a substantially circular connector. The elongated central member is generally aligned perpendicularly to each of the circular connectors.

A separate embodiment of the present invention is directed to a plurality of links interconnected. Each link is formed by an elongated central member having first and second ends. First and second connector members are disposed on the first and second ends of the elongated central member, respectively. The first and second connector members each being formed by a generally annular ring formed of rectangular tubing.

BRIEF DESCRIPTION OF THE DRAWINGS

The foregoing summary, as well as the following detailed description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 1 is a perspective view of a first preferred embodiment of a security chain 210:1 of the present invention. The security chain 210:1 has a central member 220 preferably formed by a hollow tube 212 having a generally circular cross section. It is preferable that U-shaped connector members 214 are welded across separate openings on the ends of the elongated hollow tube 212. The use of the tube 212 as the central member 220 allows for a high strength, low weight security chain 210:1 that is difficult to cut using bolt cutters or the like;

FIG. 14 is a perspective view of a fifth preferred security chain 210:5 of the present invention that has an elongated tube 212 that forms a curved central member 224 such that the central member 220 forms an arc between the connector members 214. The curvature of the tube 212 allows for a longer length tube 212 to be used while still being able to position the security chain 210:5 in a loop defining a relatively smooth perimeter, relative to that which would be formed if the central members 220 were straight. It is preferred that the connector members 214 are mounted in ninety (90) degree opposition to each other within the curved tubes 212;

FIG. 15 is a cross-sectional view of one link 216 of the security chain 210:5 of FIG. 14 illustrating the curvature of the central curved member 224;

FIG. 16 is a top plan view of the security chain 210:5 of FIG. 14;

FIG. 17 is cross-sectional view of the security chain 210:5 of FIG. 14 as taken along the line 17—17 of FIG. 14 illustrating the curvature of the central member 220 and the positioning of the connector members 214 therein;

FIG. 18 is an exploded of one link 216 used in the security chain 210:6 illustrated in FIG. 19;

FIG. 19 is a perspective view of a sixth preferred security chain 210:6 of the present invention formed by links 216 having an elongated central member 220 with connector members 214 secured over ends thereof. The connector members 214 are formed by ring segments 214 having first and second ends defining a gap therebetween. The first and second ends are preferably welded to opposite sides of the outer surface of the elongated central member;

FIG. 20 is cross-sectional view of the security chain 210:6 of FIG. 19 as taken along the line 20—20 of FIG. 19;

FIG. 21 is a cross-sectional view of the security chain 20:6 of FIG. 20 as taken along the line 21—21 of FIG. 20;

FIG. 22 is an exploded view of a link 216 of the security 210:7 illustrated in FIG. 23;

FIG. 23 is a perspective view of a seventh preferred security chain 210:7 of the present invention formed by links 216 having an elongated central member with relatively small ring segment connector members 214 mounted on ends thereof. The first and second ring segments 214 of a single link 216 are positioned in a first and second plane, respectively. The first and second planes are preferably generally perpendicular to each other resulting in the ring segments 214 being opposed to each other by about ninety (90) degrees. By using relatively small connector members 214 in combination with a long central member 220 both the sixth and seventh preferred security chains 210:6, 210:7 maximize the strength of the security chain while minimizing weight;

FIG. 24 is a cross-sectional view of the security chain 210:7 of FIG. 23;

FIG. 25 is a perspective view of the eighth preferred security chain 210:8 of the present invention illustrating an elongated central member 220 that forms a curved member 224 that defines an arc between ring segment connector members 214 when viewed from above;

FIG. 26 is a top plan view of the security chain 210:8 of FIG. 25;

FIG. 27 is a perspective view of a ninth preferred security chain 210:9 of the present invention illustrating a twisted portion 226 forming a central member 220 having ring segment connector members 214. It is preferred that the twisted portion 226 extend substantially along the length of the central member 220;

FIG. 28 is an exploded view of a link 216 of the security chain 210:10 shown in FIG. 29;

FIG. 29 is a perspective view of a tenth preferred security chain 210:10 of the present invention illustrating an elongated cylindrical central member 220 with ring segment connector members 214 on opposing ends thereof;

FIG. 30 is a cross-sectional view of the security chain 210:10 of FIG. 29 as taken along the line 30—30 of FIG. 29;

FIG. 31 is a cross-sectional view of the security chain 210:10 of FIG. 30 as taken along the line 31—31 of FIG. 30;

FIG. 32 is perspective view of an eleventh preferred security chain of the present invention formed by links 216 having elongated cylindrical central members 220 with ring segment connector members 214 mounted on the ends thereof in ninety (90) degree opposition to each other;

FIG. 33 is a partial cross-sectional view of the security chain 210:11 of FIG. 32;

FIG. 34 is a perspective view of a twelfth preferred security chain 210:12 formed by links 216 having curved, elongated, cylindrical, central members 220 with ring segment connector members 214 mounted on ends thereof in ninety (90) degree opposition to each other;

FIG. 35 is top plan view of the security chain 210:12 of FIG. 24;

FIG. 36 is an exploded view of one link 216 of the security chain 210:13 of FIG. 37;

FIG. 37 is a perspective view of a thirteenth preferred security chain 210:13 of the present invention formed by links 216 having a relatively flat base with a post 228 positioned on one side and extending upwardly and a bridge member 230 positioned generally on an opposite end. The bridge member 230 defines a bore 232 and is positioned partially on a left side of the central member 220. The bore 232 in the bridge member 230 is adapted to receive the post 228 from a neighboring link 216. Once the post 228 is inserted through a bore 232 in the bridge member 230, the top of the post 228 is flattened to form a cap 234. The cap 234 has an outer lip 236 that has a diameter greater than that of the bore 232 to retain the post 228 within the bore 232;

FIG. 38 is a cross-sectional view of the security chain 210:13 of FIG. 37 as taken along the line 38—38 of FIG. 37. The upper left side of the drawing illustrates part of a press that is used to flatten the top of the post 228;

FIG. 39 is a cross-sectional view of the security chain 210:13 similar to that of FIG. 38;

FIG. 40 is a perspective view the security chain 210:13 of FIG. 37;

FIG. 41 is a perspective view of a fourteenth preferred security chain 210:14 of the present invention illustrating the links of the thirteenth preferred security chain 210:13 modified to include a curved central member 224. The curved central member defines an arc positioned between the post 228 and the bridge member 230 when viewed from above;

FIG. 42 is a top plan view of the security chain 210:14 of FIG. 41;

FIG. 43 is a perspective view of a fifteenth preferred security chain 210:15 of the present invention incorporating links 216 having a generally elliptical shaped central member 220 with a bore 232 on one end and a post 228 located proximate an opposing end. Each link 216 receives a post 228 from a neighboring link within the bore 232 and positions its post 228 in the bore 232 of a second neighboring link;

FIG. 44 is cross-sectional view of the security chain 210:15 of FIG. 44;

FIG. 45 illustrates a sixteenth preferred security chain 210:16 of the present invention that uses links 216 similar to that shown in FIG. 43 modified to include a curved central member 224. The curved central member 224 defines an arc between the post 228 thereon and the bore 232 therethrough when viewed from above;

FIG. 46 is a top plan view of the security chain 210:16 of FIG. 45;

FIG. 47 is a perspective view of a seventeenth preferred security chain 210:17 of the present invention. The links 216 of the security chain 210:17 have an elongated central member 220 with posts 228 extending from a top side of each end thereof. Neighboring links 216 are connected via a floating connector 238. The floating connector 238 has an elliptical shape and two bores 232 extending therethrough. It is preferred that the floating connector 238 is slid over posts 228 of adjacent links 216 such that the top end of the posts 228 can be flattened to form caps 234;

FIG. 48 is cross-sectional view of the security chain 210:17 of FIG. 47;

FIG. 49 is a perspective view of an eighteenth preferred security chain 210:18 of the present invention illustrating links 216 similar to that of FIG. 47 modified to include a curved central member 224;

FIG. 50 is top plan view of the security chain 210:18 of FIG. 49;

FIG. 51 is an exploded view of a link 216 from the security chain 210:19 of FIG. 52;

FIG. 52 is a perspective view of a nineteenth preferred security chain 210:19 of the present invention formed by links 216 that preferably have first and second connector members formed by three-sided, rectilinear, generally U-shaped members formed of rectangular tubing. It is also preferable that the central member 220 is formed of rectangular tubing;

FIG. 53 is a cross-sectional view of the security chain 210:19 of FIG. 52;

FIG. 54 is a cross-sectional view similar to that of FIG. 53 of the security chain 210:19 formed by links 216 having an elongated member 220 integrally formed with one of the three-sided, rectilinear, generally U-shaped connector members 214;

FIG. 55 is a perspective view of a twentieth preferred security chain 210:20 of the present invention illustrating a generally elongated central member 220 having U-shaped connector members 214 attached on opposite ends in ninety (90) degree opposition relative to each other;

FIG. 56 is a cross-sectional view of the security chain 210:20 of FIG. 55;

FIG. 59 is a perspective view of a twenty-second preferred security chain 210:22 of the present invention. The elongated central member 220 preferably has a cylindrical shape with plungers 240 positioned on each end. The plungers 240 are preferably cylindrical disks but can have any shape without departing from the scope of the present invention. Adjacent elongated central members 220 are connected via a floating connector 238 which is preferably formed by a box 242 having slots 244 in opposing sides. Adjacent plungers 240 from successive central members 220 are slid within a medially positioned box 242 such that the central members 220 each preferably extend through one of the slots 244 in the box 242. Once two central members 220 are positioned through slots 244 in the box 242, a box side 246 is secured over an opening 248 in the box 242 to secure the central members 220 together. The side 246 can be secured via welding, adhesive, or any other suitable known means;

FIG. 60 is a cross-sectional view of a link 216 of the security chain 210:22 of FIG. 59 illustrating the positioning of a plunger 240 within the box 242 with the side 246 secured thereto;

FIG. 61 is a cross-sectional view of the security chain 210:22 of FIG. 59 as taken along the line 61—61 of FIG. 59;

FIG. 62 is a cross-sectional view of the security chain 210:22 of FIG. 61 as taken along the line 62—62 of FIG. 61;

FIG. 63 is a perspective view of a twenty-third preferred security chain 210:23 of the present invention illustrating links 216 similar to that shown in FIG. 59 modified to have a curved central member 224 that defines an arc between boxes 242 attached to the ends thereof;

FIG. 64 is a cross-sectional view of the security chain 210:23 of FIG. 63 as taken along the line 64—64 of FIG. 63;

FIG. 65 is an exploded view of a link 216 of the security chain 210:24 of FIG. 66;

FIG. 66 is a perspective view of a twenty-fourth preferred security chain 210:24 of the present invention formed by links 216 having a central member 220 with a ring 250 positioned at one end and a post 228 positioned at an opposite end. The post 228 of a first link 216 is inserted through the ring 250 in a second, adjacent link to form the chain 210:24. It is preferred that the end of the post 228 opposite from the corresponding central member 220 is flattened, or otherwise deformed, to secure the post 228 within the ring 250 of the adjacent link 216;

FIG. 67 is a cross-sectional view of the security chain 210:24 of FIG. 66 as taken along the line 67—67 of FIG. 66;

FIG. 68 is a cross-sectional view of the security chain 210:24 of FIG. 67 as taken along the line 68—68 of FIG. 67;

FIG. 69 is a perspective view of a twenty-fifth preferred security chain 210:25 of the present invention formed by links similar to that of FIG. 66 modified to include a curved central member 224 that defines an arc between the corresponding post 228 and the corresponding ring 250;

FIG. 70 is a top plan view of the security chain 210:25 of FIG. 69;

FIG. 71 is an exploded view of a link 216 used to form a security chain 210:26 shown in FIG. 72;

FIG. 72 is a perspective view of a twenty-sixth preferred security chain 210:26 of the present invention formed by links having a central member 220 with a ring 250 on one end and a post 228 on an opposite end. The links 216 are secured to each other by inserting post 228 through a ring 250 of an adjacent link 216 and bending an end of the post 228 to form an angled end 252;

FIG. 73 is a cross-sectional view of the security chain 210:26 of FIG. 72 as taken along the line 73—73 of FIG. 72;

FIG. 74 is a cross-sectional view of the security chain 210:26 of FIG. 73 as taken along the line 74—74 of FIG. 73;

FIG. 75 is a perspective view of a twenty-seventh preferred security chain 210:27 of the present invention formed by links 216 similar to that shown in FIG. 72 modified to include a curved central member 224;

FIG. 76 is a top plan view of the security chain 210:27 of FIG. 75;

FIG. 77 is an exploded view of a link 216 used to form the security chain 210:28 of FIG. 78;

FIG. 78 is perspective view of a twenty-eighth security chain 210:28 of the present invention formed by links 216 having a central member 220 with rings 250 placed on opposing ends. Neighboring central members 220 are connected via a floating connector 238 having a generally square shape. The floating connector 238 is preferably formed by two posts 228 that have an end plate 254 attached therebetween. The end plate 254 is preferably seated within the post 228 and an opposing end plate is placed on the opposite side of the post 228. The security chain 210:28 is preferably assembled by positioning rings 250 of neighboring central members 220 over the posts 228 of a single floating connector 238 and then securing an end plate 254 thereover;

FIG. 79 is a cross-sectional view of the security chain 210:28 of FIG. 78 as taken along the line 79—79 of FIG. 78;

FIG. 80 is a cross-sectional view of the security chain 210:28 of FIG. 78 as taken along the line 80—80 of FIG. 79;

FIG. 81 is a an exploded view of a link 216 of the security chain 210:29 of FIG. 82;

FIG. 82 is a perspective view of a twenty-ninth preferred security chain 210:29 of the present invention formed by links 216 having a central member 220 with a ring 250 on one side and a post 228 on a second side. The post 228 on the second side of the central member 220 has an end plate 256 attached thereto that is preferably also joined to second post 228. Thus, each link 216 can be joined to a neighboring link by inserting first a link's ring 250 over the second post 228 and placing an end plate 254 thereover;

FIG. 83 is a cross-sectional view of the security chain 210:29 of FIG. 82 as taken along the line 83—83 of 82;

FIG. 84 is a cross-sectional view of the security chain 210:29 of FIG. 83 as taken along the line 84—84 of FIG. 83;

FIG. 85 is an exploded view of a link 216 of the security chain 210:30 of FIG. 86;

FIG. 86 is a perspective view of a thirtieth preferred security chain 210:30 of the present invention formed by links similar to that of FIG. 78 with the rings 250 on opposite ends of the central member 220 oriented in ninety (90) degree opposition to each other resulting the associated floating members 238 each being positioned in a separate plane generally perpendicular to each other;

FIG. 87 is a cross-sectional view of the security chain 210:30 of FIG. 86 as taken along the line 87—87 of FIG. 86;

FIG. 88 is a perspective view of a thirty-first preferred embodiment of a security chain 210:31 of the present invention formed by links 216 having a central member 220 with rings 250 on both ends. The links 216 are joined by a floating member 238 formed by an end plate 254 having two posts 228 positioned thereon. The two posts 228 are inserted through the rings 250 in adjoining links 216 and then inserted through an end plate 254 having two bores 232 therein so that the two end plates are generally positioned facing each other. Then, the posts 228 are preferably welded to the top end plate 254;

FIG. 89 is a cross-sectional view of the security chain 210:31 of FIG. 88 as taken along the line 89—89 of FIG. 88;

FIG. 90 is a perspective view of a thirty-second preferred security chain 210:32 of the present invention formed by links 216 similar to that of FIG. 88 modified to have a curved central member 224;

FIG. 91 is a cross-sectional view of the security chain 210:32 of FIG. 90 as taken along the line 91—91 of FIG. 90;

FIG. 92 is an exploded view of a link 216 used to form the security chain 210:33 of FIG. 93;

FIG. 93 is a perspective view of a thirty-third preferred security chain 210:33 of the present invention formed by links 216 having an elongated central member 220 with rings 250 on each end. The rings 250 of adjoining links 216 are secured together by a connecting ring 258 that is preferably formed by two halves 260 that are preferably welded together. Alternatively, one part of the ring can be a segment just large enough to create a gap to allow the rings 250 to be inserted therethrough;

Figures 94, 95:
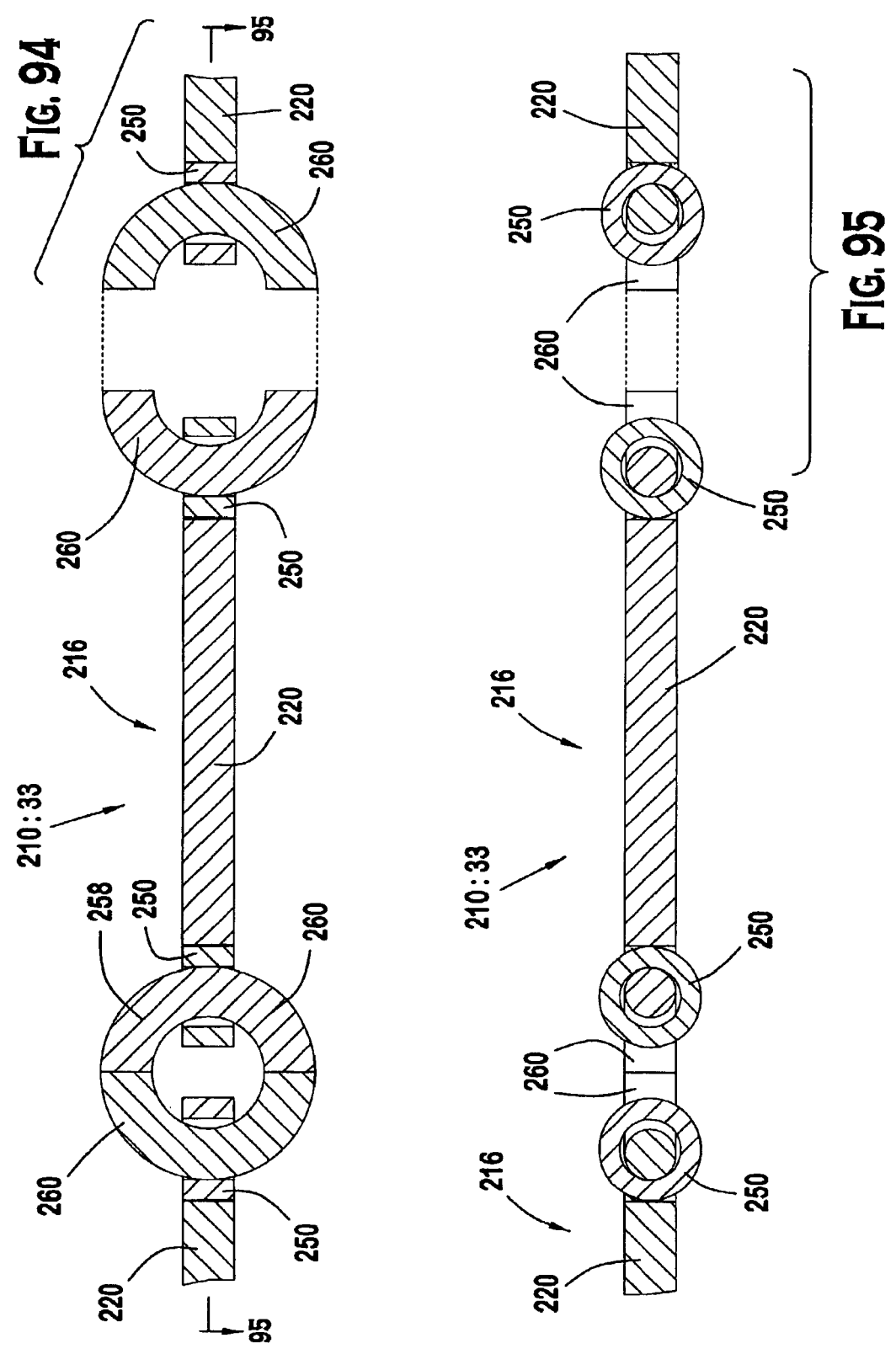

FIG. 94 is a cross-sectional view of the security chain 210:33 of FIG. 93 as taken along the line 94—94 of FIG. 93;

FIG. 95 is a cross-sectional view of the security chain 210:33 of FIG. 94 as taken along the line 95—95 of FIG. 94;

FIG. 96 is an exploded view of a link 216 of the security chain 210:34 of FIG. 97;

FIG. 97 is a perspective view of a thirty-fourth preferred security chain 210:34 of the present invention formed by links similar to that of FIG. 93 modified so that the rings 250 on a single central member 220 are in ninety (90) degree opposition relative to each other;

FIG. 98 is a cross-sectional view of the security chain 210:34 of FIG. 97 as taken along the line 98—98 of FIG. 97;

FIG. 99 is a cross-sectional view of the security chain 210:34;

FIG. 100 is a cross-sectional view of a thirty-fifth preferred embodiment of a security chain 210:35 of the present invention similar to that of FIG. 97 with the rings 250 replaced by U-shaped members 262;

FIG. 101 is a perspective view of thirty-sixth preferred security chain 210:36 of the present invention formed by links 216 similar to those shown in FIG. 94 modified to have a curved central member 224;

FIG. 102 is a top plan view of the security chain 210:36 of FIG. 101;

FIG. 103 is an exploded view of a link 216 of a security chain 210:37 of FIG. 104;

FIG. 104 is a perspective view of thirty-seventh preferred security chain 210:37 of the present invention formed by links 216 having an elongated central member 220 with a ring 250 on one end and a portion of a connecting ring 258 on an opposite end. Adjacent central members 220 are joined to form the security chain 210:37 by inserting a ring half 260 through the ring 250 of one link and securing the ring half 260 to the ring half 260 of an adjacent elongated central member 220. Thus, one central member 220 is preferably fixed with respect to the ring connector 260 while an adjacent central member 220 can freely move along and pivot around the ring connector 260;

FIG. 105 is a cross-sectional view of the security chain 210:37 as taken along the line 105—105 of FIG. 104;

FIG. 106 is a cross-sectional view of the security chain 210:37 of FIG. 105 as taken along the line 106—106 of FIG. 105;

FIG. 107 is an exploded view of a link 216 used to form a security chain 210:38 of FIG. 108;

FIG. 108 is a perspective view of a thirty-eighth preferred security chain 210:38 of the present invention formed by an elongated central member 220 having an enlarged ring 264 on one end and a connecting member 214 on a second end. The connecting member 214 is preferably U-shaped and formed of rectangular tubing. It is preferred that the enlarged ring 264 is sized to be able to be slid over a U-shaped connecting member 214 prior to securing that U-shaped connecting member 214 to a central member 220;

FIG. 109 is a cross-sectional view of the security chain 210:38 of FIG. 108 as taken along the line 109—109 of FIG. 108;

FIG. 110 is a cross-sectional view of the security chain 210:38 of FIG. 109 as taken along the line 110—110 of FIG. 109;

FIG. 111 is a perspective view of a thirty-ninth preferred security chain 210:39 of the present invention formed by links 216 similar to those of FIG. 108 modified so that the connecting members 214 are in ninety (90) degree opposition relative to the next successive connecting member 214 in the security chain 210:39;

FIG. 112 is a cross-sectional view of the security chain 210:39 of FIG. 111 as taken along the line 112—112 of FIG. 111;

FIG. 113 is a fortieth preferred security chain 210:40 of the present invention formed by links 216 similar to that of FIG. 108 with the elongated central member 220 modified to form a curved central member 224;

FIG. 114 is a top plan view of the security chain 210:40 of FIG. 113;

FIG. 115 is an exploded view of a link 216 of the security chain 210:41 of FIG. 116;

FIG. 116 is a perspective view of a forty-first preferred security chain 210:41 of the present invention preferably formed by links 216 having a central member 220 with three sided, rectilinear, generally U-shaped connector members 214 on each end. Neighboring links 216 are preferably joined by an enlarged ring 264 that connects adjacent connector members 214;

Figure 1:
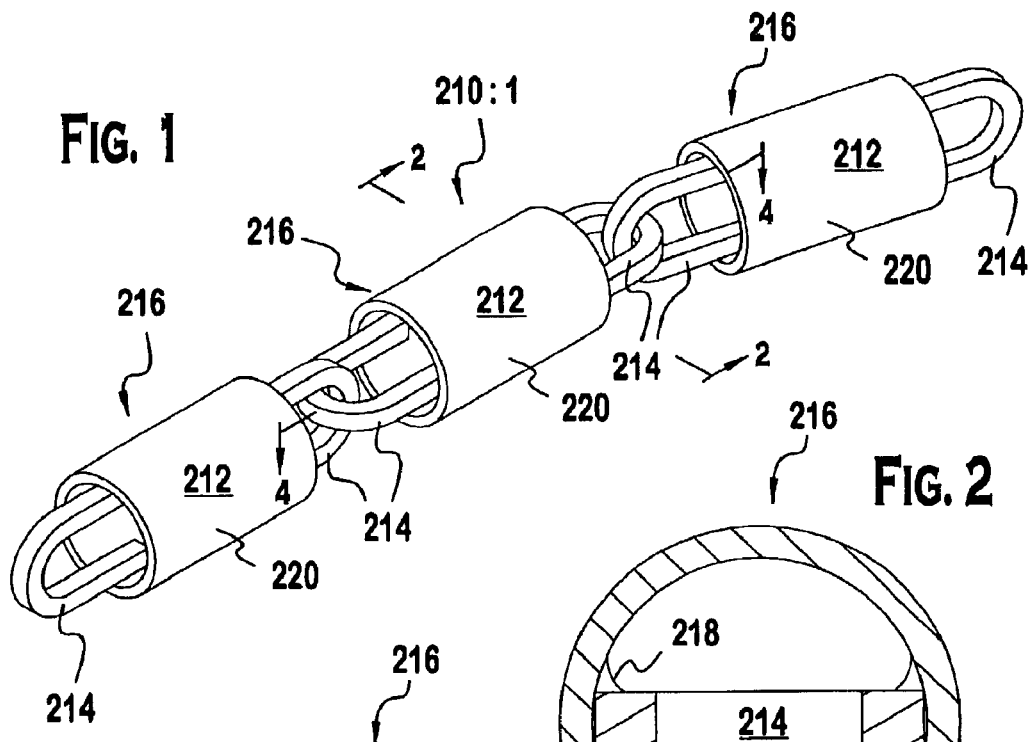
Figure 2:
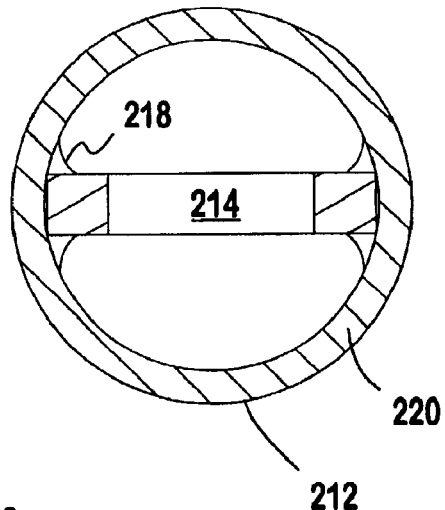
FIG. 2 is cross-sectional view of the security chain of 210:1 of FIG. 1 illustrating the connector member 214 formed by generally rectangular tubing.
Figure 3:
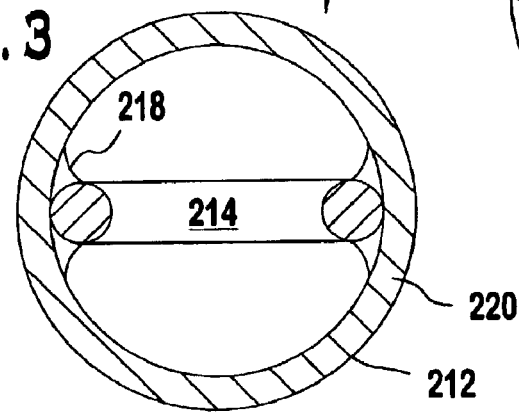
FIG. 3 is cross-sectional view of similar to that of FIG. 2 illustrating the security chain 210:1 of FIG. 1 when assembled using connector members 214 having a generally circular cross section.
Figure 4:
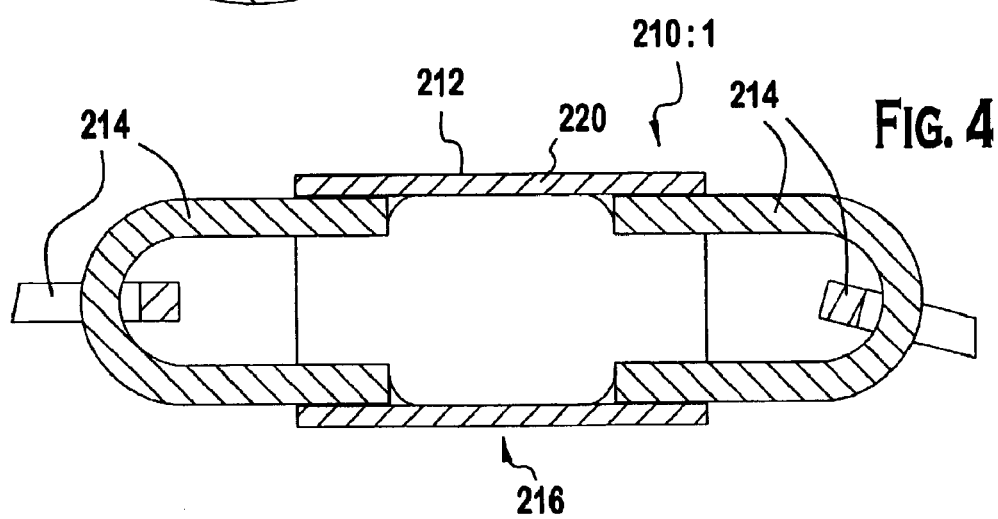
FIG. 4 is cross-sectional view of the security chain 210:1 of FIG. 1 illustrating the preferred welds 218 used to secure the connector members 214 to an inner surface of the tube 212.
Figure 127:
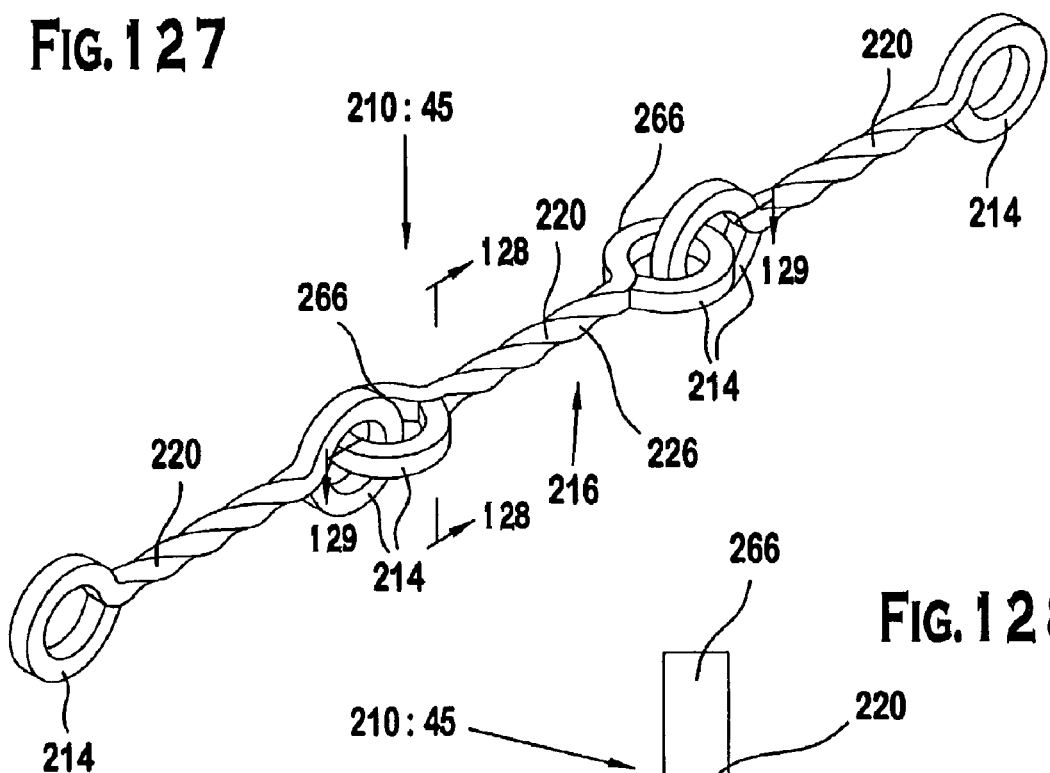
Figure 128:
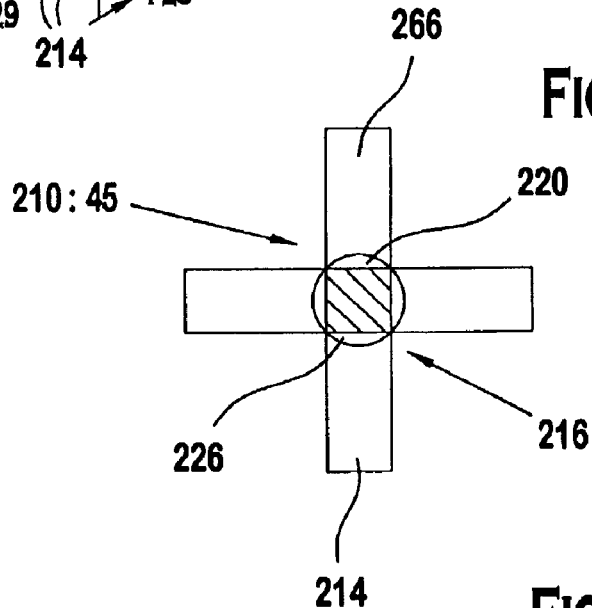
Figure 129:
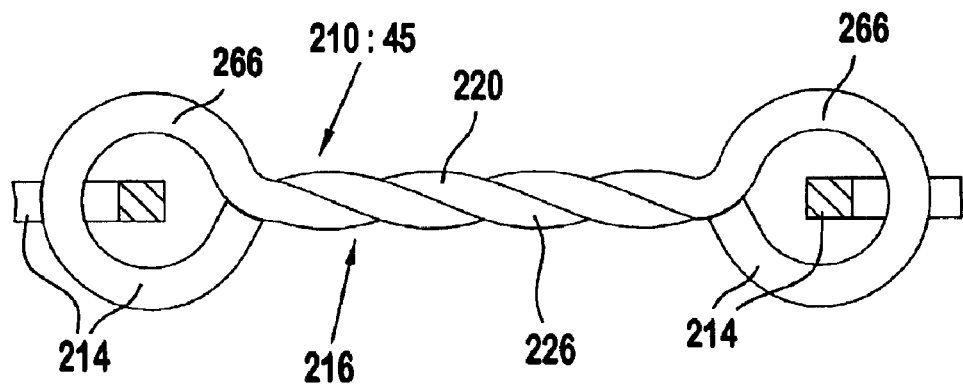
Figure 134:
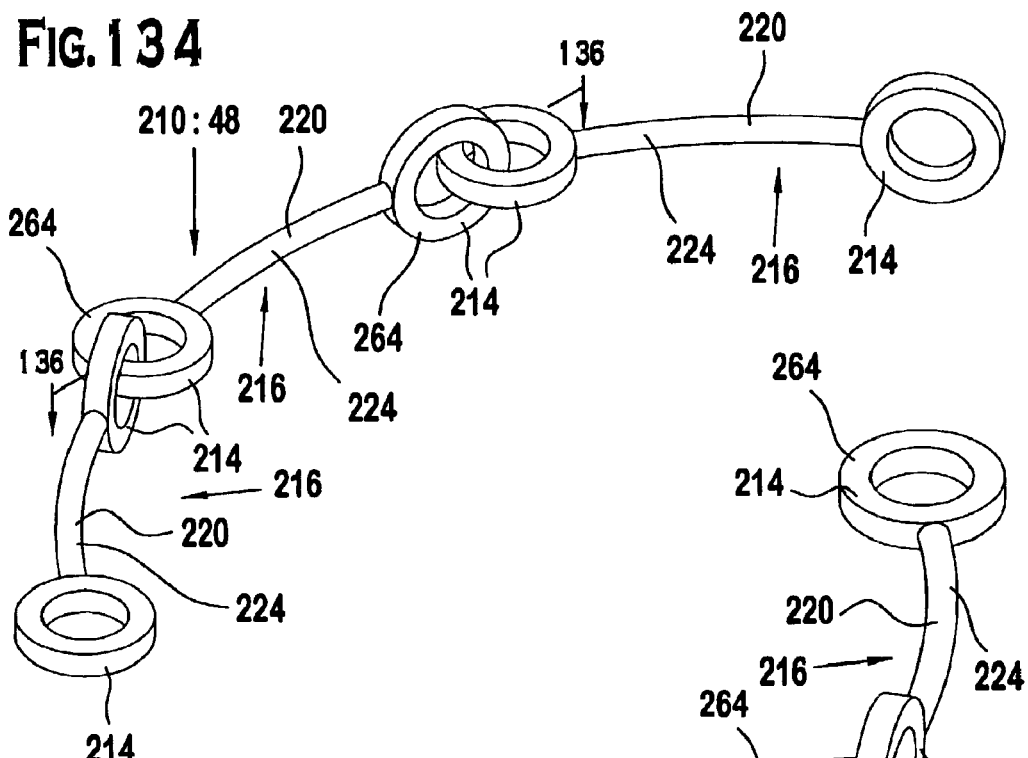
Figure 135:
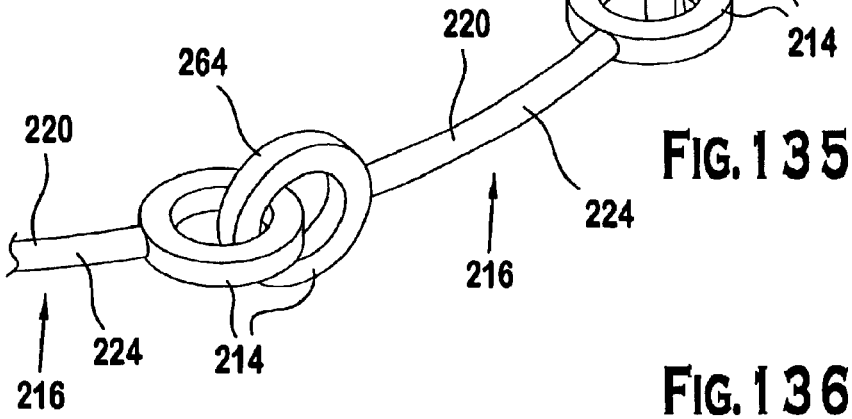
Figure 136:
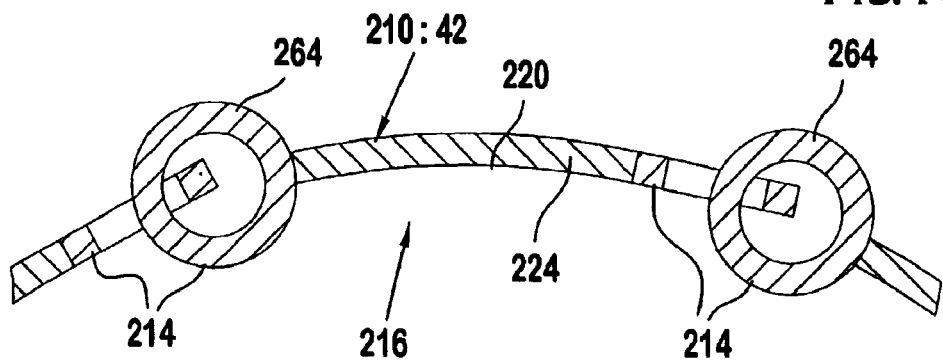

FIG. 119 is a perspective view of forty-second preferred security chain 210:42 of the present invention formed by links 216 having a single body that defines the central member 220 and the shaped portions 266 that form the connector members 214;

FIG. 120 is a cross-sectional view of the security chain 210:42 of FIG. 119 as taken along the line 120—120 of FIG. 119;

FIG. 121 illustrates an alternative embodiment of the forty-second preferred security chain 210:42 □ of the present invention formed by links 216 similar to that of FIG. 119 with the connector end 214 being shaped in opposite directions;

FIG. 122 is a cross-sectional view of the security chain 210:42 □ of FIG. 121 as taken along the line 122—122 of FIG. 121;

FIG. 123 is a perspective view of a forty-third preferred security chain 210:43 of the present invention formed by links 216 similar to that of FIG. 121 modified to have the connector members 214 oriented in ninety (90) degree opposition relative to each other;

FIG. 124 is a cross-sectional view of the security chain 210:43 of FIG. 123 as taken along the line 124—124 of FIG. 123;

FIG. 125 is a perspective view of a forty-fourth preferred security chain 210:44 of the present invention formed by links 216 similar to that of FIG. 119 modified so that the connector members 214 are in ninety (90) opposition to each other and so that the links 216 include a curve central member 224;

FIG. 126 is a cross-sectional view of the security chain 210:44 of FIG. 125 as taken along the line 126—126 of FIG. 125;

FIG. 127 is a perspective view of a forty-fifth preferred security chain 210:45 of the present invention formed by links 216 having a twisted section 226 forming the central member 220 with rings 250 shaped on each end. It is preferred, but not necessary, that the twisted portion extend substantially over the entire length of the central member 220;

FIG. 128 is a cross-sectional view of the security chain 210:45 of FIG. 127 as taken along the line 128—128 of FIG. 127;

FIG. 129 is a cross-sectional view of the security chain 210:45 of FIG. 127 as taken along the line 129—129 of FIG. 127;

FIG. 130 is a perspective view of a forty-sixth preferred security chain 210:46 of the present invention formed by links 216 having a cylindrical elongated central member 220 with enlarged annular rings 264 preferably positioned on each end. The rings 264 are preferably formed of rectangular tubing to form the connector members 214;

FIG. 131 is a cross-sectional view of the security chain 210:46 of FIG. 130 as taken along the line 131—131 of FIG. 130;

FIG. 132 is a perspective view of a forty-seventh security chain 210:47 of the present invention formed by links 216 similar to those of FIG. 130 modified so that the opposing enlarged rings 264 on opposite ends of the central member 220 are generally in ninety (90) degree opposition;

FIG. 133 is a cross-sectional view of the security chain 210:47 of FIG. 132 as taken along the line 133—133 of FIG. 132;

FIG. 134 is a cross-sectional view of a forty-eighth preferred security chain 210:48 of the present invention formed by links 216 similar to those of FIG. 132 modified to have a curved central member 224;

FIG. 135 is a perspective view of the security 210:48 of FIG. 134;

FIG. 136 is a cross-sectional view of the security chain 210:48 of FIG. 134 as taken along the line 136—136 of FIG. 134;

FIG. 137 is a perspective view of a forty-ninth preferred security chain 210:49 of the present invention formed by links 216 having an elongated central member 220 with U-shaped member ends 268 depending therefrom;

FIG. 138 is a cross-sectional view of the security chain 210-49 of FIG. 137 as taken along the line 138—138 of FIG. 137;

FIG. 139 is a perspective view of a fiftieth preferred security chain 210:50 of the present invention formed by links 216 having an elongated central member 220 with U-shaped connector member ends 268 that depend therefrom in opposite directions from the central member 220;

FIG. 140 is a cross-sectional view of the security chain 210:50 of FIG. 139 as taken along the line 140—140 of FIG. 139;

FIG. 141 is an exploded view of link 216 of the security chain 210:51 of FIG. 142;

FIG. 142 is a perspective view of a fifty-first security chain 210:51 of the present invention formed by links 216 having a central member 220 with a connector rod 272 secured within the tube 212 via a pin 270. The elliptical cross-sectional shape of a hollow within the tube 212 allows the pinned connector rod 272 to rotate laterally within the central member 220;

FIG. 143 is a cross-sectional view of a link 216 of the security chain 210:51 of FIG. 142 as taken along the line 143—143 of FIG. 142. FIG. 143 illustrates a pin 270 extending through a connector rod 272 pivotably secured within a generally elliptically shaped central member 220;

FIG. 144 is a cross-sectional view of the security chain 210:51 of FIG. 142 as taken along the line 144—144 of FIG. 142;

FIG. 145 is a cross-sectional view of the security chain 210:51 of FIG. 144 as taken along the line 145—145 of FIG. 144;

FIG. 146 is an exploded view of a link 216 of the security chain 210:52 of FIG. 147;

FIG. 147 is a perspective view of a fifty-second preferred security chain 210:52 of the present invention formed by links 216 having a tubular central member 220 with a U-shaped connector member 214 secured in each end thereof. Neighboring links 216 are connected via a connector rod 272. Bores are preferably positioned in each end of the connector rod 272 to receive a portion of the U-shaped connector members therein;

FIG. 148 is a cross-sectional view of a link of the security chain 210:52 of FIG. 147 as taken along the line 148—148;

FIG. 149 is a cross-sectional view of the security chain 210:52 of FIG. 147 as taken along the line 149—149 of FIG. 147;

FIG. 150 is a cross-sectional view of the security chain 210:52 of FIG. 149 as taken along the line 150—150 of FIG. 149;

FIG. 151 is an exploded view of a link 216 of the security chain 210:53 of FIG. 152;

FIG. 152 is a perspective view of a fifty-third preferred security chain 210:53 of the present invention formed by links 216 having a central member 220 formed by a tubular member 212. A connector member 272 is used to connect neighboring tubular central members 220 via loops 276 that are preferably pivotably mounted in each end of the connector rod 272. Each loop 276 is secured within a central member by a pin 270. The elliptical cross-sectional shape of the central member 220 allows lateral motion of the connector rod 272 relative to the central member 220;

FIG. 153 is a cross-sectional view of a link 216 of the security chain 210:53 of the present invention as taken along line 153—153 of FIG. 152;

FIG. 154 is a cross-sectional view of the security 210:53 of FIG. 152 as taken along the line 154—154 of FIG. 152;

FIG. 155 is a cross-sectional view of the security chain 210:53 of FIG. 154 as taken along the line 155—155 of FIG. 154;

FIGS. 156 through 158 are perspective views of conventional security chain of the prior art that illustrates the current trend of making heavier and thicker polygonal chain links to attempt to increase the strength of the chain. The chains of the prior art fail to provide increased strength while at the same reducing the overall weight of the chain.

DETAILED DESCRIPTION OF THE PREFERRED EMBODIMENTS

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the security chain and designated parts thereof. The words "a" and "one" are defined as including one or more of the referenced item unless specifically stated otherwise. This terminology includes the words above specifically mentioned, derivatives thereof, and words of similar import.

Referring to FIGS. 1–155, multiple preferred embodiments of security chain of the present invention are shown and designated 210:1 through 210:53. Briefly stated, the security chain 210:1–210:53 of the present invention provides a high strength chain for use in anti-theft applications (and for use in other heavy load situations). The security chain 210:1–210:52 of the present invention is relatively light as compared to conventional chain.

It is preferred that the security chain 210:1–210:53 and its individual components are formed of high strength, durable, impact resistant material, such as hardened steel. Those of ordinary skill in the art will appreciate from this disclosure that any other suitable metals, steels, stainless steels, alloys, or the like can be used to form the security chain 210:1–210:53 without departing from the present invention. Depending upon the particular anti-theft application incorporating the security chain 210:1–210:53, a polymer sheath may be placed thereover to simplified handling of the security chain 210:1–210:53. While many references to welding are made throughout this specification, those of ordinary skill in the art will appreciate from this disclosure that any other suitable means for connecting various link components can be used without departing from the scope of the present invention.

Referring to FIGS. 1–17, the security chain 210:1–210:5 of the present invention preferably includes a plurality links 216 interconnected. Each of the links 216 preferably includes a central member 220 having first and second ends. The central member 220 is formed by a hollow elongated tube 212 with openings at the first and second ends thereof The tubes 212 preferably have a one (1) inch diameter. The tubular shape of the central members 220 makes the security chain 210:1–210:5 difficult to cut using bolt cutters or the like.

It is preferred, but not necessary, that the hollow elongated tube 212 has a generally circular cross-section. Those of ordinary skill in the art will appreciate from this disclosure that the hollow elongated tube 212 can have an oblong or elliptical cross-section while still being generally circular.

First and second connector members 214 are each preferably welded across a separate one of the openings of the hollow elongated tube 212 to provide a high strength security chain suitable for anti-theft applications. It is preferable, but not necessary, that the connector members be generally U-shaped.

Referring to FIGS. 14–17, the hollow elongated tube 212 of the security chain 210:5 can be curved such that the hollow elongated tube 212 generally defines an arc between the first and second connector members 214. Referring again to FIGS. 1–17, the use of a hollow elongated tube 212 allows for high strength security chain 210:1–210:5 having reduced weight relative to conventional security chains having polygonal links (as shown in FIGS. 156–158). The weight reduction is due to a reduced thickness of the sidewall of the hollow elongated tube 212 relative to the thickness of one side of a chain link having equivalent strength. Thus, by eliminating portions of a conventional polygonal chain link and substituting a hollow elongated tube 212 therefor, the weight of the security chain 210:1–210:5 is reduced. The weight of the security chain 210:1–210:5 can be further reduced by using curved tubular members 224 such as those shown in FIGS. 14–17. By using curved central members 224, the length of the hollow elongated tube 212 can be increased by while still allowing the chain 210:5 to be repositioned in a generally circular loop.

Figure 5:
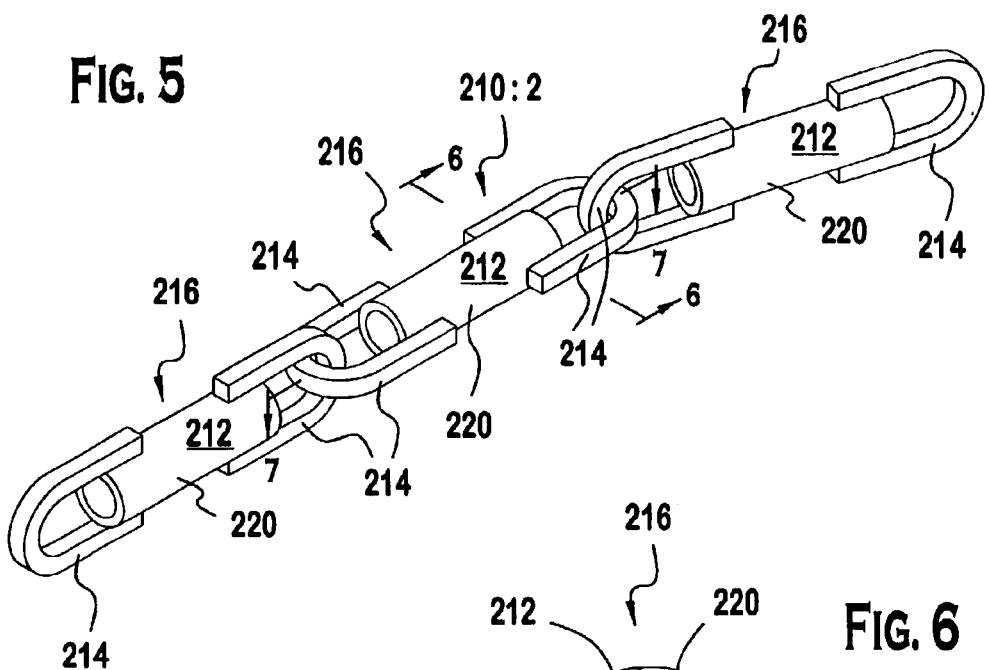
FIG. 5 is perspective view of a second preferred embodiment of a security chain 210:2 of the present invention. The security chain 210:2 uses a central member 220 formed by a tube 212 to form a high strength light weight security chain 210:2. The tube 212 receives first and second legs of the connector members 214 on each end.
Figure 6:
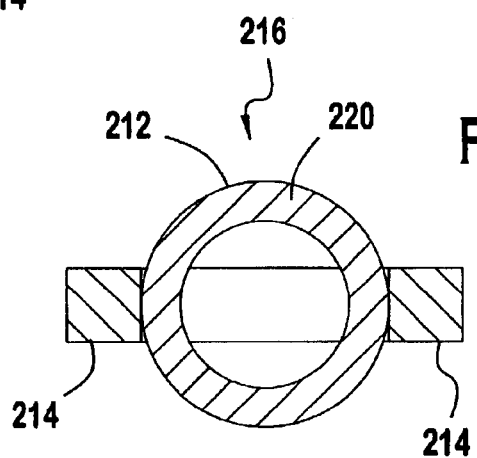
FIG. 6 is cross-sectional view of the security chain 210:2 of FIG. 5 as taken along the line 6—6 of FIG. 5 illustrating the positioning of the first and second legs of the connector members 214 on opposite sides of the outer surface of the central member 220.
Figure 7:
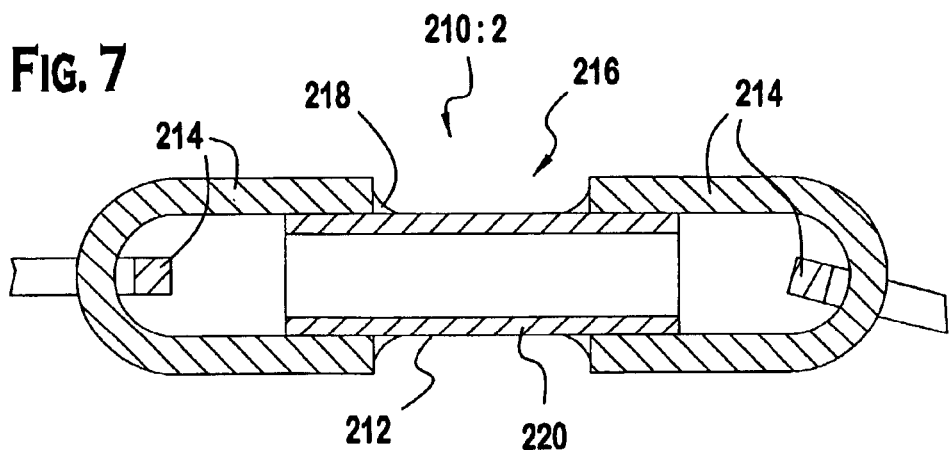
FIG. 7 is a cross-sectional view of the security chain 210:2 of FIG. 5 as taken along the line 7—7 of FIG. 5 illustrating welds 218 used to secure the connector members 214 to the outside of the elongated hollow tube 212.
Figure 8:
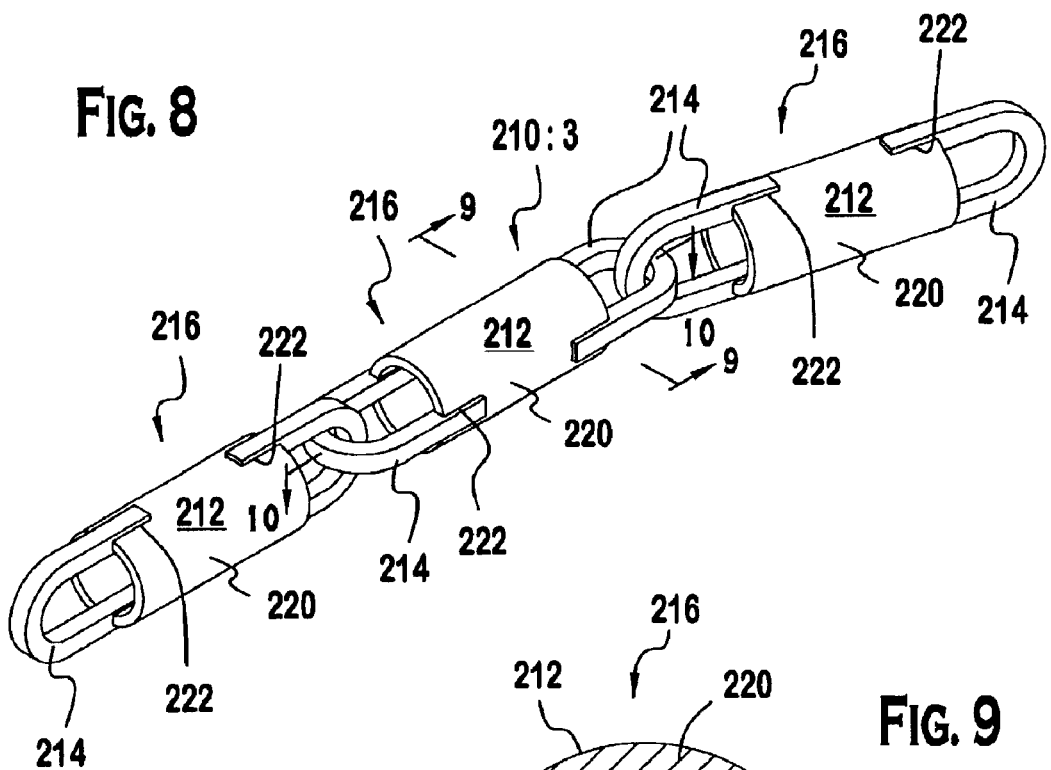
FIG. 8 is a perspective view of a third preferred embodiment of the security chain 210:3 of the present invention illustrating the connector members 214 each secured (preferably via welds) within one of a plurality of cutouts 222 in the ends of the elongated hollow tube 212 that forms the central member 220.
Figure 9:
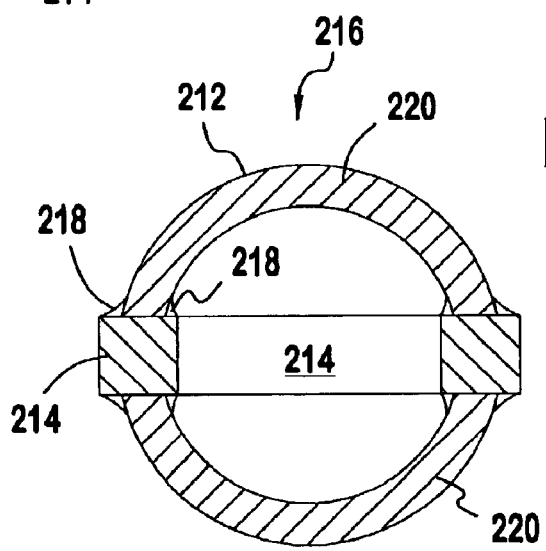
FIG. 9 is a cross-sectional view of a link 216 of the security chain 210:3 of FIG. 8 as taken along the line 9—9 of FIG. 8 illustrating the preferred welding of the connector member 214 within generally opposed cutouts 222.
Figure 10:
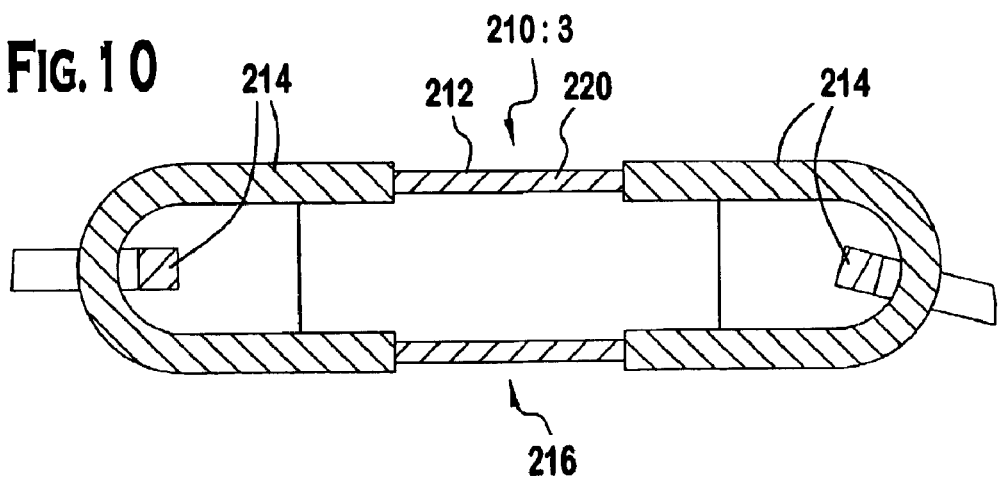
FIG. 10 is a cross-sectional view of the security chain 210:3 of FIG. 8 illustrating the preferable positioning of U-shaped connector members 214 within cut-outs 222 in the tube 212.
Figure 11:
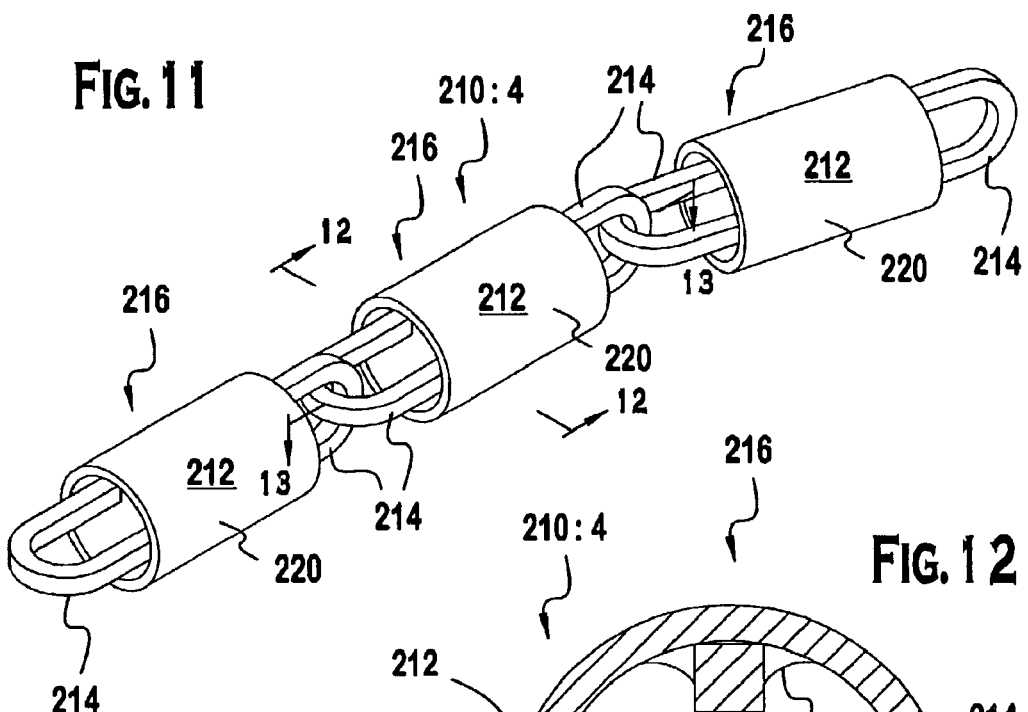
FIG. 11 is perspective view of a fourth preferred security chain 210:4 of the present invention illustrating connector members 214 mounted within the tube 212 in ninety (90) degree opposition to each other. Each of the first and second connector members 214 is positioned generally within a first and second plane, respectively. The first and second planes are preferably generally perpendicular to each other.
Figure 12:
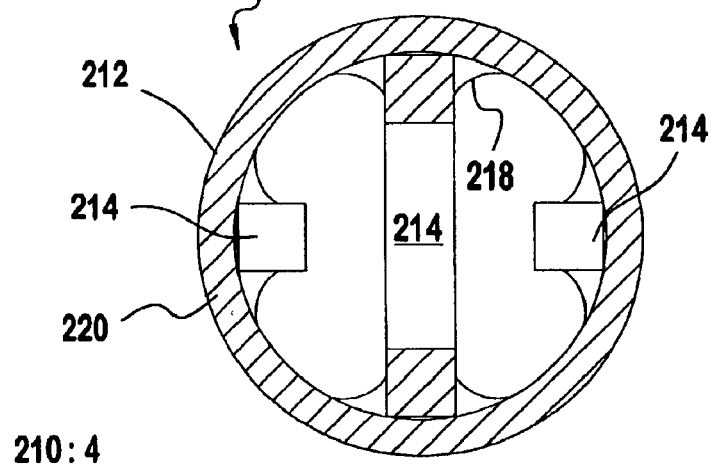
FIG. 12 is a cross-sectional view of one link 216 of the security chain 210:4 in FIG. 11 illustrating the preferred welding of the connector members 214 in ninety (90) degree opposition within the preferably hollow tube 212.
Figure 13:
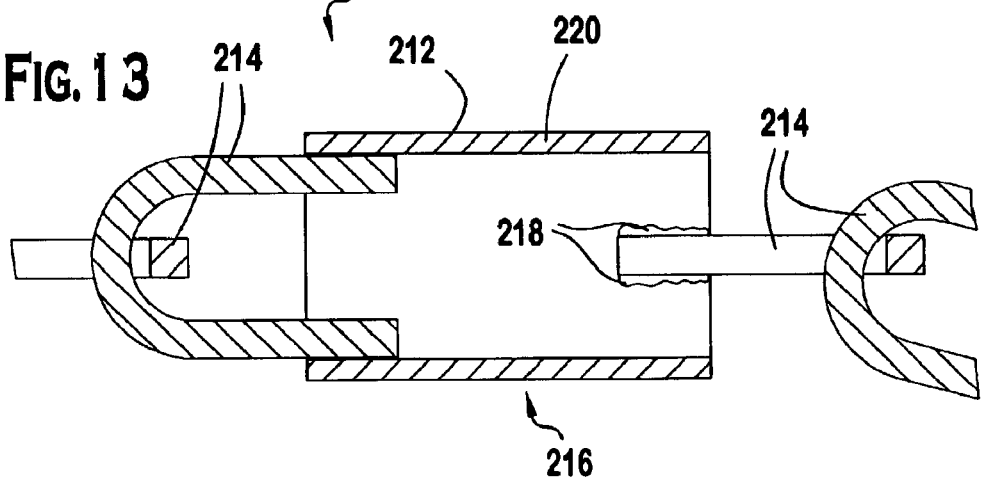
FIG. 13 is a cross-sectional view of the security chain 210:4 of FIG. 11 illustrating the securing of the connector members 214 in generally ninety (90) degree opposition.
Figure 57:
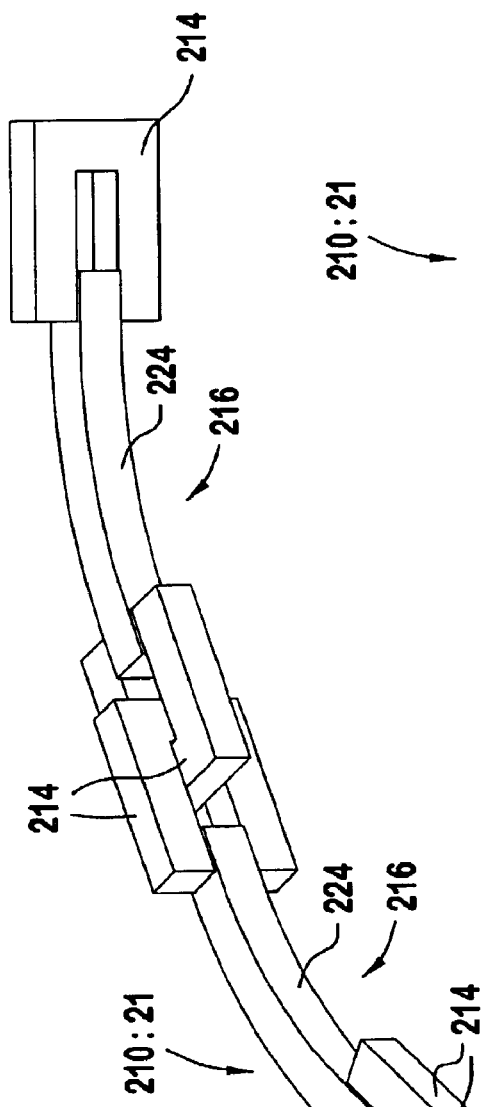
FIG. 57 is a perspective view of a twenty-first preferred security chain 210:21 of the present invention formed by links 216 similar to that shown in FIG. 25 modified to include a curved central member 224 so that the central member 220 defines an arc between the connector members 214.
Figure 58:
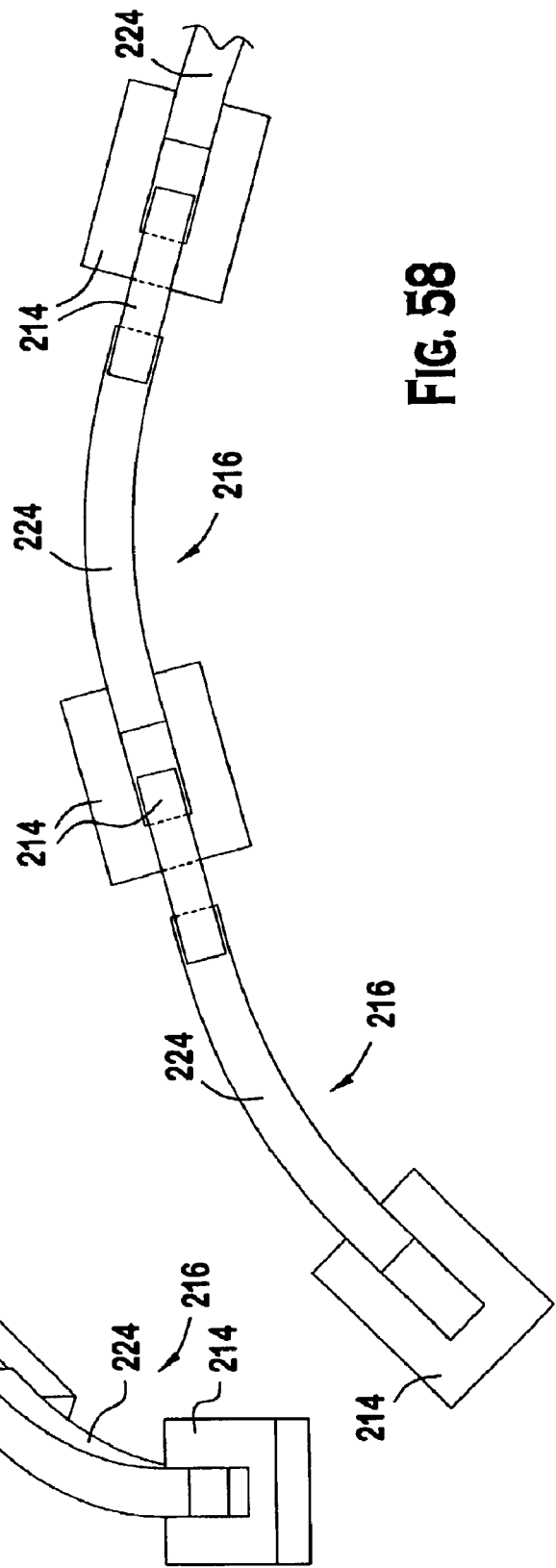
FIG. 58 is a top plan view of the security chain 210:21 of FIG. 57.
Figure 117:
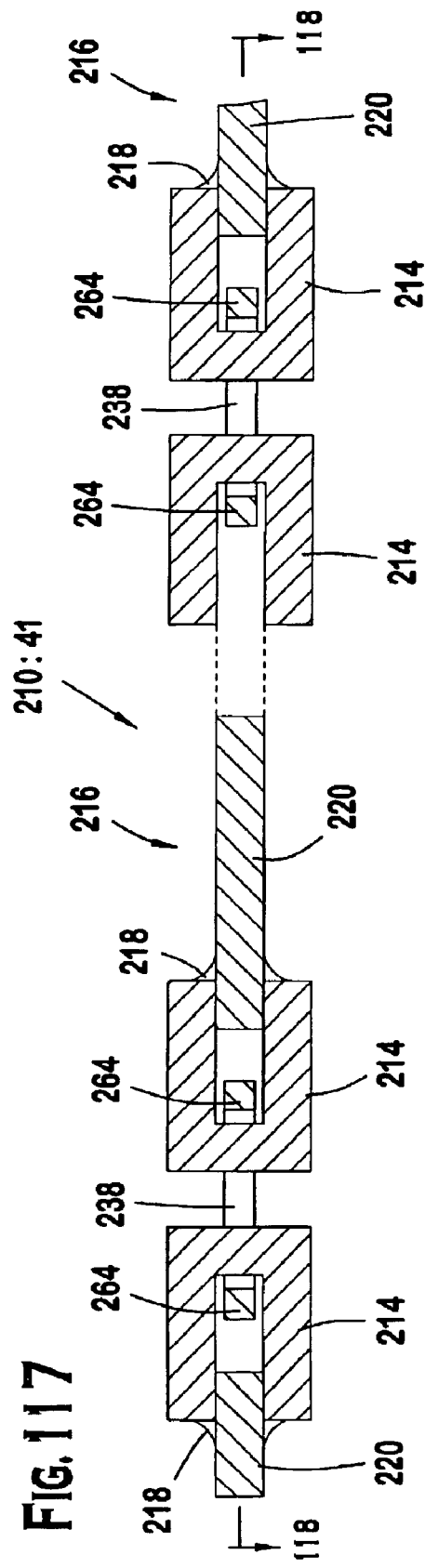
FIG. 117 is a cross-sectional view of the security chain 210:41 of FIG. 116 as taken along the line 117—117 of FIG. 116.
Figure 118:
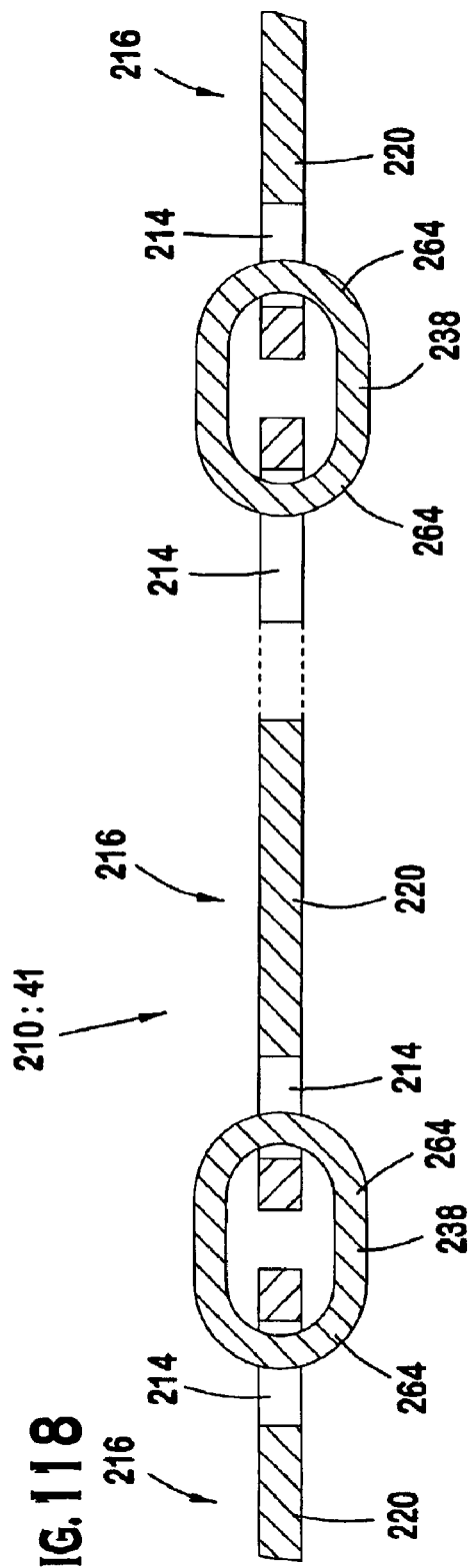
FIG. 118 is a cross-sectional view of the security chain 210:41 of FIG. 117 as taken along the line 118—118 of FIG. 117.

It is preferred that the first and second connector members 214 have a generally U-shape with first and second legs that are positioned on the central member 220. Referring to FIGS. 1–4, the first and second legs can be welded to inner surface of the central member 220. Referring to FIGS. 5–7, the first and second legs can be welded to an outer surface of the central member 220. Referring to FIGS. 8–10, the first and second legs can be welded within cutouts located in the central member 220.

Referring to FIGS. 1–7, the first and second connectors members 214 can both be generally positioned in the same plane (as shown in FIGS. 5–7) or the first and second connectors 214 can be generally positioned in first and seconds planes, respectively, that are oriented generally perpendicularly to each other so that the connectors 214 are opposed to each other by approximately ninety (90) degrees.

Referring to FIGS. 18–35, the security chain 210:6–210:12 can be formed from links 216 having an elongated member 220 formed by a single solid rod having an outer surface. The elongated central member 220 can include a twisted portion 226 and/or can be curved so that the elongated central member 220 defines an arc between the first and second connector members 214. The first and second connector members 214 are each preferably disposed on a separate end of the elongated central member 220.

Each of the first and second connection members 214 are preferably formed by a ring segment 214. The ring segment is preferably greater than three quarters (¾) of a complete ring. The ring segment has first and second ends that define a gap therebetween. The first and second ends are preferably welded to opposite sides of the outer surface of the elongated central member 220.

Referring specifically to FIG. 23, the first and second connector members 214 can be, but are not necessarily, positioned in first and second planes, respectively, that are oriented generally perpendicularly to each other. Referring again to FIGS. 18–35, it is preferred, that the length of the elongated central member is at least five (5) times the outside diameter of either one of the first and second connector members 214. It is further preferred that the length of the elongated central member 220 be between six (6) and nine (9) times the length of the outside diameter of the either one the first and second connector members 214.

Referring to FIGS. 51–58, the security chain 210:19–210:21 can be formed using links 216 having an elongated central member 220 formed by single solid rod having an outer surface. Such links 216 preferably have first and second connector members 214 each disposed on a separate end of the elongated central member 220. Each of the first and second connector members 214 is preferably formed by a three-side, rectilinear, generally U-shaped member formed of rectangular tubing. The first and seconds are preferably welded to opposite sides of the outer surface of the elongated central member 220.

Referring to FIGS. 92–106, the security chain 210:33–210:37 may be formed of links 216 that are interconnected by connecting rings 258. The connecting rings 258 are preferably circular and have a generally circular cross-section when taken along a radius thereof. The elongated central member 220 is preferably formed by a single solid rod having first and second ends. A first ring 250 is preferably disposed on the first end of the elongated central member and receives one of the plurality of connecting rings 258. The second end of the elongated central member 220 is preferably engaged with another one of the plurality of connecting rings 258.

It is preferred that the rings 250 are welded to ends of the elongated central member 220. It is also preferred that the connecting rings 258 are formed by welding two ring halves 260 together. While the security chain 210:33–210:37 preferably uses ring halves 260 to form the connecting rings 258, those of ordinary skill in the art will appreciate from this disclosure that variously sized ring segments can be used to form the connecting ring 258 without departing from the scope of the present invention.

Referring to FIG. 93, the link 216 may include a second ring 250 disposed on the second end of the elongated central member 220 that receives another one of the plurality of connecting rings 258 therein. Alternatively, referring to FIG. 104, the second end of the elongated central member 220 may be disposed on one of the plurality of connecting rings 258 via a weld or the like.

Referring to FIG. 97, it is preferred that two neighboring connecting rings 258 each lie in one of a first and second plane that are preferably oriented generally perpendicularly to each other. Referring to FIG. 101, the elongated central member 220 may be curved such that the elongated central member defines an arc between two adjacent connecting rings 258.

Referring to FIGS. 107–114, the security chain 210:38–210:40 may include first and second connector members that are each disposed on a separate end of a single solid rod 220 having an outer surface. The first connector member is preferably a three-sided, rectilinear, generally U-shaped member formed of rectangular tubing having first and second ends. The first and second ends are preferably welded to opposite sides of the outer surface of the elongated central member 220. The second connector member is preferably formed by an enlarged ring 264. It is preferred that the enlarged ring 264 is welded on an end of the elongated central member 220 that is opposite from the U-shaped member 214. It is preferred that the U-shaped connector member 214 and the enlarged ring 264 are located in separate planes that are oriented generally perpendicularly to each other.

Referring to FIGS. 119–122, the security chain 210:42, 210:42' may be formed using links 216 that are formed from a single bar. The single bar is preferably shaped to define an elongated central member 220 formed by a central portion of the shaped bar. First and second connector members 214 are formed by portions approximate to the first and second ends of the single bar. The first and second connector members 214 define a substantially circular connector with the elongated central member 220 being generally aligned perpendicularly thereto.

Referring to FIG. 120, the link 216 may be formed so that first connector member (i.e., the left connector member 214) preferably extends along a counter clockwise path when moving along the single bar from the elongated member 220 toward the first bar end and the second connector member 214 (i.e., the right connector member 214) preferably extends along a clockwise path when moving along the single bar from the elongated central member 220 toward the second bar end.

Referring to FIG. 122, the first connector member (i.e., the left connector member) 214 can alternatively extend along a counter clockwise path when moving along the single bar from the elongated central member 220 toward the first bar end and the second connector member (i.e., the right connector member) 214 can extend along a counter clockwise path when moving along the single bar from the elongated central member 220 toward the second bar end. Referring to FIGS. 130–137, the security chain 210:46–210:48 may be formed using links 216 having an elongated central member 220 having first and second ends. It is preferred that the elongated central member is formed by a single cylindrical rod. First and second connector members 214 are preferably disposed on first and second ends of the elongated central members, respectively. The first and second connector members 214 are each preferably formed by a generally angular ring formed of rectangular tubing.

Referring to FIGS. 36–42, the security chain 210:13, 210:14 may be formed by a central member 220 having a post 228 positioned on an upper right side thereof and having a bridge member 230 positioned on an upper left side thereof. The bridge members 230 are preferably elliptically shaped and extend past an outer edge of the elongated central member 220. It is preferred that a portion of the bridge member 230 that does not extend over the central member 220 defines a bore 232 therethrough. The bore 232 is adapted to receive a post 228 from a neighboring link to allow the link 216 to be attached thereto.

Referring to FIGS. 43–46, the security chain 210:15, 210:16 may be formed by links 216 having central members 220 with a post 228 located on an upper right side thereof and having bores 232 defined in a left side therein. By alternately positioning the links 216 with the post 228 facing upwardly and downwardly, the links 216 can be sequentially connected.

Referring to FIGS. 47–50, the security chain 210:17, 210:18 can be formed by links 216 having a post 228 on each end. Neighboring links are connected via a floating connector 238 that is positioned over a single post on each of two neighboring links 216.

Referring to FIGS. 59–64, the security chain 210:22–210:23 may be formed using links 216 having an elongated member 220 with plungers 240 on either end. Neighboring elongated central members 220 are connected by sliding a portion of the central member 220 through a slot 244 in a box 242 with the plunger 240 located within an opening 248 in a box. Once an end from each neighboring central member 220 is located within the box 242, a side 246 is secured over the opening 248 to secure the central member ends within the box 242 which serves as a floating connector 238.

Referring to FIGS. 65–70, the security chain 210:24, 210:25 may be formed by a central member 220 having a post 228 on one end and a ring 250 positioned on an opposite end. The post 220 is preferably inserted within a bore 232 of a ring 250 on a neighboring link 216 to secure multiple links 216 together. By alternating the orientation of the links 216 so that successive links alternatively have posts 228 facing upwardly and then downwardly, the links 216 can be assembled into a chain. Referring to FIGS. 71–76, the security chain 210:26, 210:27 may be formed by links 216 having a central member 220 with a post 228 on one end and a ring 250 on another. Once the post 228 is secured within the ring 250 of a neighboring link 216 (as described above in connection with FIGS. 65–70), an upper end of the post 228 is angled to prevent withdrawal of the post 228 from its corresponding ring 250.

Referring to FIGS. 77–91, the security chain 210:28–210:31 can be formed using links 216 that have central members 220 joined by a floating connector 238. It is preferred that the central connector 238 is formed by two posts 228 sandwiched between end plates 254. The central members 220 can rotate about one of the posts 228 of the floating connector 258 or can be fixed thereto.

Referring to FIGS. 141–145, the security chain 210:51 may be formed by a central member having a hollow tubular shape. The central members 220 are connected via connector rods 272. Each connector 272 preferably has one end pinned within a hollow tube 212 of a first central member 220 and second end pinned within a hollow tube 212 of a neighboring central member 220. The connector rods 272 are pivotally secured within tubes 212 via a pin 270. Alternatively, referring to FIGS. 146–150, the tubes 212 forming the central members 220 can be connected via connector rods 272 that are each attached to U-shaped connector members 214 that extend from each end of a central member 220. Referring to FIGS. 151–155, the connector rod 272 can be connected to the pin 270 via a loop 276 to form the security chain 210:53.

The present invention includes a method of making a security chain 210:1–210:53 having relatively low weight for the strength provided by the security chain 210:1–210:53 as compared to that of conventional chain (shown in FIGS. 156–158) formed of polygonal links. The method includes providing a plurality of links 216 interconnected to form the security chain 210:1–210-53. Each link 216 has a central member 220 and first and second connector members 214 each on a separate end thereof. The central member 220 is preferably formed by single rod. The central member is preferably curved to define an arc positioned between the first and second connector members 214. The curved central member 224 facilitates the positioning of the security chain 210:1–210:53 in a loop. The curved central member 224 allows the length of the single rod 220 to be increased, relative to the length of a straight rod, while still allowing the security chain 210:1–210:53 to be positionable in a loop defining a relatively smooth perimeter.

While various shapes, configurations, posts, bores, connector members, curved portions, and other chain link features have been described above and shown in the drawings for the various embodiments of the security chain 210:1–210:53 of the present invention, those of ordinary skill in the art will appreciate from this disclosure that any combination of the above features or the like can be used without departing from the scope of the present invention. Accordingly, it is recognized by those skilled in the art that changes may be made to the above described embodiments of the invention without departing from the broad inventive concept thereof. For example, it is understood that any of the cross-sectional shapes of the above links, or their component parts, can be varied to be circular, rectangular, I-beam shaped, or the like, without departing from the scope of the present invention. It is also understood, therefore, that this invention is not limited to the particular embodiments disclosed, but is intended to cover all modifications which are in within the spirit and scope of the invention as defined by the appended claims and/or shown in the attached drawings.

What is claimed is:

1. A security chain, comprising:
a plurality of links interconnected, wherein each link comprises:
a central member having first and second ends, the central member being formed by a hollow elongated tube with openings at the first and second ends, the hollow elongated tube having a generally circular cross section; and
first and second connector members are each welded across a separate one of the openings providing a high strength security chain suitable for anti-theft applications, the first and second connector members each have a generally U-shape with first and second legs, wherein the first and second legs are welded to an inner surface of the central member.

2. A security chain, comprising:
a plurality of links interconnected, wherein each link comprises:
a central member having first and second ends, the central member being formed by a hollow elongated tube with openings at the first and second ends, the hollow elongated tube having a generally circular cross section; and
first and second connector members are each welded across a separate one of the opening providing a high strength security chain suitable for anti-theft applications, the first and second connector members each have a generally U-shape with first and second legs, wherein the first and second legs are each welded within a separate one of a plurality of cutouts in the central member.

3. A high strength security chain, comprising:
a plurality of links interconnected, wherein each link comprises:
a central member having first and second ends formed by a hollow elongated tube having openings at the first and second ends; and
first and second connector members each welded across a separate one of the openings, each of the first and second connectors having a generally U-shape with first and second legs each welded to the central tube, wherein the first and second legs are welded to an inner surface of the central member.

4. The security chain of claim 3, wherein the hollow elongated tube is curved such that the hollow elongated tube generally defines an arc between the first and second connector members.

5. A high strength security chain, comprising:
a plurality of links interconnected, wherein each link comprises:
a central member having first and second ends formed by a hollow elongated tube having openings at the first and second ends; and
first and second connector members each welded across a separate one of the openings, each of the first and second connectors having a generally U-shape with first and second legs each welded to the central tube, wherein the hollow elongated tube includes a plurality of cutouts, the first and second legs each being welded within a separate one of a plurality of cutouts.

6. A security chain, comprising:
a plurality of links interconnected, wherein each link comprises:
an elongated central member formed by a single solid rod having an outer surface; and
first and second connector members each disposed on a separate end of the elongated central member, each of the first and second connector members being formed by a three aided, rectilinear, generally U-shaped member formed of rectangular tubing having first and second ends, the first and second ends being welded to opposite sides of the outer surface of the elongated central member.

7. The security chain of claim 6, wherein the elongated central member has a generally square cross section.

8. The security chain of claim 7, wherein the first and second connector members lie in first and second planes, respectively, the first and second planes being oriented generally perpendicularly to each other.

9. The security chain of claim 8, wherein the elongated central member is curved such that the elongated central member generally defines an arc between the first and second connector members.

10. A security chain, comprising:
a plurality of links interconnected, wherein each link comprises:
an elongated central member formed by a single solid rod having an outer surface;
first and second connector members each disposed on a separate end of the elongated central member, the first connector member being formed by a three sided, rectilinear, generally U-shaped member formed of rectangular tubing having first and second ends, the first and second ends being welded to opposite sides of the outer surface of the elongated central member, the second connector member being formed by an enlarged ring; and
wherein the first and second connector members lie in first and second planes, respectively, the first and second planes being oriented generally perpendicularly to each other.

11. The security chain of claim 10, wherein the elongated central member has a generally square cross section.

12. The security chain of claim 10, wherein the elongated central member is curved such that the elongated central member generally defines an arc between the first and second connector members.

13. A security chain, comprising:
a plurality of links interconnected, wherein each link is formed by:
an elongated central member having first and second ends; and
first and second connector members disposed on first and second ends of the elongated central member, respectively, the first and second connector members each being formed by a generally annular ring formed of rectangular tubing.

14. The security chain of claim 13, wherein the first and second connector members lie in first and second planes, respectively, the first and second planes being oriented generally perpendicularly to each other.

15. The security chain of claim 14, wherein the elongated central member is curved such that the elongated central member generally defines an arc between the first and second connector members.

16. The security chain of claim 13, wherein the first and second connector member, are welded to the elongated central member.

* * * * *